US012681561B2

(12) United States Patent
Tanner et al.

(10) Patent No.: US 12,681,561 B2
(45) Date of Patent: *Jul. 14, 2026

(54) PLATFORMIZATION OF MIXED REALITY OBJECTS IN VIRTUAL REALITY ENVIRONMENTS

(71) Applicant: Meta Platforms Technologies, LLC, Menlo Park, CA (US)

(72) Inventors: Christopher Richard Tanner, Highlands Ranch, CO (US); Amir Mesguich Havilio, San Francisco, CA (US); Michelle Pujals, Los Gatos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,774

(22) Filed: Jun. 20, 2024

(65) Prior Publication Data

US 2024/0338070 A1     Oct. 10, 2024

Related U.S. Application Data

(63) Continuation of application No. 17/404,667, filed on Aug. 17, 2021, now Pat. No. 12,056,268.

(51) Int. Cl.
*G06F 3/01* (2006.01)
*G06F 3/03* (2006.01)
(Continued)

(52) U.S. Cl.
CPC ............... *G06F 3/011* (2013.01); *G06F 3/03* (2013.01); *G06T 17/20* (2013.01); *G06T 19/006* (2013.01);
(Continued)

(58) Field of Classification Search
None
See application file for complete search history.

(56) References Cited

U.S. PATENT DOCUMENTS 770,149 A     9/1904  Bailey
3,055,404 A   9/1962  Anderson
(Continued)

FOREIGN PATENT DOCUMENTS

CN       111095165 B    11/2024
EP        2887322 B1     2/2020
(Continued)

OTHER PUBLICATIONS

European Search Report for European Patent Application No. 24155099.5, dated Aug. 5, 2024, 7 pages.
(Continued)

*Primary Examiner* — Michael J Cobb

(57) ABSTRACT

In one embodiment, a method includes receiving an instruction to transition to a first virtual reality (VR) environment of a first VR application, accessing attribute information of one or more real-world objects in a real-world environment proximate to a VR display device, determining, for each of the one or more real-world objects, one or more first mixed reality (MR) functionalities applicable to the real-world object based on its attribute information, and rendering, for one or more displays of the VR display device, the first VR environment with one or more MR objects corresponding to the one or more real-world objects, wherein each MR object comprises one of the first MR functionalities applicable to the corresponding real-world object.

19 Claims, 32 Drawing Sheets

(51) Int. Cl.

| | |
|---|---|
| *G06T 17/20* | (2006.01) |
| *G06T 19/00* | (2011.01) |
| *G06V 20/20* | (2022.01) |

(52) U.S. Cl.

CPC .......... *G06V 20/20* (2022.01); *G06T 2210/04* (2013.01); *G06T 2210/12* (2013.01)

(56) References Cited

U.S. PATENT DOCUMENTS

| | | | |
|---|---|---|---|
| 3,081,177 A | 3/1963 | Edward et al. | |
| 3,117,274 A | 1/1964 | Pierre | |
| 3,292,089 A | 12/1966 | Earnest | |
| 3,477,368 A | 11/1969 | Spaulding | |
| 3,530,252 A | 9/1970 | Puente | |
| 3,558,759 A | 1/1971 | Sarem | |
| 3,726,233 A | 4/1973 | Swartz | |
| 3,817,472 A | 6/1974 | Abe | |
| 3,947,351 A | 3/1976 | Asawa et al. | |
| 5,335,991 A | 8/1994 | Wobbe | |
| 5,842,175 A | 11/1998 | Andros et al. | |
| 6,748,420 B1 | 6/2004 | Quatrano et al. | |
| 6,842,175 B1 | 1/2005 | Schmalstieg et al. | |
| 6,842,877 B2 | 1/2005 | Robarts et al. | |
| 7,395,534 B2 | 7/2008 | Alcazar et al. | |
| 7,650,575 B2 | 1/2010 | Cummins et al. | |
| 7,701,439 B2 | 4/2010 | Hillis et al. | |
| 8,335,991 B2 | 12/2012 | Douceur et al. | |
| 8,368,640 B2 | 2/2013 | Dardinski et al. | |
| 8,558,759 B1 | 10/2013 | Prada Gomez et al. | |
| 8,726,233 B1 | 5/2014 | Raghavan | |
| 8,930,940 B2 | 1/2015 | Xu et al. | |
| 8,947,351 B1 | 2/2015 | Noble | |
| 8,947,427 B2 | 2/2015 | Shuster et al. | |
| 9,055,404 B2 | 6/2015 | Setlur et al. | |
| 9,081,177 B2 | 7/2015 | Wong et al. | |
| 9,117,274 B2 | 8/2015 | Liao et al. | |
| 9,129,404 B1 | 9/2015 | Wagner | |
| 9,292,089 B1 | 3/2016 | Sadek | |
| 9,424,239 B2 | 8/2016 | Dunn et al. | |
| 9,443,353 B2 | 9/2016 | Vaddadi et al. | |
| 9,477,368 B1 | 10/2016 | Filip et al. | |
| 9,478,030 B1 | 10/2016 | Lecky | |
| 9,530,252 B2 | 12/2016 | Poulos et al. | |
| 9,607,422 B1 | 3/2017 | Leedom | |
| 9,658,737 B2 | 5/2017 | Rothenberger et al. | |
| 9,817,472 B2 | 11/2017 | Lee et al. | |
| 9,870,716 B1 | 1/2018 | Rao et al. | |
| 9,922,462 B2 | 3/2018 | Miller | |
| 10,013,625 B1 | 7/2018 | Ahammad et al. | |
| 10,015,503 B1 | 7/2018 | Ahammad | |
| 10,220,303 B1 | 3/2019 | Schmidt et al. | |
| 10,248,284 B2 | 4/2019 | Itani et al. | |
| 10,319,154 B1 | 6/2019 | Chakravarthula et al. | |
| 10,335,572 B1 | 7/2019 | Kumar | |
| 10,402,647 B2 | 9/2019 | Schuh | |
| 10,473,935 B1 | 11/2019 | Gribetz et al. | |
| 10,521,944 B2 | 12/2019 | Sareen et al. | |
| 10,551,993 B1 | 2/2020 | Sanocki et al. | |
| 10,715,851 B1 | 7/2020 | Shankar et al. | |
| 10,783,714 B2 | 9/2020 | Diament et al. | |
| 10,799,792 B2 | 10/2020 | Rios | |
| 10,803,663 B2 | 10/2020 | Wang et al. | |
| 10,803,862 B2 | 10/2020 | Jang et al. | |
| 10,841,292 B2 | 11/2020 | Soon-Shiong | |
| 10,902,679 B2 | 1/2021 | Molyneaux et al. | |
| 10,909,762 B2 | 2/2021 | Karalis et al. | |
| 10,950,034 B1 | 3/2021 | Garcia et al. | |
| 10,963,144 B2 | 3/2021 | Fox et al. | |
| 10,996,915 B2 | 5/2021 | Kim | |
| 11,009,716 B2 | 5/2021 | Kiemele et al. | |
| 11,017,609 B1 | 5/2021 | Buzzerio et al. | |
| 11,064,047 B1 | 7/2021 | Stegall et al. | |
| 11,068,393 B2 | 7/2021 | Mandaleeka | |
| 11,100,812 B2 | 8/2021 | Daniel et al. | |
| 11,113,893 B1 | 9/2021 | Ma et al. | |
| 11,126,320 B1 | 9/2021 | Thompson et al. | |
| 11,126,845 B1 | 9/2021 | Chaturvedi | |
| 11,132,052 B2 | 9/2021 | Baumbach et al. | |
| 11,170,576 B2 | 11/2021 | Ravasz et al. | |
| 11,176,755 B1 | 11/2021 | Tichenor et al. | |
| 11,178,376 B1 | 11/2021 | Tichenor et al. | |
| 11,216,152 B2 | 1/2022 | Alexander | |
| 11,227,445 B1 | 1/2022 | Tichenor et al. | |
| 11,238,664 B1 | 2/2022 | Tavakoli et al. | |
| 11,256,341 B1 | 2/2022 | Kin et al. | |
| 11,257,292 B2 * | 2/2022 | Costa ................. G02B 27/0172 |
| 11,270,513 B2 | 3/2022 | Yerli | |
| 11,270,522 B1 | 3/2022 | Tauber et al. | |
| 11,307,647 B2 | 4/2022 | Bond et al. | |
| 11,409,405 B1 | 8/2022 | Hlavac et al. | |
| 11,417,054 B1 | 8/2022 | Tanner et al. | |
| 11,433,304 B2 | 9/2022 | Fish et al. | |
| 11,467,656 B2 | 10/2022 | Spivack | |
| 11,521,361 B1 | 12/2022 | Taguchi et al. | |
| 11,593,997 B2 | 2/2023 | Smith et al. | |
| 11,636,655 B2 | 4/2023 | Ma et al. | |
| 11,651,573 B2 | 5/2023 | Tichenor et al. | |
| 11,676,348 B2 | 6/2023 | Simpson et al. | |
| 11,720,167 B2 | 8/2023 | Bond et al. | |
| 11,748,944 B2 | 9/2023 | Karadayi et al. | |
| 11,762,952 B2 | 9/2023 | Hlavac et al. | |
| 11,769,304 B2 | 9/2023 | Tichenor et al. | |
| 11,798,247 B2 | 10/2023 | Karadayi et al. | |
| 11,847,753 B2 | 12/2023 | Tichenor et al. | |
| 11,928,308 B2 | 3/2024 | Hlavac et al. | |
| 11,935,208 B2 | 3/2024 | Karadayi et al. | |
| 12,026,527 B2 | 7/2024 | Blakeley et al. | |
| 12,130,998 B1 | 10/2024 | Roben | |
| 2003/0038805 A1 | 2/2003 | Wong et al. | |
| 2003/0106063 A1 | 6/2003 | Guedalia | |
| 2004/0113885 A1 * | 6/2004 | Genc ........................ G06F 3/011 |
| | | | 345/156 |
| 2004/0237082 A1 | 11/2004 | Alcazar et al. | |
| 2005/0018216 A1 | 1/2005 | Barsness et al. | |
| 2008/0089587 A1 | 4/2008 | Kim et al. | |
| 2008/0092111 A1 | 4/2008 | Kinnucan et al. | |
| 2009/0006937 A1 | 1/2009 | Knapp et al. | |
| 2009/0063381 A1 | 3/2009 | Chan et al. | |
| 2009/0106234 A1 | 4/2009 | Siedlecki et al. | |
| 2009/0164913 A1 | 6/2009 | Davar et al. | |
| 2009/0199128 A1 | 8/2009 | Matthews et al. | |
| 2009/0307623 A1 | 12/2009 | Agarawala et al. | |
| 2009/0313299 A1 | 12/2009 | Bonev et al. | |
| 2010/0251177 A1 | 9/2010 | Geppert et al. | |
| 2010/0306716 A1 | 12/2010 | Perez | |
| 2011/0185043 A1 | 7/2011 | Zeller et al. | |
| 2011/0267265 A1 | 11/2011 | Stinson | |
| 2012/0069168 A1 | 3/2012 | Huang et al. | |
| 2012/0143358 A1 | 6/2012 | Adams et al. | |
| 2012/0188279 A1 | 7/2012 | Demaine | |
| 2012/0206345 A1 | 8/2012 | Langridge | |
| 2012/0218301 A1 | 8/2012 | Miller | |
| 2012/0249741 A1 | 10/2012 | Maciocci et al. | |
| 2012/0275686 A1 | 11/2012 | Wilson et al. | |
| 2012/0293544 A1 | 11/2012 | Miyamoto et al. | |
| 2013/0051615 A1 | 2/2013 | Lim et al. | |
| 2013/0063345 A1 | 3/2013 | Maeda | |
| 2013/0069860 A1 | 3/2013 | Davidson | |
| 2013/0076788 A1 | 3/2013 | Ben Zvi | |
| 2013/0083173 A1 | 4/2013 | Geisner et al. | |
| 2013/0117688 A1 | 5/2013 | Yerli | |
| 2013/0125066 A1 | 5/2013 | Klein et al. | |
| 2013/0141419 A1 | 6/2013 | Mount et al. | |
| 2013/0147793 A1 | 6/2013 | Jeon et al. | |
| 2013/0169682 A1 | 7/2013 | Novak et al. | |
| 2013/0254884 A1 | 9/2013 | Dalcher et al. | |
| 2013/0265220 A1 | 10/2013 | Fleischmann et al. | |
| 2013/0293468 A1 | 11/2013 | Perez et al. | |
| 2013/0336629 A1 | 12/2013 | Mulholland et al. | |
| 2014/0075370 A1 | 3/2014 | Guerin et al. | |
| 2014/0114845 A1 | 4/2014 | Rogers et al. | |
| 2014/0125598 A1 | 5/2014 | Cheng et al. | |
| 2014/0149901 A1 | 5/2014 | Hunter | |
| 2014/0225922 A1 | 8/2014 | Sbardella | |

(56) References Cited

U.S. PATENT DOCUMENTS

| | | | |
|---|---|---|---|
| 2014/0236996 A1 | 8/2014 | Masuko et al. | |
| 2014/0268065 A1 | 9/2014 | Ishikawa et al. | |
| 2014/0270494 A1 | 9/2014 | Sawhney et al. | |
| 2014/0357366 A1 | 12/2014 | Koganezawa et al. | |
| 2014/0375683 A1 | 12/2014 | Salter et al. | |
| 2014/0375691 A1 | 12/2014 | Kasahara | |
| 2015/0015504 A1 | 1/2015 | Lee et al. | |
| 2015/0035746 A1 | 2/2015 | Cockburn et al. | |
| 2015/0054742 A1 | 2/2015 | Imoto et al. | |
| 2015/0062160 A1 | 3/2015 | Sakamoto et al. | |
| 2015/0074506 A1 | 3/2015 | Dunn et al. | |
| 2015/0074742 A1 | 3/2015 | Kohno et al. | |
| 2015/0077592 A1 | 3/2015 | Fahey | |
| 2015/0123966 A1 | 5/2015 | Newman | |
| 2015/0143302 A1 | 5/2015 | Chang et al. | |
| 2015/0153833 A1 | 6/2015 | Pinault et al. | |
| 2015/0160736 A1 | 6/2015 | Fujiwara | |
| 2015/0169076 A1 | 6/2015 | Cohen et al. | |
| 2015/0181679 A1 | 6/2015 | Liao et al. | |
| 2015/0206321 A1 | 7/2015 | Scavezze et al. | |
| 2015/0213371 A1 | 7/2015 | Nitz et al. | |
| 2015/0220150 A1 | 8/2015 | Plagemann et al. | |
| 2015/0243079 A1* | 8/2015 | Cho | G02B 27/017 |
| | | | 345/633 |
| 2015/0253862 A1 | 9/2015 | Seo et al. | |
| 2015/0261659 A1 | 9/2015 | Bader et al. | |
| 2015/0269780 A1 | 9/2015 | Herman et al. | |
| 2015/0356774 A1 | 12/2015 | Gal et al. | |
| 2016/0026253 A1 | 1/2016 | Bradski et al. | |
| 2016/0063762 A1 | 3/2016 | Heuvel et al. | |
| 2016/0110052 A1 | 4/2016 | Kim et al. | |
| 2016/0133170 A1 | 5/2016 | Fateh | |
| 2016/0147308 A1 | 5/2016 | Gelman et al. | |
| 2016/0147408 A1 | 5/2016 | Bevis et al. | |
| 2016/0170603 A1 | 6/2016 | Bastien et al. | |
| 2016/0180590 A1 | 6/2016 | Kamhi et al. | |
| 2016/0189386 A1 | 6/2016 | Michaelraj et al. | |
| 2016/0260261 A1 | 9/2016 | Hsu | |
| 2016/0378291 A1 | 12/2016 | Pokrzywka | |
| 2017/0041388 A1 | 2/2017 | Tal et al. | |
| 2017/0060230 A1 | 3/2017 | Faaborg et al. | |
| 2017/0069134 A1* | 3/2017 | Shapira | G06F 3/011 |
| 2017/0075420 A1 | 3/2017 | Yu et al. | |
| 2017/0076500 A1 | 3/2017 | Maggiore et al. | |
| 2017/0084051 A1 | 3/2017 | Weising et al. | |
| 2017/0099295 A1 | 4/2017 | Ricci | |
| 2017/0109936 A1 | 4/2017 | Powderly et al. | |
| 2017/0124230 A1 | 5/2017 | Liu et al. | |
| 2017/0139478 A1 | 5/2017 | Jeon et al. | |
| 2017/0192513 A1 | 7/2017 | Karmon et al. | |
| 2017/0237789 A1 | 8/2017 | Harner et al. | |
| 2017/0242675 A1 | 8/2017 | Deshmukh | |
| 2017/0243465 A1 | 8/2017 | Bourne, Jr. et al. | |
| 2017/0258526 A1 | 9/2017 | Lang | |
| 2017/0262063 A1 | 9/2017 | Blénessy et al. | |
| 2017/0278304 A1 | 9/2017 | Hildreth et al. | |
| 2017/0287225 A1 | 10/2017 | Powderly et al. | |
| 2017/0296363 A1 | 10/2017 | Yetkin et al. | |
| 2017/0311129 A1 | 10/2017 | Lopez-Uricoechea et al. | |
| 2017/0323488 A1 | 11/2017 | Mott et al. | |
| 2017/0364198 A1 | 12/2017 | Yoganandan et al. | |
| 2017/0372225 A1 | 12/2017 | Foresti | |
| 2018/0005429 A1 | 1/2018 | Osman et al. | |
| 2018/0007099 A1 | 1/2018 | Ein-Gil et al. | |
| 2018/0059901 A1 | 3/2018 | Gullicksen | |
| 2018/0082480 A1 | 3/2018 | White et al. | |
| 2018/0095616 A1 | 4/2018 | Valdivia et al. | |
| 2018/0095635 A1 | 4/2018 | Valdivia et al. | |
| 2018/0095636 A1 | 4/2018 | Valdivia et al. | |
| 2018/0096507 A1 | 4/2018 | Valdivia et al. | |
| 2018/0096519 A1 | 4/2018 | Tokubo | |
| 2018/0098059 A1 | 4/2018 | Valdivia et al. | |
| 2018/0107278 A1 | 4/2018 | Goel et al. | |
| 2018/0113599 A1 | 4/2018 | Yin | |
| 2018/0158134 A1 | 6/2018 | Hassan | |
| 2018/0189568 A1 | 7/2018 | Powderly et al. | |
| 2018/0189647 A1 | 7/2018 | Calvo et al. | |
| 2018/0300557 A1 | 10/2018 | Rodenas et al. | |
| 2018/0307303 A1 | 10/2018 | Powderly et al. | |
| 2018/0314484 A1 | 11/2018 | Pahud et al. | |
| 2018/0315162 A1 | 11/2018 | Sturm et al. | |
| 2018/0322701 A1 | 11/2018 | Pahud et al. | |
| 2018/0323972 A1 | 11/2018 | Reed et al. | |
| 2018/0335925 A1 | 11/2018 | Hsiao et al. | |
| 2018/0350144 A1 | 12/2018 | Rathod | |
| 2018/0357780 A1 | 12/2018 | Young et al. | |
| 2018/0365897 A1 | 12/2018 | Pahud et al. | |
| 2019/0005724 A1 | 1/2019 | Pahud et al. | |
| 2019/0018498 A1 | 1/2019 | West et al. | |
| 2019/0043259 A1* | 2/2019 | Wang | G06F 3/012 |
| 2019/0094981 A1 | 3/2019 | Bradski et al. | |
| 2019/0096131 A1 | 3/2019 | Crews et al. | |
| 2019/0107894 A1 | 4/2019 | Hebbalaguppe et al. | |
| 2019/0107991 A1 | 4/2019 | Spivack et al. | |
| 2019/0108578 A1 | 4/2019 | Spivack et al. | |
| 2019/0108682 A1 | 4/2019 | Spivack et al. | |
| 2019/0114061 A1 | 4/2019 | Daniels et al. | |
| 2019/0130656 A1 | 5/2019 | Gebbie et al. | |
| 2019/0130788 A1 | 5/2019 | Seaton | |
| 2019/0155481 A1 | 5/2019 | Diverdi et al. | |
| 2019/0163700 A1 | 5/2019 | Baumgardner et al. | |
| 2019/0172262 A1 | 6/2019 | McHugh et al. | |
| 2019/0197785 A1 | 6/2019 | Tate-Gans et al. | |
| 2019/0212827 A1 | 7/2019 | Kin et al. | |
| 2019/0213792 A1 | 7/2019 | Jakubzak et al. | |
| 2019/0221035 A1* | 7/2019 | Clark | A63F 13/5255 |
| 2019/0228589 A1 | 7/2019 | Dascola et al. | |
| 2019/0235729 A1 | 8/2019 | Day et al. | |
| 2019/0237044 A1 | 8/2019 | Day et al. | |
| 2019/0258318 A1 | 8/2019 | Qin et al. | |
| 2019/0278376 A1 | 9/2019 | Kutliroff et al. | |
| 2019/0278432 A1 | 9/2019 | Bennett et al. | |
| 2019/0279424 A1 | 9/2019 | Clausen et al. | |
| 2019/0279426 A1 | 9/2019 | Musunuri et al. | |
| 2019/0286231 A1 | 9/2019 | Burns et al. | |
| 2019/0294721 A1 | 9/2019 | Keifer et al. | |
| 2019/0294889 A1 | 9/2019 | Sriram et al. | |
| 2019/0340799 A1 | 11/2019 | Dryer et al. | |
| 2019/0340833 A1 | 11/2019 | Furtwangler et al. | |
| 2019/0362562 A1 | 11/2019 | Benson | |
| 2019/0369391 A1 | 12/2019 | Cordesses et al. | |
| 2019/0371060 A1 | 12/2019 | Energin et al. | |
| 2019/0371279 A1 | 12/2019 | Mak | |
| 2019/0377406 A1 | 12/2019 | Steptoe et al. | |
| 2019/0377416 A1 | 12/2019 | Alexander | |
| 2019/0377487 A1 | 12/2019 | Bailey et al. | |
| 2019/0377538 A1* | 12/2019 | Jones | G06F 3/011 |
| 2019/0385371 A1 | 12/2019 | Joyce et al. | |
| 2020/0013211 A1 | 1/2020 | Bergen et al. | |
| 2020/0042108 A1 | 2/2020 | Wan | |
| 2020/0065584 A1* | 2/2020 | Iyer | G06T 7/70 |
| 2020/0066047 A1 | 2/2020 | Karalis et al. | |
| 2020/0082629 A1 | 3/2020 | Jones et al. | |
| 2020/0097077 A1 | 3/2020 | Nguyen et al. | |
| 2020/0097091 A1 | 3/2020 | Chou et al. | |
| 2020/0111256 A1 | 4/2020 | Bleyer et al. | |
| 2020/0151965 A1 | 5/2020 | Forbes et al. | |
| 2020/0218423 A1 | 7/2020 | Ohashi | |
| 2020/0219319 A1 | 7/2020 | Lashmar et al. | |
| 2020/0225736 A1 | 7/2020 | Schwarz et al. | |
| 2020/0225758 A1 | 7/2020 | Tang et al. | |
| 2020/0226814 A1 | 7/2020 | Tang et al. | |
| 2020/0226823 A1 | 7/2020 | Stachniak et al. | |
| 2020/0241300 A1 | 7/2020 | Robinson et al. | |
| 2020/0242842 A1 | 7/2020 | Fukazawa et al. | |
| 2020/0279386 A1 | 9/2020 | Da Veiga | |
| 2020/0279429 A1 | 9/2020 | Upadhyay et al. | |
| 2020/0285761 A1 | 9/2020 | Buck et al. | |
| 2020/0289934 A1 | 9/2020 | Azmandian et al. | |
| 2020/0312028 A1 | 10/2020 | Charvat et al. | |
| 2020/0334908 A1 | 10/2020 | Wilson et al. | |
| 2020/0342673 A1 | 10/2020 | Lohr et al. | |
| 2020/0351273 A1 | 11/2020 | Thomas | |
| 2020/0363924 A1 | 11/2020 | Flexman et al. | |

(56) References Cited

U.S. PATENT DOCUMENTS

| | | |
|---|---|---|
| 2020/0363930 A1 | 11/2020 | Srinivasan et al. |
| 2020/0368616 A1 | 11/2020 | Delamont |
| 2020/0375666 A1 | 12/2020 | Murphy |
| 2020/0394935 A1 | 12/2020 | Ray et al. |
| 2020/0402320 A1 | 12/2020 | Crews et al. |
| 2021/0012113 A1 | 1/2021 | Petill et al. |
| 2021/0014408 A1 | 1/2021 | Timonen et al. |
| 2021/0096726 A1 | 4/2021 | Faulkner et al. |
| 2021/0097768 A1 | 4/2021 | Malia et al. |
| 2021/0103449 A1 | 4/2021 | Terpstra et al. |
| 2021/0111890 A1 | 4/2021 | Reed et al. |
| 2021/0124821 A1 | 4/2021 | Spivak et al. |
| 2021/0125414 A1 | 4/2021 | Berkebile |
| 2021/0126823 A1 | 4/2021 | Poess et al. |
| 2021/0158608 A1 | 5/2021 | Boggs et al. |
| 2021/0183114 A1 | 6/2021 | Corson |
| 2021/0191600 A1 | 6/2021 | Lemay et al. |
| 2021/0192856 A1 | 6/2021 | Lee |
| 2021/0272375 A1 | 9/2021 | Lashmar et al. |
| 2021/0295602 A1 | 9/2021 | Scapel et al. |
| 2021/0306238 A1 | 9/2021 | Cheng et al. |
| 2021/0322856 A1 | 10/2021 | Mrkar et al. |
| 2021/0373741 A1 | 12/2021 | Agarawala et al. |
| 2021/0378768 A1 | 12/2021 | Olson et al. |
| 2021/0390765 A1 | 12/2021 | Laaksonen et al. |
| 2022/0038522 A1 | 2/2022 | Goolkasian et al. |
| 2022/0068035 A1 | 3/2022 | Tichenor et al. |
| 2022/0084279 A1 | 3/2022 | Lindmeier et al. |
| 2022/0091722 A1 | 3/2022 | Faulkner et al. |
| 2022/0100265 A1 | 3/2022 | Kies et al. |
| 2022/0100279 A1 | 3/2022 | Lee et al. |
| 2022/0101612 A1 | 3/2022 | Palangie et al. |
| 2022/0121344 A1 | 4/2022 | Pastrana Vicente et al. |
| 2022/0122329 A1 | 4/2022 | Tichenor et al. |
| 2022/0139052 A1 | 5/2022 | Tavakoli et al. |
| 2022/0161422 A1 | 5/2022 | Chen et al. |
| 2022/0211188 A1 | 7/2022 | Daub et al. |
| 2022/0261088 A1 | 8/2022 | Pinchon et al. |
| 2022/0276765 A1 | 9/2022 | Hlavac et al. |
| 2022/0318035 A1 | 10/2022 | Garstenauer et al. |
| 2022/0358715 A1 | 11/2022 | Tanner et al. |
| 2022/0392169 A1 | 12/2022 | Simpson et al. |
| 2022/0406021 A1 | 12/2022 | LeBeau et al. |
| 2022/0414403 A1 | 12/2022 | Hlavac et al. |
| 2023/0004943 A1 | 1/2023 | Øhrn et al. |
| 2023/0016490 A1 | 1/2023 | Berkebile |
| 2023/0022194 A1 | 1/2023 | Soryal |
| 2023/0056976 A1 | 2/2023 | Tanner et al. |
| 2023/0126837 A1 | 4/2023 | Karadayi et al. |
| 2023/0127438 A1 | 4/2023 | Karadayi et al. |
| 2023/0134355 A1 | 5/2023 | Lansel et al. |
| 2023/0152851 A1 | 5/2023 | Berliner et al. |
| 2023/0168737 A1 | 6/2023 | Pratt et al. |
| 2023/0169737 A1 | 6/2023 | Taguchi et al. |
| 2023/0196766 A1 | 6/2023 | Pla I Conesa et al. |
| 2023/0215120 A1 | 7/2023 | Ma et al. |
| 2023/0221797 A1 | 7/2023 | Louie et al. |
| 2023/0244755 A1 | 8/2023 | Hlavac et al. |
| 2023/0245386 A1 | 8/2023 | Karadayi et al. |
| 2023/0260000 A1 | 8/2023 | Belavy |
| 2023/0260233 A1 | 8/2023 | Goncalves et al. |
| 2023/0290089 A1 | 9/2023 | Simpson et al. |
| 2023/0367611 A1 | 11/2023 | Blakeley et al. |
| 2023/0384859 A1 | 11/2023 | Bond et al. |
| 2023/0410436 A1 | 12/2023 | Beauchamp et al. |
| 2023/0419616 A1 | 12/2023 | Dudovitch et al. |
| 2023/0419998 A1 | 12/2023 | Nguyen et al. |
| 2024/0045495 A1 | 2/2024 | Elhadad et al. |
| 2024/0095699 A1 | 3/2024 | Sinha et al. |
| 2024/0126406 A1 | 4/2024 | Hlavac et al. |
| 2024/0153205 A1 | 5/2024 | Huergo Wagner et al. |
| 2024/0233292 A1 | 7/2024 | Tichenor et al. |
| 2024/0250955 A1 | 7/2024 | Lebeau et al. |
| 2024/0264851 A1 | 8/2024 | Blakeley et al. |
| 2024/0288995 A1 | 8/2024 | Short et al. |
| 2024/0310992 A1 | 9/2024 | Wan et al. |
| 2024/0311498 A1 | 9/2024 | Millberg et al. |
| 2024/0312143 A1 | 9/2024 | Millberg et al. |
| 2024/0331278 A1 | 10/2024 | Arora et al. |
| 2024/0331287 A1 | 10/2024 | Karadayi et al. |
| 2024/0331312 A1 | 10/2024 | Freeman et al. |
| 2024/0331320 A1 | 10/2024 | Taguchi et al. |
| 2024/0361837 A1 | 10/2024 | Louie et al. |
| 2024/0402869 A1 | 12/2024 | Boesel et al. |
| 2025/0036431 A1 | 1/2025 | Han et al. |
| 2025/0166322 A1 | 5/2025 | Simpson et al. |

FOREIGN PATENT DOCUMENTS

| | | |
|---|---|---|
| EP | 4439247 A1 | 10/2024 |
| EP | 4439248 A1 | 10/2024 |
| JP | 2019101743 A | 6/2019 |
| JP | 2022147265 A | 10/2022 |
| WO | 2014097706 A1 | 6/2014 |
| WO | 2015192117 A1 | 12/2015 |
| WO | 2016041088 A1 | 3/2016 |
| WO | 2018235371 A1 | 12/2018 |
| WO | 2019143839 A1 | 7/2019 |
| WO | 2020159302 A1 | 8/2020 |
| WO | 2020226832 A1 | 11/2020 |
| WO | 2021163373 A1 | 8/2021 |
| WO | 2022055822 A1 | 3/2022 |

OTHER PUBLICATIONS

European Search Report for European Patent Application No. 24155337.9, dated Jul. 2, 2024, 7 pages.

European Search Report for European Patent Application No. 24156842.7, dated Jun. 25, 2024, 6 pages.

International Preliminary Report on Patentability for International Application No. PCT/US2022/053780, mailed Jul. 4, 2024, 9 pages.

International Preliminary Report on Patentability for International Application No. PCT/US2022/054413, mailed Jul. 25, 2024, 9 pages.

Office Action mailed Jun. 25, 2024 for Japanese Patent Application No. 2021-577408, filed on Aug. 8, 2020, 4 pages.

Tatzgern M., et al., "Adaptive Information Density for Augmented Reality Displays," IEEE Virtual Reality Conference, Mar. 19-23, 2016, pp. 83-92.

Advisory Action mailed Oct. 13, 2021 for U.S. Appl. No. 16/567,563, filed Sep. 11, 2019, 3 pages.

"App Clips," Apple Developer, 2022, 4 pages, Retrieved from the Internet: URL: https://developer.apple.com/app-clips/.

Broitman A., "Learn and Do More with Lens in Google Images," Oct. 25, 2018, Retrieved from the Internet: URL: https://www.blog.google/products/search/learn-and-do-more-lens-google-images/, 4 pages.

Final Office Action mailed Aug. 5, 2021 for U.S. Appl. No. 16/567,563, filed Sep. 11, 2019, 11 Pages.

Fleury C., et al., "A Generic Model for Embedding Users' Physical Workspaces into Multi-Scale Collaborative Virtual Environments," 20th International Conference on Artificial Reality and Telexistence, Dec. 3, 2010, 8 pages.

"Google Play Instant," Retrieved on [Jan. 27, 2022], 2 pages, Retrieved from the Internet: URL: https://developer.android.com/topic/google-pl ay-instant.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/045538, mailed Mar. 24, 2022, 9 pages.

International Preliminary Report on Patentability for International Application No. PCT/US2021/044098, mailed Mar. 9, 2023, 18 pages.

International Preliminary Report on Patentability for International Application No. PCT/US2022/032288, mailed Jan. 11, 2024, 10 pages.

(56)                    References Cited

OTHER PUBLICATIONS

International Preliminary Report on Patentability for International Application No. PCT/US2022/033338, mailed Jan. 11, 2024, 11 pages.
International Preliminary Report on Patentability for International Application No. PCT/US2022/040484, mailed Feb. 29, 2024, 9 pages.
International Search Report and Written Opinion for International Application No. PCT/US2020/045538, mailed Oct. 23, 2020, 11 Pages.
International Search Report and Written Opinion for International Application No. PCT/US2020/051763, mailed Feb. 3, 2021, 11 Pages.
International Search Report and Written Opinion for International Application No. PCT/US2022/020292 mailed Aug. 17, 2022, 17 pages.
International Search Report and Written Opinion for International Application No. PCT/US2022/031840, mailed Sep. 13, 2022, 13 pages.
International Search Report and Written Opinion for International Application No. PCT/US2022/032288, mailed Sep. 16, 2022, 11 pages.
International Search Report and Written Opinion for International Application No. PCT/US2022/033338 mailed Sep. 6, 2022, 13 pages.
International Search Report and Written Opinion for International Application No. PCT/US2022/040484, mailed Nov. 25, 2022, 11 pages.
International Search Report and Written Opinion for International Application No. PCT/US2022/045510, mailed Jan. 19, 2023, 10 pages.
International Search Report and Written Opinion for International Application No. PCT/US2022/053780, mailed Mar. 20, 2023, 10 pages.
International Search Report and Written Opinion for International Application No. PCT/US2022/054413, mailed Jul. 7, 2023, 11 pages.
International Search Report and Written Opinion for International Application No. PCT/US2023/021312, mailed Aug. 24, 2023, 15 pages.
Invitation to Pay Additional Fees for International Application No. PCT/US2021/044098, Nov. 3, 2021, 15 pages.
Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Melnick K., "Google Rolls out New AR Features for Its Lens APP," May 28, 2019, Retrieved from the Internet: URL: https://vrscout.com/news/new-ar-features-google-lens/, 3 pages.
Non-Final Office Action mailed Dec. 8, 2022 for U.S. Appl. No. 17/659,431, filed Apr. 15, 2022, 12 pages.
Non-Final Office Action mailed Jan. 25, 2021 for U.S. Appl. No. 16/567,563, filed Sep. 11, 2019, 10 Pages.
Notice of Allowance mailed Dec. 21, 2021 for U.S. Appl. No. 16/567,563, filed Sep. 11, 2019, 6 pages.
Notice of Allowance mailed Mar. 21, 2023 for U.S. Appl. No. 17/659,431, filed Apr. 15, 2022, 5 pages.

Office Action mailed Aug. 21, 2023 for Chinese Application No. 202080054473.3, filed Aug. 8, 2020, 7 pages.
Office Action mailed Feb. 26, 2024 for European Patent Application No. 20761419.9, filed on Aug. 8, 2020, 7 pages.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Prosecution History of U.S. Appl. No. 16/567,563 dated Jan. 25, 2021, through Dec. 21, 2021, 52 pages.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et aL, "EyePointing: A Gaze-Based Selection Technique," Proceedings of Mensch and Computer, Hamburg, Germany, Sep. 8-11, 2019, pp. 719-723.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Vitzthum A., "SSIML/Behaviour: Designing Behaviour and Animation of Graphical Objects in Virtual Reality and Multimedia Applications," Proceedings of the Seventh IEEE International Symposium on Multimedia, Dec. 12, 2005, 9 pages.
Wikipedia: "Simultaneous Localization and Mapping," Jul. 25, 2017, 7 pages, Retrieved from the Internet: URL: https://en.wikipedia.org/w/index.php?title=Simultaneous_localization_and_mappingoldid=731478358 [Retrieved on Oct. 23, 2017].
Wikipedia, "Multiple-document Interface," May 8, 2022 [retrieved on 2023-008-16], 5 pages, Retrieved from the Internet: URL: https://web.archive.org/web/20220508091934/https://en.wikipedia.org/wiki/Multipledocument_interface.
European Search Report for European Patent Application No. 24158455.6, dated Jun. 28, 2024, 6 pages.
International Preliminary Report on Patentability for International Application No. PCT/US2023/021312, mailed Nov. 21, 2024, 14 pages.
European Search Report for European Patent Application No. 24159313.6, dated May 21, 2024, 6 pages.
International Preliminary Reporton Patentability for International Application No. PCT/US2022/045510, mailed May 10, 2024, 9 pages.
International Search Report and Written Opinion for International Application No. PCT/US2021/044098, Jan. 4, 2022, 22 pages.
Non-Final Office Action mailed May 22, 2025 for U.S. Appl. No. 18/183,597, filed Mar. 14, 2023, 23 pages.
Office Action mailed Mar. 4, 2025 for European Patent Application No. 22735726.6, filed on Jun. 1, 2022, 5 pages.
Virtus Learning Hub., "How To Use Virtual Reality In Unreal Engine 5 | Beginner Tutorial," Jul. 15, 2022, 3 pages, Retrieved from the Internet URL: https://www.youtube.com/watch?v=DiGh6MxDFds.
Office Action mailed Feb. 12, 2026 for Taiwan Application No. 111113235, filed Apr. 7, 2022, 17 pages.
Office Action mailed Apr. 16, 2026 for Chinese Application No. 202280039865.1, filed Dec. 1, 2023, 10 pages.

* cited by examiner

101 camera 105B frame 112 computing
system 110 display 114

AR display device 136 camera 105A display 114

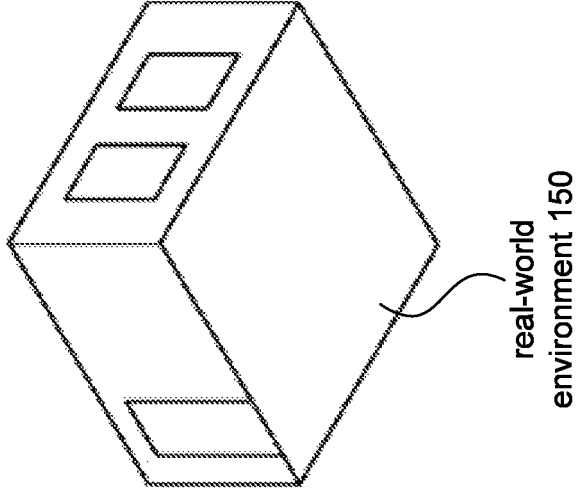
real-world
environment 150
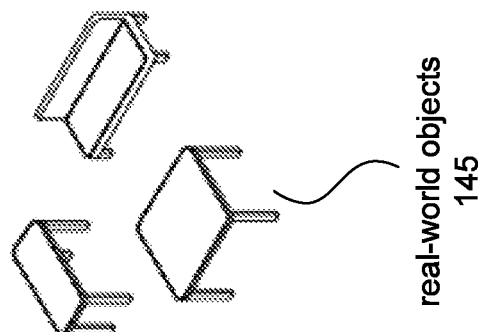
real-world objects
145
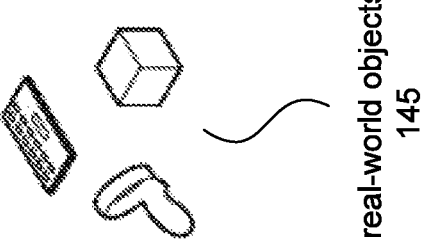
real-world objects
145
*FIG. 3* developer guidelines 172 behavior logic 171 real-world environment 150 real-world objects 145 environment map 170

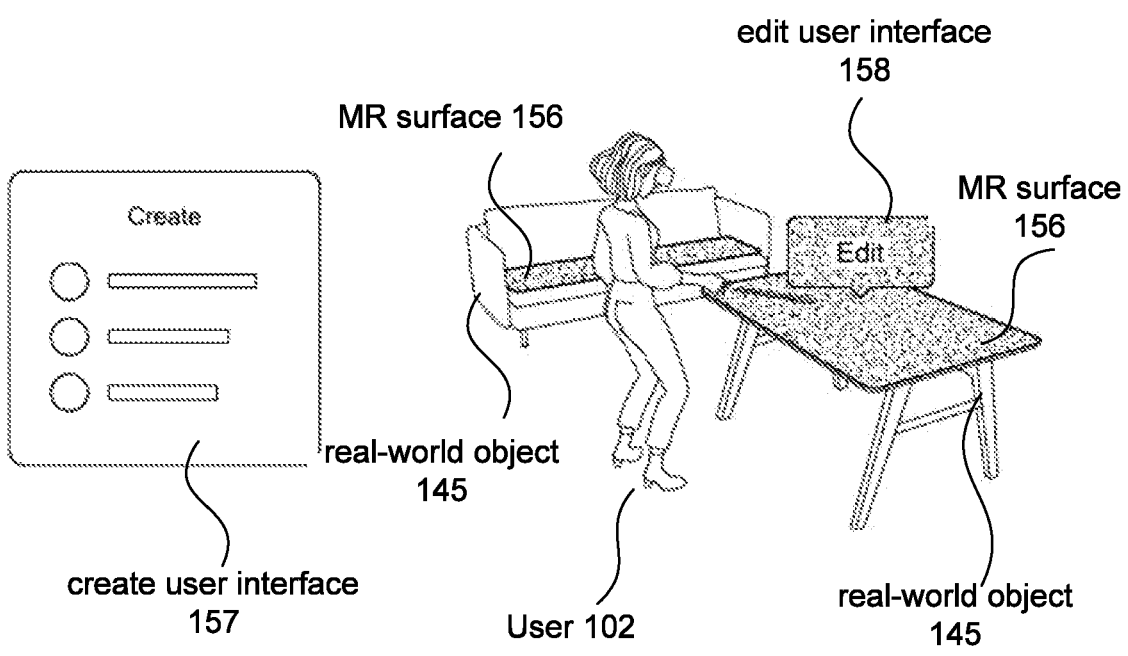
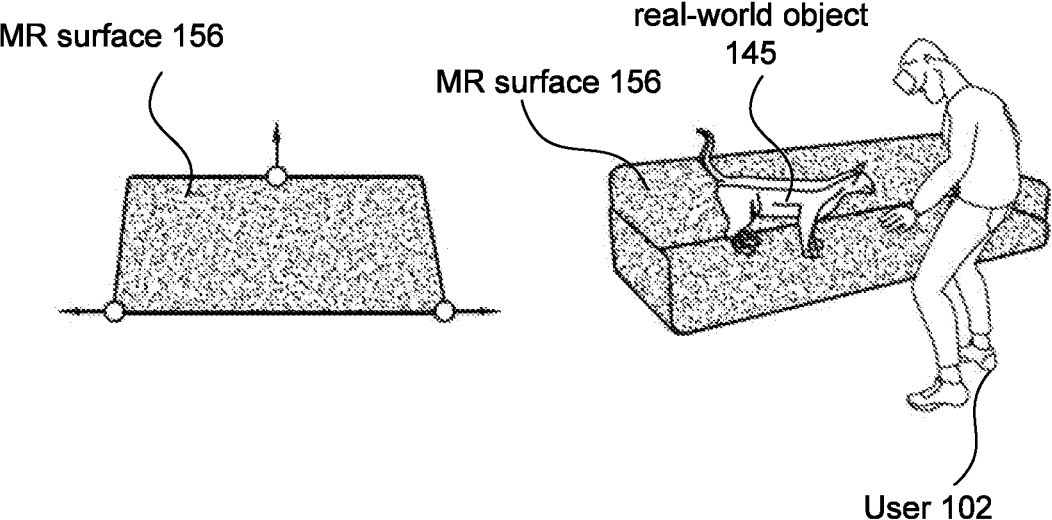
FIG. 6

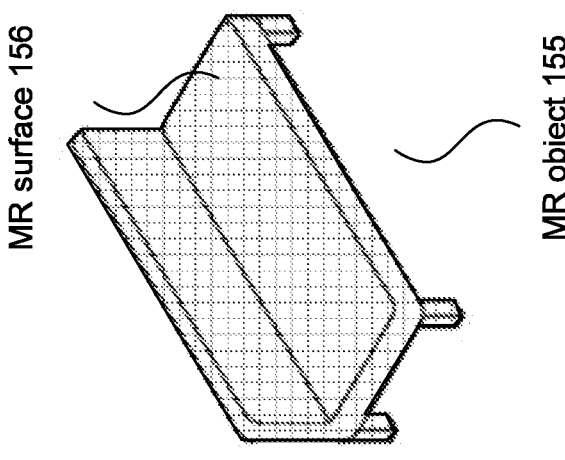
MR surface 156
MR object 155
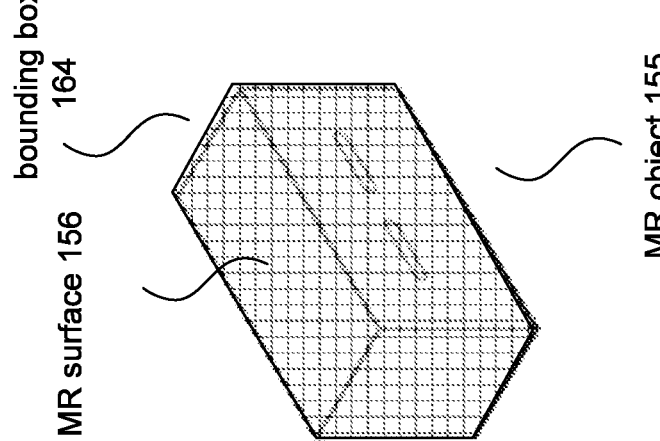
bounding box 164
MR surface 156
MR object 155
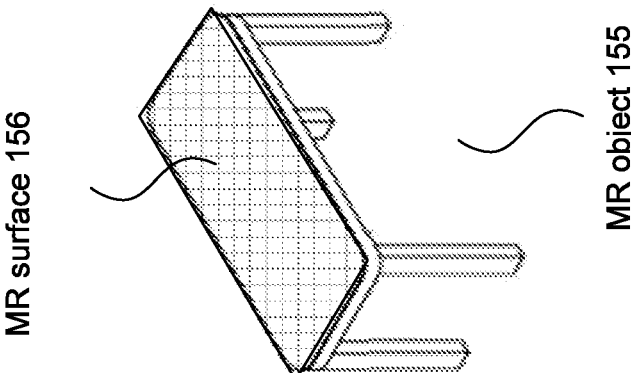
MR surface 156
MR object 155
*FIG. 7*

VR environment 160

MR object 155 user 102 real-world object 145

VR environment 160

MR object 155 user 102 real-world object 145

VR environment 160 real-world object 145 user 102

MR object 155

MR object 155

VR environment 160

MR object 155

MR object 155

MR object 155

VR environment 160

MR object 155 real-world environment 150

MR object 155 enclosure 179

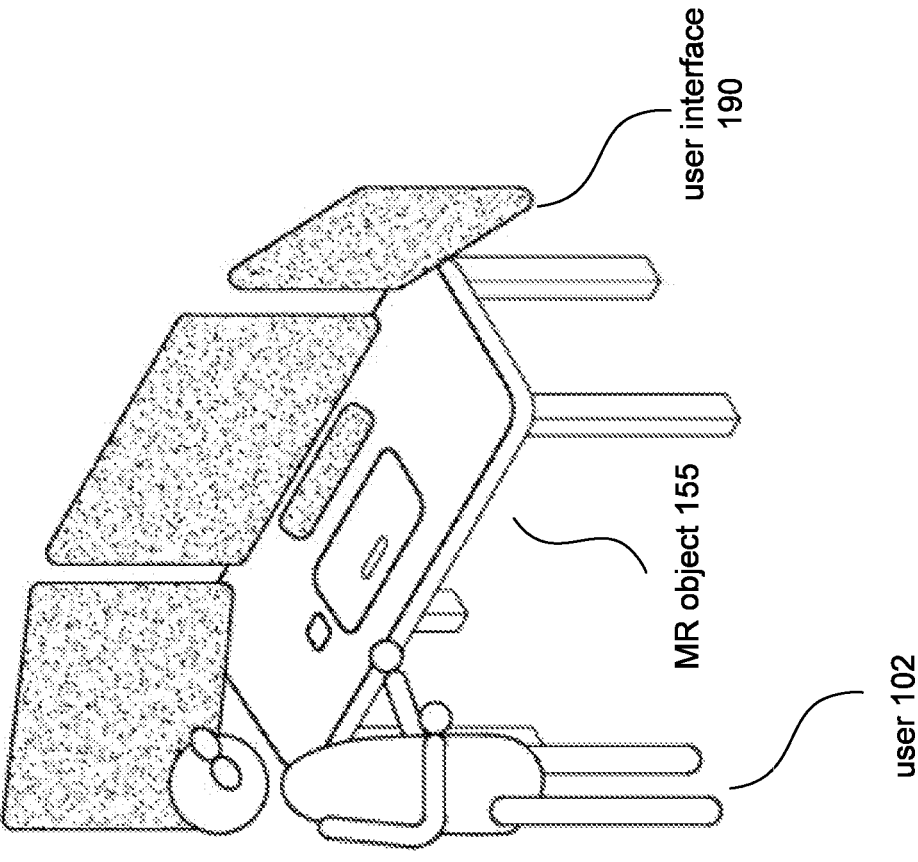
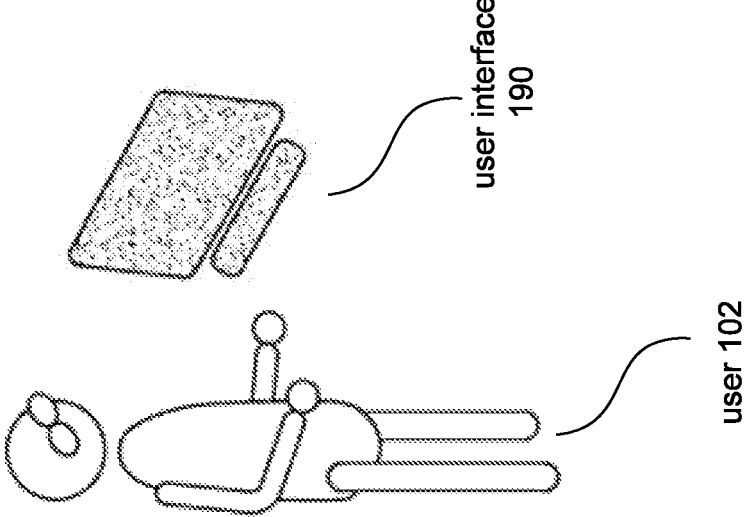
*FIG. 24*

MR surface 156 passthrough view 192 user interface
190 content 195     MR surface 156 user 102 tuner 194 virtual UI
190

MR surface 156 user 102 user 102 additional user
avatar 103

MR surface 156

MR surface 156

MR surface 156

MR object
155 user 102

MR object
155 user 102

VR object
165

VR object
165

MR object
155

Settings settings 196

<u>2800</u>

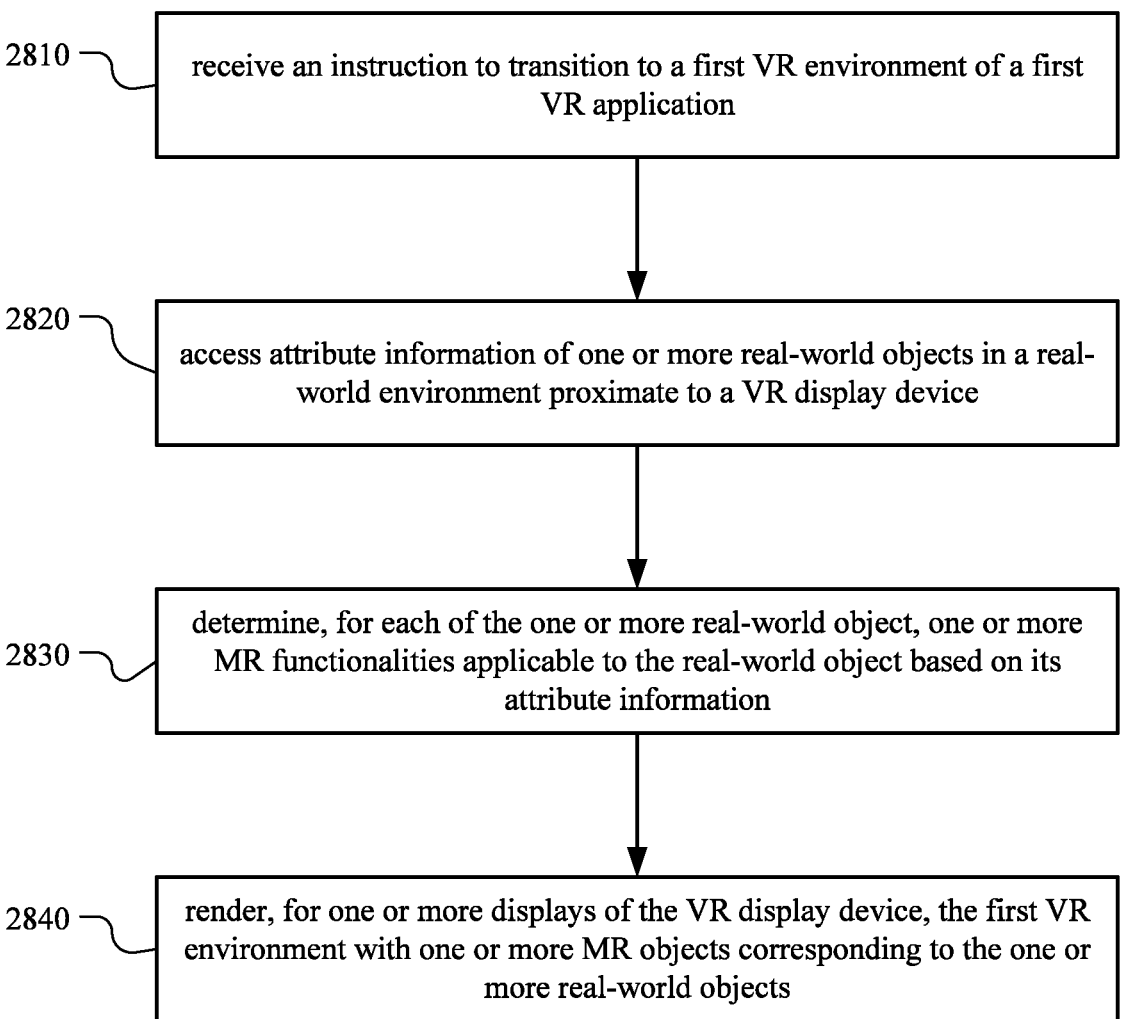

2810 — receive an instruction to transition to a first VR environment of a first VR application 2820 — access attribute information of one or more real-world objects in a real-world environment proximate to a VR display device 2830 — determine, for each of the one or more real-world object, one or more MR functionalities applicable to the real-world object based on its attribute information 2840 — render, for one or more displays of the VR display device, the first VR environment with one or more MR objects corresponding to the one or more real-world objects

*FIG. 28*

PLATFORMIZATION OF MIXED REALITY OBJECTS IN VIRTUAL REALITY ENVIRONMENTS

CROSS-REFERENCE TO RELATED APPLICATIONS

This application is a continuation of U.S. application Ser. No. 17/404,667, filed Aug. 17, 2021, titled "Platformization of Mixed Reality Objects in Virtual Reality Environments" currently pending, which is herein incorporated by reference in its entirety.

TECHNICAL FIELD

This disclosure generally relates to databases and file management within network environments, and in particular relates to mixed reality (MR) renderings in a virtual reality (VR) environment.

BACKGROUND

An existing way of incorporating a real-world object into a virtual reality (VR) environment is to render mixed reality (MR) objects that correspond to the real-world objects. Based on attributes of the real-world object, a VR application may utilize the MR object by changing the appearance of the object. For example, a real-world couch may be rendered as a park bench in an outdoor VR environment, as a log bench in a forest VR environment, or as stadium seating in a sporting event VR environment. That is, the VR application may be limited to changing just the appearance of the real-world object, but not the functionality of the MR object as the user moves from one VR application to another. In other words, the MR object may have the same functionality as its real-world counterpart.

SUMMARY OF PARTICULAR EMBODIMENTS

In particular embodiments, a virtual reality (VR) application may be able to incorporate mixed reality (MR) renderings of real-world objects from the real-world environment into a VR environment. However, the VR application may be limited to changing the appearance of the real-world object when it is rendered as a MR object. Thus, one technical challenge may be identifying and leveraging real-world objects across different VR platforms to utilize real-world objects effectively within VR environments. One solution presented by the embodiments disclosed herein to address the technical challenge of identifying and leveraging real-world objects to be generated as MR content in VR environments is by determining the underlying attributes (such as size, shape, function) of a real-world object to effectively integrate the real-world object into the VR environment as an MR object. That is, a VR system may use the attribute information of a real-world object to determine a suitable functionality for the MR object in the VR environment.

In particular embodiments, one or more computing systems may receive an instruction to transition to a first VR environment of a first VR application. The one or more computing systems may access attribute information of one or more real-world objects in a real-world environment proximate to a VR display device. The one or more computing systems may determine, for each of the one or more real-world objects, one or more first mixed reality (MR) functionalities applicable to the real-world object based on its attribute information. The one or more computing systems may render, for one or more displays of the VR display device, the first VR environment with one or more MR objects corresponding to the one or more real-world objects. Each MR object may comprise one of the first MR functionalities applicable to the corresponding real-world object. Thus, the embodiments disclosed herein may help users capture their real-world environments and then make this data accessible to other VR applications as an MR platform they can plug into—a so-called "platformization" of the MR objects.

Certain technical challenges exist for identifying and leveraging real-world objects to be generated as MR content in VR environments. One technical challenge may include integrating VR representations of other users into a first user's VR experience, where adding a floating or randomly placed avatar representing these other users may break the VR immersion experience for the first user. The solution presented by the embodiments disclosed herein to address this challenge may be to place avatars corresponding to the other users on or around MR objects to improve the co-presence of the first user and the other users. Another technical challenge may include determining what type of MR object a real-world object should be rendered as by the VR system. The solution presented by the embodiments disclosed herein to address this challenge may be to utilize a user interface to help a user classify the functionality of MR objects. Certain embodiments disclosed herein may provide one or more technical advantages. A technical advantage of the embodiments may include allowing the user to safely navigate within VR environments by integrating real-world objects as suitable MR objects, such that the user does not need to clear the real-world environment of furniture or other obstacles. Another technical advantage of the embodiments may include allowing the user to utilize a real-world object in a number of different ways as different MR objects with different functionalities according to changing VR environments. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates components of a VR system.

FIG. 6 illustrates example MR surfaces corresponding to real-world objects.

FIG. 7 illustrates example MR objects and their related MR surfaces.

FIG. 24 illustrates the user interface interacting with the MR object.

FIG. 28 illustrates an example method for leveraging real-world objects as MR objects in VR environments.

DESCRIPTION OF EXAMPLE EMBODIMENTS

In particular embodiments, a virtual reality (VR) application may be able to incorporate mixed reality (MR) renderings of real-world objects from the real-world environment into a VR environment. However, the VR application may be limited to changing the appearance of the real-world object when it is rendered as a MR object. Thus, one technical challenge may be identifying and leveraging real-world objects across different VR platforms to utilize real-world objects effectively within VR environments. One solution presented by the embodiments disclosed herein to address the technical challenge of identifying and leveraging real-world objects to be generated as MR content in VR environments is by determining the underlying attributes (such as size, shape, function) of a real-world object to effectively integrate the real-world object into the VR environment as an MR object. That is, a VR system may use the attribute information of a real-world object to determine a suitable functionality for the MR object in the VR environment. The functionality of an MR object includes the set of functions or capabilities associated with the MR object. The set of functions or capabilities may be defined by the VR application. The VR application may apply one or more MR functionalities of a real-world objects based on the attributes of real-world object. Thus, the embodiments disclosed herein may help users capture their real-world environments and then make this data accessible to other VR applications as an MR platform they can plug into-a so-called "plat-formization" of the MR objects. Although this disclosure describes incorporating mixed-reality content in particular VR applications in a particular manner, this disclosure contemplates incorporating mixed-reality content in any suitable application in any suitable manner. As an example, this disclosure contemplates incorporating mixed-reality content into augmented reality (AR) applications, where the AR system may use the attribute information of a real-world object to determine a suitable MR functionality to apply to the real-world object in the AR environment.

Figure 1A:
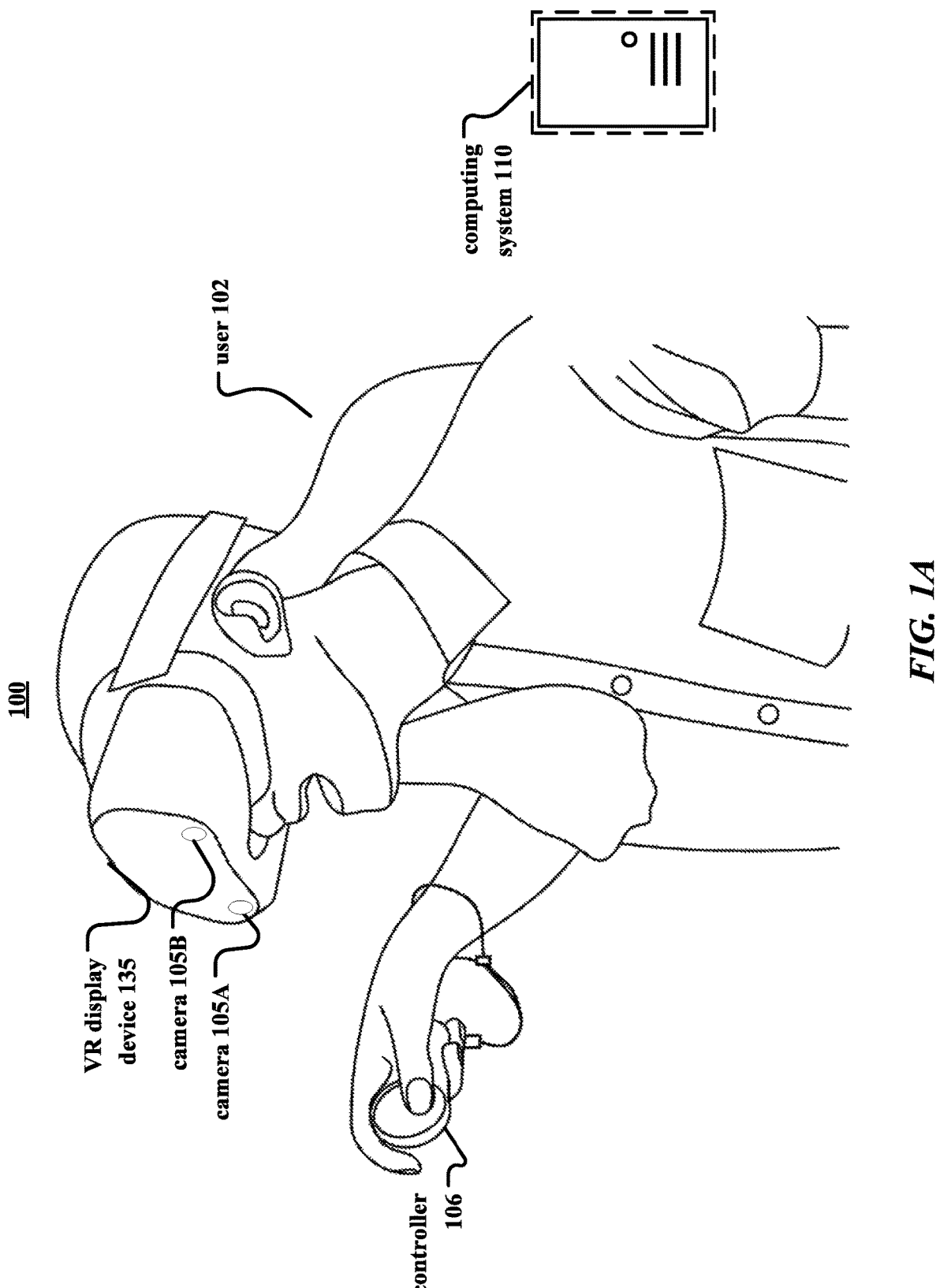
FIG. 1A illustrates an example virtual reality system worn by a user.

FIG. 1A illustrates an example of a virtual reality system 100 worn by a user 102. In particular embodiments, the virtual reality system 100 may comprise a head-mounted VR display device 135, a controller 106, and one or more computing systems 110. The VR display device 135 may be worn over the user's eyes and provide visual content to the user 102 through internal displays (not shown). The VR display device 135 may have two separate internal displays, one for each eye of the user 102 (single display devices are also possible). In particular embodiments, the VR display device 135 may comprise one or more external-facing cameras, such as the two forward-facing cameras 105A and 105B, which can capture images and videos of the real-world environment. As illustrated in FIG. 1A, the VR display device 135 may completely cover the user's field of view. By being the exclusive provider of visual information to the user 102, the VR display device 135 achieves the goal of providing an immersive artificial-reality experience. One consequence of this, however, is that the user 102 may not be able to see the physical (real-world) environment surrounding the user 102, as their vision is shielded by the VR display device 135. As such, the passthrough feature described herein may be technically advantageous for providing the user with real-time visual information about their physical surroundings.

Figure 1B:
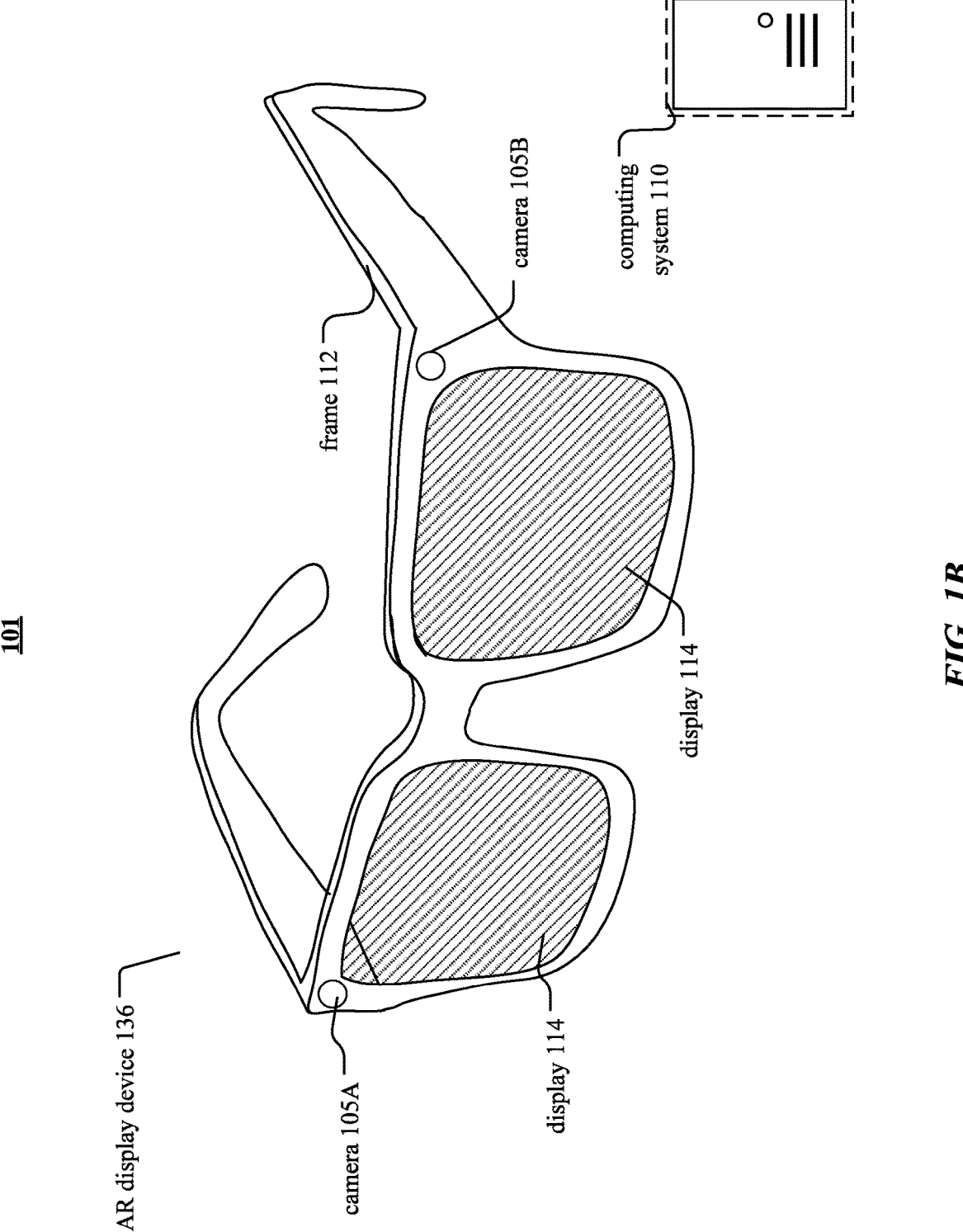
FIG. 1B illustrates an example augmented reality system.

FIG. 1B illustrates an example augmented reality system 101. The augmented reality system 101 may include a head-mounted display AR display device 136 (e.g., AR glasses) comprising a frame 112, one or more displays 114, and one or more computing systems 110. The AR display device 136 may be worn over the user's eyes (e.g., like eyeglasses) and provide visual content to a user 102 (not shown) through displays 114. The displays 114 may be transparent or translucent allowing a user wearing the AR display device 136 to look through the displays 114 to see the real-world environment and displaying visual artificial reality content to the user at the same time. The AR display device 136 may include an audio device that may provide audio artificial reality content to users. The AR display device 136 may include one or more external-facing cameras, such as the two forward-facing cameras 105A and 105B, which can capture images and videos of the real-world environment. The AR display device 136 may include an eye tracking system to track the vergence movement of the user wearing the AR display device 136. The augmented reality system 101 may further include a controller 106 (not shown) comprising a trackpad and one or more buttons. The controller 106 may receive inputs from users and relay the inputs to the computing system 110. The controller 106 may also provide haptic feedback to users. The computing system 110 may be connected to the AR display device 136 and the controller through cables or wireless connections. The computing system 110 may control the AR display device 136 and the controller to provide the augmented reality content to and receive inputs from users. The computing system 110 may be a standalone host computer system, an on-board computer system integrated with the AR display device 136, a mobile computing device, or any other hardware platform capable of providing artificial reality content to and receiving inputs from users.

Figure 2:
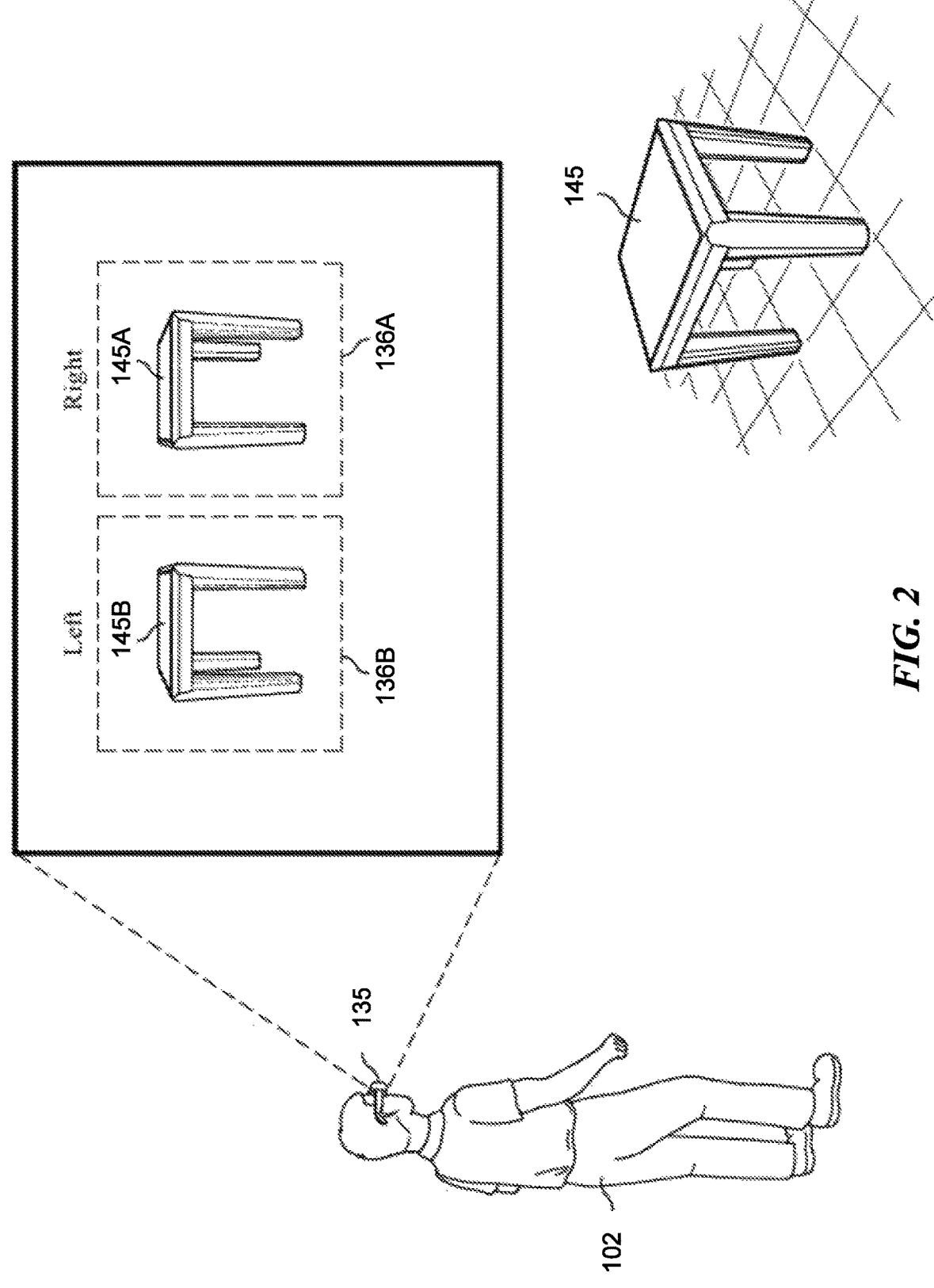
FIG. 2 illustrates an example of a passthrough feature of a virtual reality system.

FIG. 2 illustrates an example of the passthrough feature of a virtual reality system 100. A user 102 may be wearing a VR display device 135, immersed within a virtual reality environment. A real-world object 145 is in the physical environment surrounding the user 102. However, due to the VR display device 135 blocking the vision of the user 102, the user 102 is unable to directly see the real-world object 145. To help the user perceive their physical surroundings while wearing the VR display device 135, the passthrough feature captures information about the physical environment using, for example, one or more cameras 105 such as external-facing cameras 105A-B. The captured information may then be re-projected to the user 102 based on their viewpoints. In particular embodiments where the VR display device 135 has a right display 136A for the user's right eye and a left display 136B for the user's left eye, the virtual reality system 100 may individually render (1) a re-projected view 145A of the physical environment for the right display 135A based on a viewpoint of the user's right eye and (2) a re-projected view 145B of the physical environment for the left display 135B based on a viewpoint of the user's left eye.

Referring again to FIG. 1A, the VR display device 135 may have external-facing cameras, such as the two forward-facing cameras 105A and 105B shown in FIG. 1A. While only two forward-facing cameras 105A-B are shown, the VR display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). As previously explained, although images captured by the forward-facing cameras 105A-B may be directly displayed to the user 102 via the VR display device 135, doing so may not provide the user with an accurate view of the physical environment since the cameras 105A-B cannot physically be located at the exact same location as the user's eyes. As such, the passthrough feature described herein may use a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel pA in the image captured by camera 105A, and the same feature may appear at another pixel pB in the image captured by camera 105B. As long as the depth measurement system knows that the two pixels correspond to the same feature, the virtual reality system 100 could use triangulation techniques to compute the depth of the observed feature. For example, based on the camera 105A's position within a 3D space and the pixel location of pA relative to the camera 105A's field of view, a line could be projected from the camera 105A and through the pixel pA. A similar line could be projected from the other camera 105B and through the pixel pB. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., x-y-z position and r-p-y orientation) of the VR display device 135 within the environment may be needed. For example, in order to render the appropriate display for the user 102 while he is moving about in a virtual environment, the virtual reality system 100 may need to determine his position and orientation at any moment. Based on the pose of the VR display device, the virtual reality system 100 may further determine the viewpoint of either of the cameras 105A and 105B or either of the user's eyes. In particular embodiments, the VR display device 135 may be equipped with inertial-measurement units ("IMU"). The data generated by the IMU, along with the stereo imagery captured by the external-facing cameras 105A-B, allow the virtual reality system 100 to compute the pose of the VR display device 135 using, for example, SLAM (simultaneous localization and mapping) or other suitable techniques.

In particular embodiments, the virtual reality system 100 may further have one or more controllers 106 that enable the user 102 to provide inputs. The controller 106 may communicate with the VR display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. For example, the controller 106 may have several infrared LEDs or other known observable features that collectively form a predetermined pattern. Using a sensor or camera, the virtual reality system 100 may be able to capture an image of the predetermined pattern on the controller. Based on the observed orientation of those patterns, the system may compute the controller's position and orientation relative to the sensor or camera.

The virtual reality system 100 may further include one or more computing systems 110. The one or more computing systems 110 may be a stand-alone unit that is physically separate from the VR display device 135 or the computer system 110 may be integrated with the VR display device 135. In embodiments where the one or more computing systems 110 is a separate unit, the one or more computing systems 110 may be communicatively coupled to the VR display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a virtual reality system 100 depends on the capabilities of its one or more computing systems 110.

In embodiments where the one or more computing systems 110 is a high-performance device, an embodiment of the passthrough feature may be designed as follows. Through the external-facing cameras 105A-B of the VR display device 135, a sequence of images of the surrounding physical environment may be captured. The information captured by the cameras 105A-B, however, may be misaligned with what the user's eyes may capture since the cameras could not spatially coincide with the user's eyes (e.g., the cameras may be located some distance away from the user's eyes and, consequently, have different viewpoints). As such, simply displaying what the cameras captured to the user may not be an accurate representation of what the user should perceive.

Instead of simply displaying what was captured, the passthrough feature may re-project information captured by the external-facing cameras 105A-B to the user. Each pair of simultaneously captured stereo images may be used to estimate the depths of observed features. As explained above, to measure depth using triangulation, the one or more computing systems 110 may find correspondences between the stereo images. For example, the one or more computing systems 110 may determine which two pixels in the pair of stereo images correspond to the same observed feature. A high-performance one or more computing systems 110 may solve the correspondence problem using its GPU and optical flow techniques, which are optimized for such tasks. The correspondence information may then be used to compute depths using triangulation techniques. Based on the computed depths of the observed features, the one or more computing systems 110 could determine where those features are located within a 3D space (since the one or more computing systems 110 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user may be computed from the perspective of the user's eyes, rather than from the perspective of the external-facing cameras 105A-B.

The process described above, however, may not be feasible for a resource-limited computing unit (e.g., a mobile phone may be the main computational unit for the VR display device 135). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Figure 4:
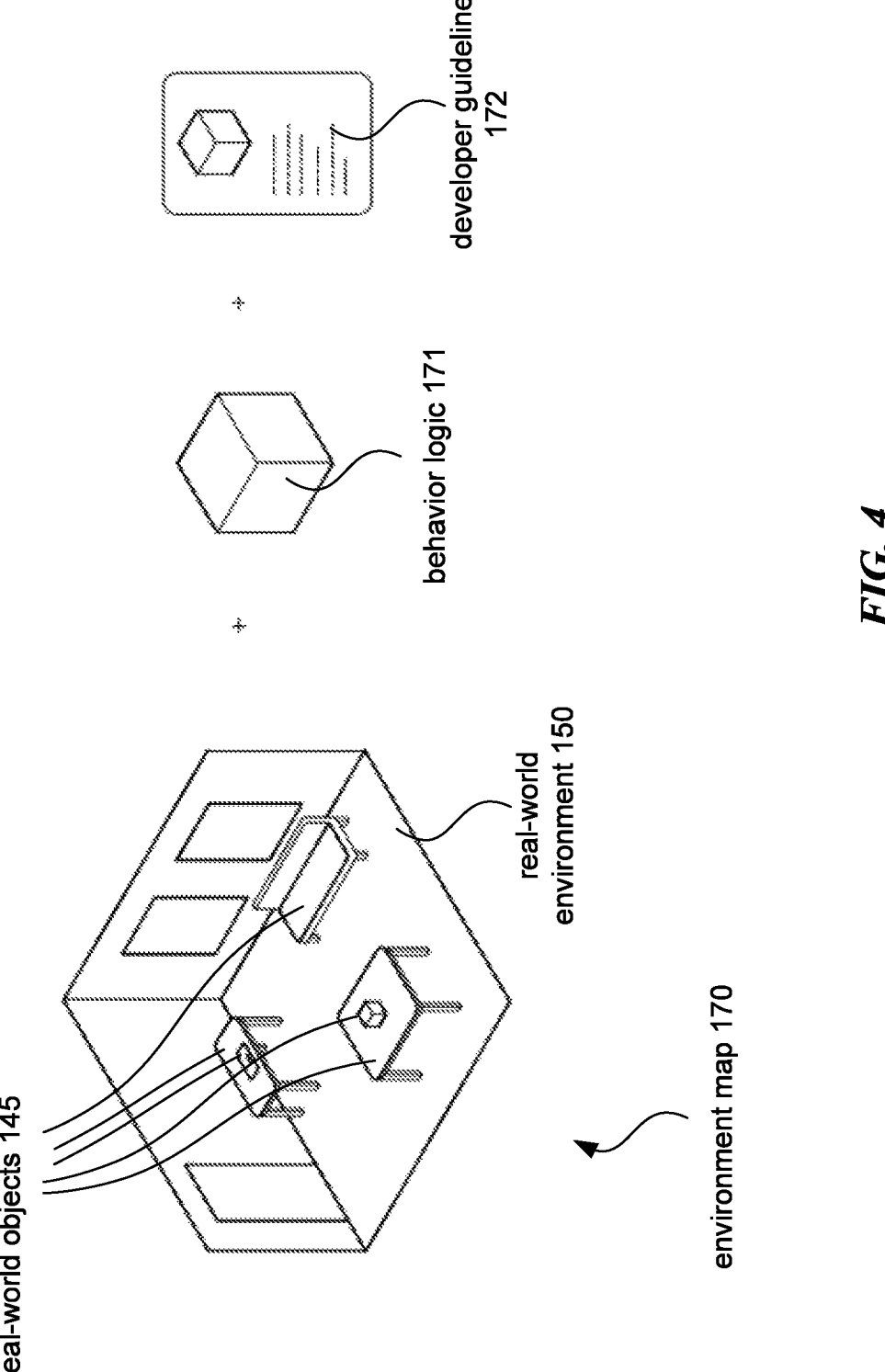
FIGS. 4-5 illustrates example environment maps.
Figure 5:
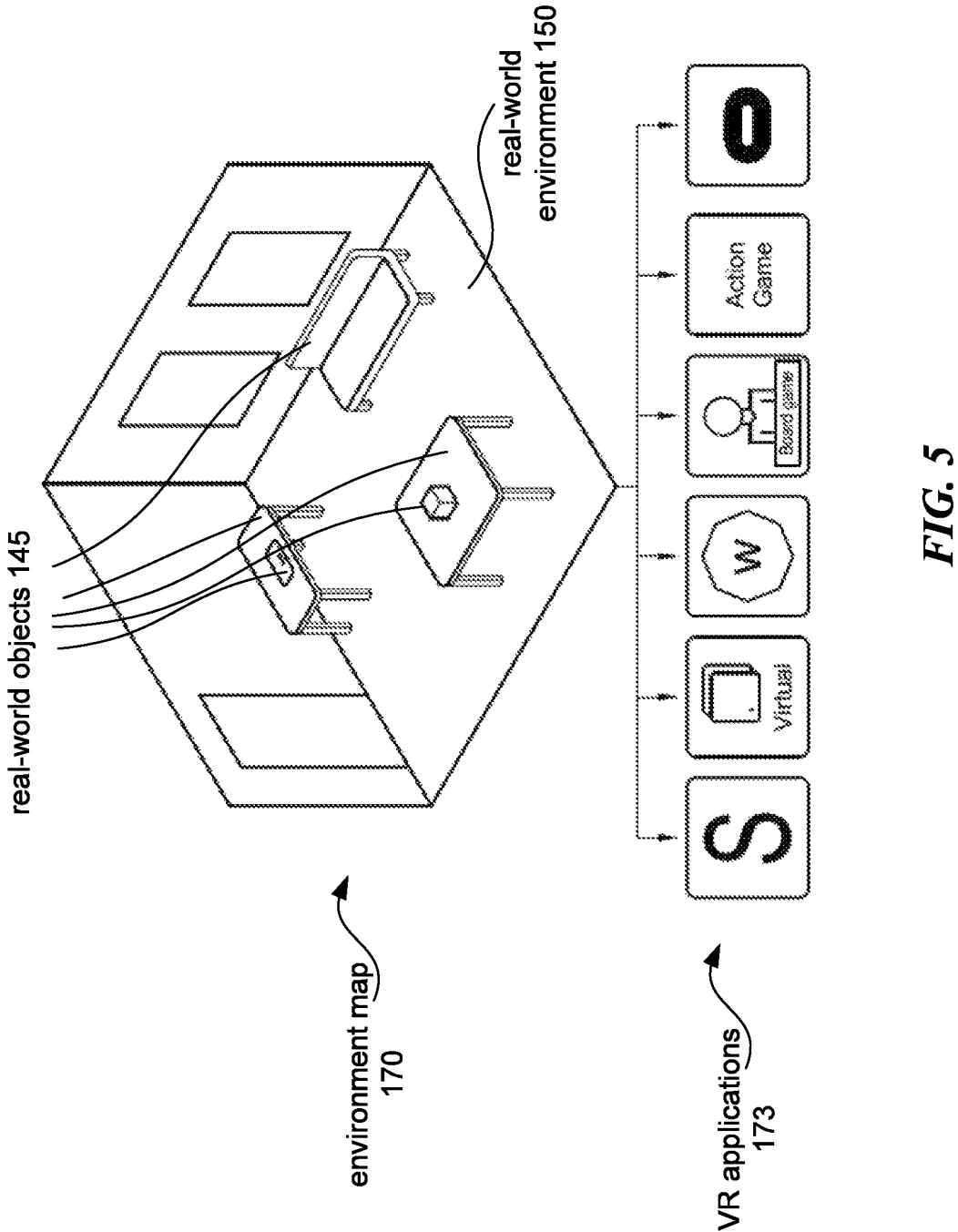

FIG. 3 illustrates components of the VR system 100. There are real-world objects 145 and real-world environments 150. The real-world objects can include items (such as keyboards, cups, controllers, etc.) and furniture (such as desks, chairs, couches, etc.). The real-world environment 150 may correspond to a user's office, living room, kitchen, etc. FIGS. 4-5 illustrate example environment maps 170. With reference to FIG. 4, the environment map 170 comprises the one or more real-world objects 145 in the real-world environment 150. The environment map 170 may be provided to VR applications, alongside behavior logic 171 (e.g., which may include real-world object identification, MR object identification, safe traversal and interaction information, etc.) and developer guidelines (e.g., best practices, how to use and how not to use the real-world and MR objects, etc.). With reference to FIG. 5, a number of different VR applications 173 may utilize the environment map 170 to generate a MR experience for the user. For example, a VR media streaming application may utilize a real-world chair as an MR couch for the user to sit on while watching a movie with other VR users (who may be represented as VR avatars sitting on the same MR couch to create a co-presence experience). As another example, a VR board game application may utilize a real-world table as an MR play area for board game, for the user to sit at so the user can virtually play a board game against other VR users (who may be represented as VR avatars around the MR play area to create a co-presence experience).

In particular embodiments, the VR system 100 may receive an instruction to transition to a first VR environment 160 of a first VR application 173. The user may select a VR application 173, which may instruct the VR system 100 to initiate a VR experience by transitioning to a VR environment. As an example and not by way of limitation, the user may select a VR media streaming application, and the VR system will receive an instruction to transition to a VR movie theater environment. Although this disclosure describes the VR system 100 receiving instructions in a particular manner, this disclosure contemplates the VR system 100 receiving instructions in any suitable manner.

FIG. 6 illustrates example MR surfaces 156 corresponding to real-world objects 145. A create user interface (UI) 157 may appear on the VR display device 135 for a user to mark a surface of a real-world object 145 to be rendered as a MR surface 156. The user may adjust the dimensions of the MR surface 156, e.g., by adjusting parameters on the create UI 157 or by selecting and dragging the edges of the MR surface 156 to a desired dimension (e.g., via an edit user interface 158). The dimensions of the MR surface 156 may be determined by the VR system 100 semi-automatically (e.g., by dragging one or more edges of the MR surface 156) or automatically. The user may then view the MR surface 156 corresponding to the real-world object 145, while being aware of or alerted to the presence of other real-world objects 145 (e.g., a cat on the real-world couch) by displaying a passthrough view of the real-world object 145 or displaying a pass-through view of the object (e.g., the cat on the real-world couch) on the MR object 155. Thus, the user may safely and seamlessly traverse the VR environment 160 without breaking the VR immersion. A technical advantage of the embodiments may include allowing the user to safely navigate within VR environments by integrating real-world objects as suitable MR objects, such that the user does not need to clear the real-world environment of furniture or other obstacles.

FIG. 7 illustrates example MR objects 155 and their related MR surfaces 156. The MR surface 156 may correspond to a two-dimensional (2D) surface of the three-dimensional (3D) MR object 155. The MR surface 156 of a real-world object 145 may correspond to a planar surface (e.g., the MR surface 156 of the real-world object 145 may correspond to a top planar surface of the real-world object, such as a surface of a real-world desk). The MR object 155 may encompass the real-world object 145. That is, the MR surface 156 of the MR object 155 may correspond to a bounding box (e.g., two or more MR surfaces 156 of the MR object 155 may form a bounding box enclosing the real-world object 145). Alternatively, the MR surface 156 of the MR object 155 may conform to the dimensions of the real-world object (e.g., the two or more MR surface 156 of the MR object 155 may correspond to two or more real-world surfaces of the real-world object such that the MR object 155 matches the shape of the real-world object 145).

Figure 8:
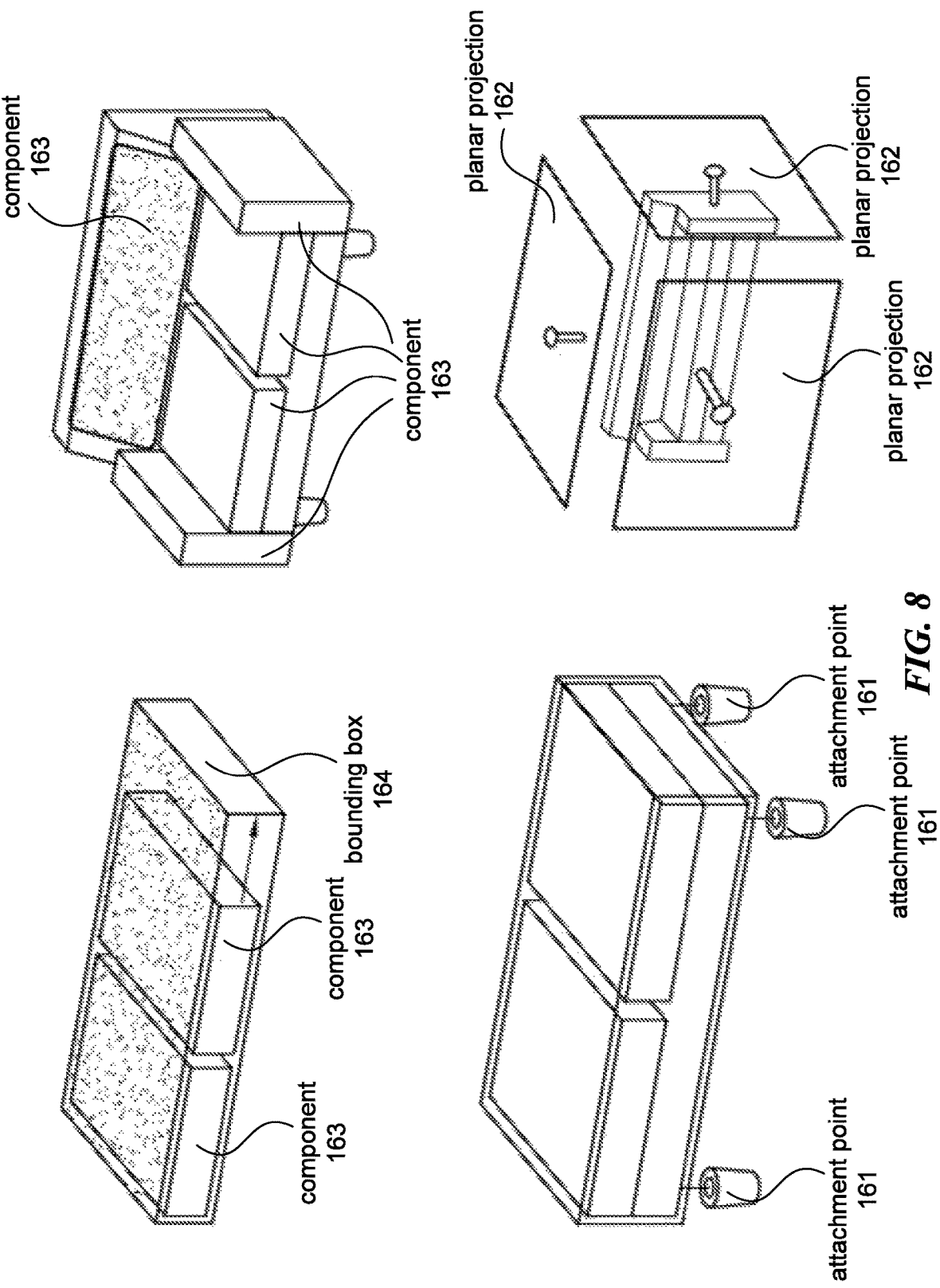
FIGS. 8-9 illustrates example customization features for MR objects.
Figure 9:
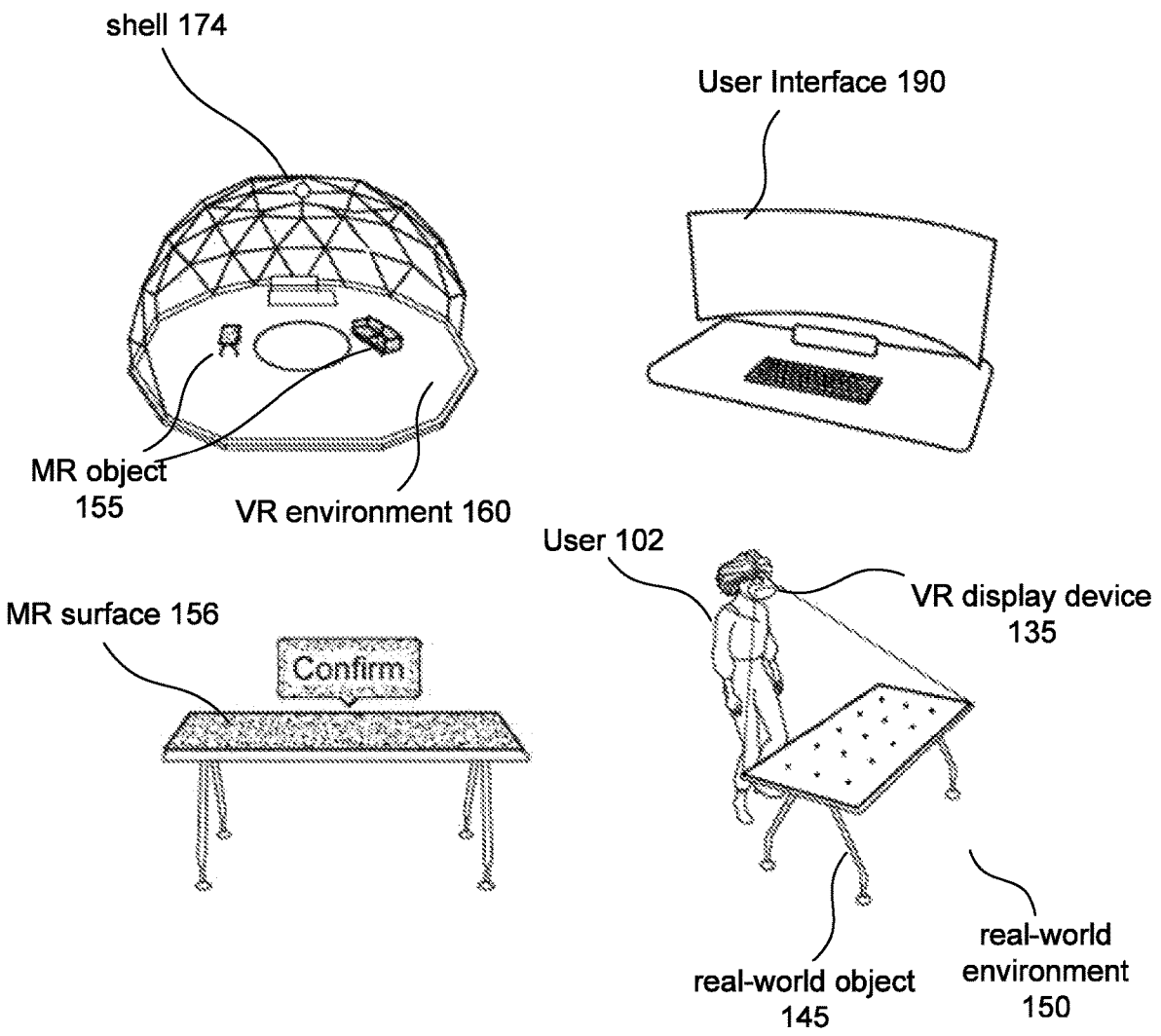

FIGS. 8-9 illustrates example customization features for MR objects 155. With reference to FIG. 8, the VR system 100 may populate a bounding box 164 with one or more components. For example, the MR object 155 corresponding to a seat and having a bounding box 164 may be populated with MR cushions, planks, tiles, etc. Additionally, the VR system 100 may allow a user to customize the MR object 155 with various configurations. For example, a MR couch may be conformed to include components such as armrests, backrests, or attachment points (e.g., attachment points 161). Additionally, one or more planar projections 162 may be used to determine the dimensions of the bounding box 164. With reference to FIG. 9, the VR system 100 may incorporate items within a shell 174 (e.g., a shell enclosing the VR environment 160), and leverage real-world objects 145 as MR objects 155 within the shell 174. Additionally, the VR system may incorporate a virtual user interface (UI) 190. The virtual UI 190 may be incorporated into MR objects (e.g., the virtual UI 190 may appear as a desktop on top of a MR desk). The VR system 100 may identify MR objects (e.g., MR surfaces 156) the user may act on, and confirm with the user that the MR object is usable. For example, the VR system 100 may confirm with the user that the MR surface 156 of an MR desk is usable as a desktop. Additionally, the VR system 100 may automatically or semi-automatically identify a real-world object 145 as potential MR objects 155. For example, the VR display device 135 may scan the real-world environment 150 and identify real-world objects 145 that can be leveraged as MR objects 155.

Figure 10:
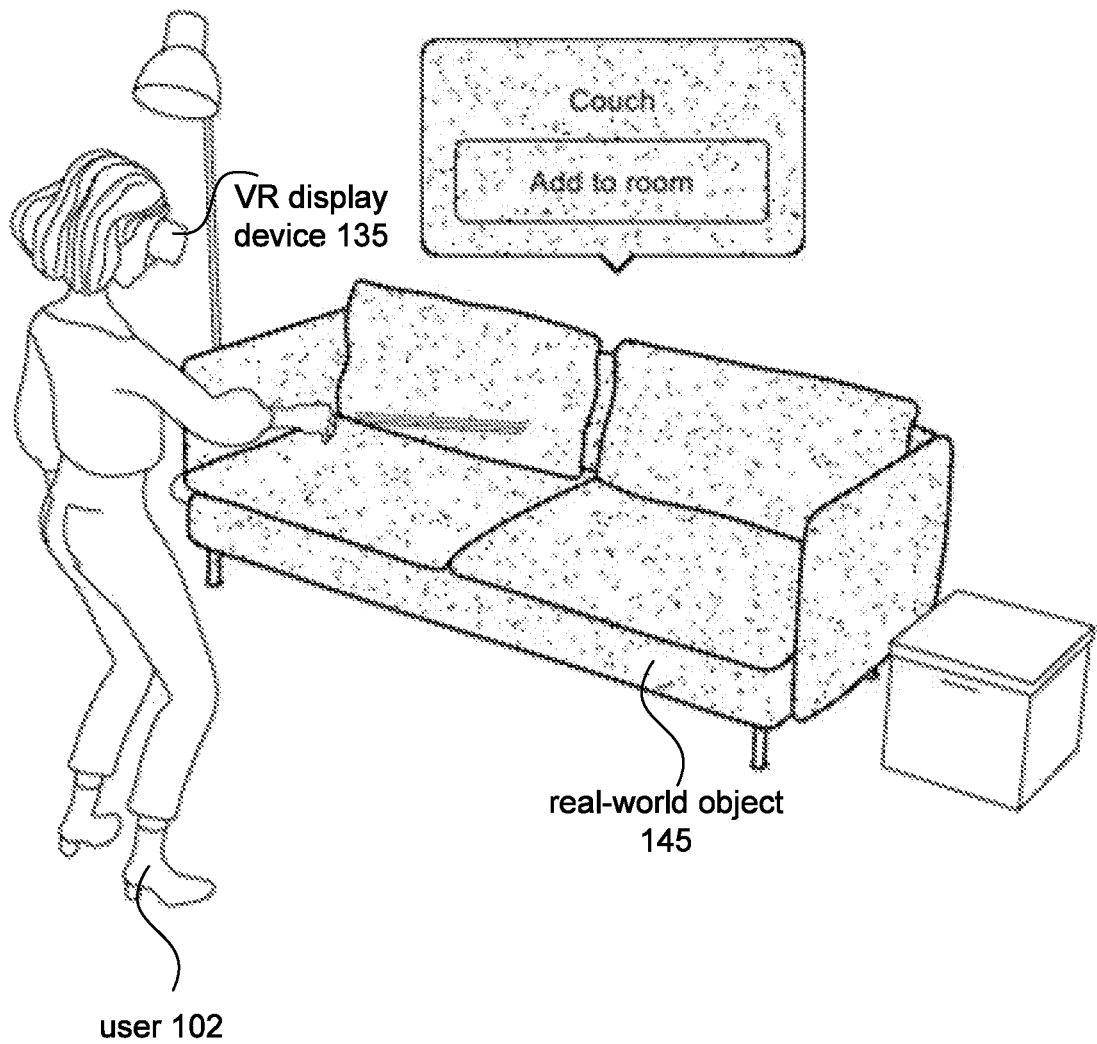
FIG. 10 illustrates a capture of a real-world object.

FIG. 10 illustrates a capture of a real-world object 145. The VR system 100 may be used to capture—either manually, semi-automatically, or automatically—the real-world object 145 to be leveraged as a MR object 155. As an example and not by way of limitation, the user may manually select a real-world object to be rendered as a MR object 155, and manually assign a MR functionality to the MR object 155 (e.g., the user may select a real-world couch to be rendered as a MR couch having the MR functionality of a seat, or the user may select the real-world couch to be rendered as a MR pile of rocks providing the functionality of a place to hide behind). As another example and not by way of limitation, the VR system may use an object recognition algorithm to recognize the object type of the real-world object, and ask the user to confirm whether to add the real-world object as an MR object and apply a MR functionality to the MR object 155. As yet another example and not by way of limitation, the user VR system 100 may automatically identify a real-world object 145 using an object recognition algorithm and automatically add it as a MR object 155 in the VR environment (i.e., without requiring user confirmation), and assign an appropriate MR functionality to the MR object 155.

Figure 11:
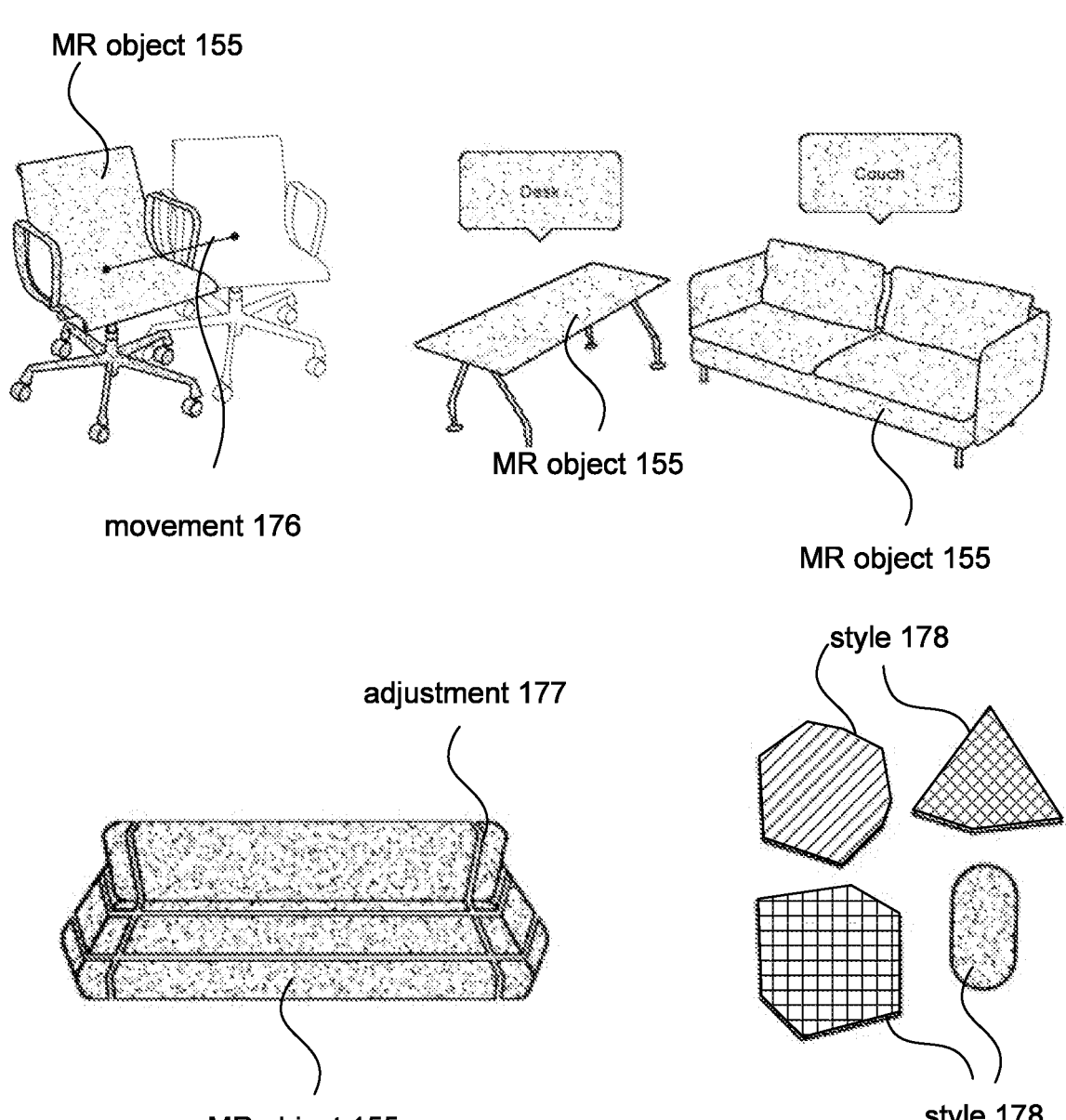
FIG. 11 illustrates properties of MR objects.

FIG. 11 illustrates properties of MR objects 155. One property of the MR object 155 is a movement 176 of the MR object 155. That is, as the real-world object 145 moves, the location of the corresponding MR object 155 within the VR environment 160 may be updated. Another property of the MR object 155 is the function of the MR object 155. That is, the VR system 100 may automatically classify the real-world object 145 and/or the MR object 155 based on its function. As an example and not by way of limitation, a real-world desk may be classified as a MR desk, and a real-world couch may be classified as a MR couch. As another example and not by way of limitation, the real-world desk may be classified as a MR pillar for a user to hide behind, and the real-world couch may be classified as a MR obstacle to avoid. The real-world desk may also be classified as MR platform for the user to stand on, and the real-world couch may also be classified as a MR pillar (e.g., for a user to hide behind). Additionally, the VR system 100 may adjust the dimensions of the MR object 155. That is, the MR couch may be adjusted using the one or more adjustments 177 to extend the length, width, and/or height of the MR couch. As an example and not by way of limitation, a MR desk may be "extended" to turn into a long MR conference table. Additionally, the VR system may adjust a style 178 of the MR object 155. For example, a pattern, color, theme, or other form of styling may be applied to the MR object 155. The style may be based on the VR environment 160 and/or determined by policies or rules of the VR application.

Figure 12A:
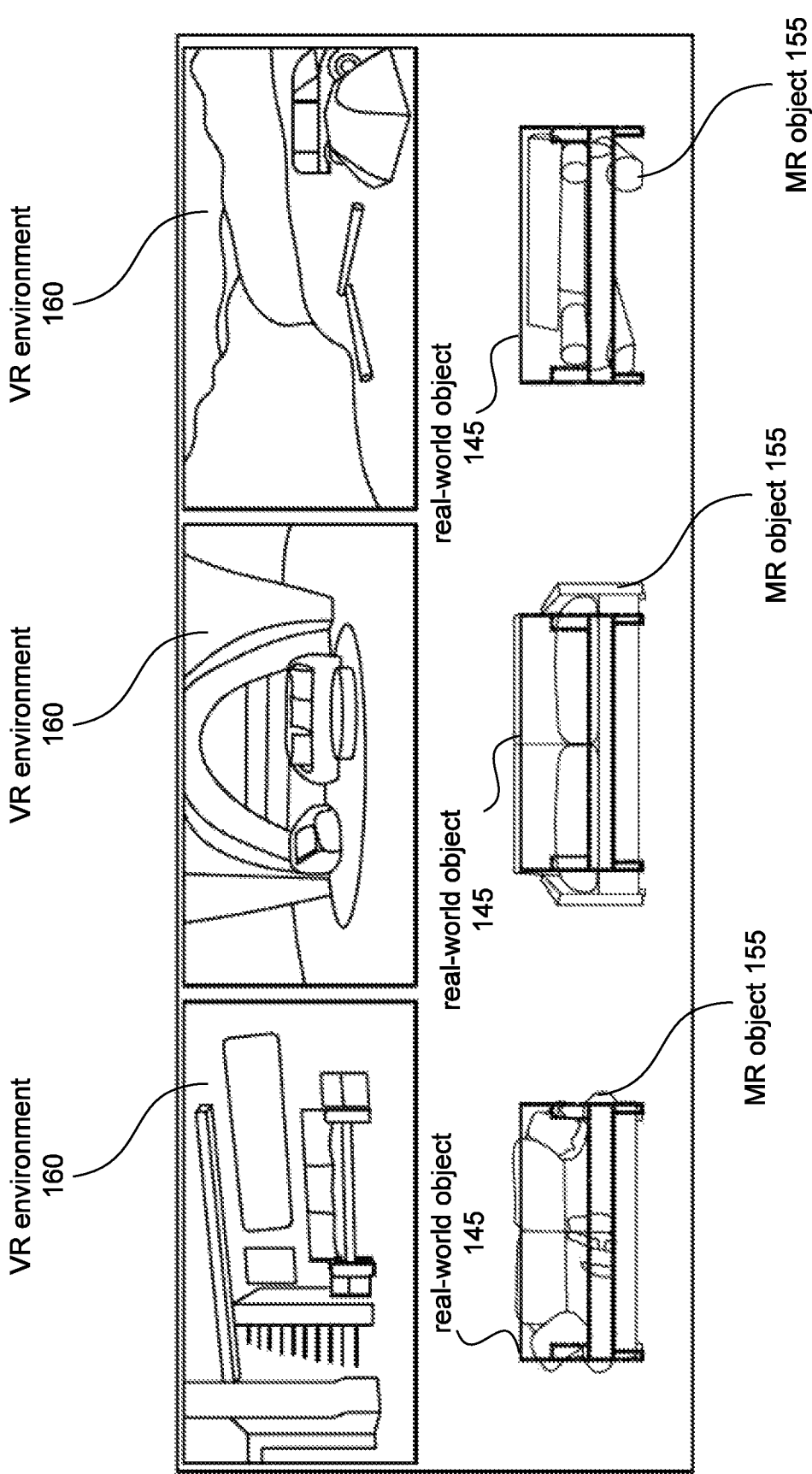
FIGS. 12A-B illustrate customizing an MR object based on the VR environment.

FIG. 12A illustrates customizing the appearance of an MR object 155 based on the VR environment 160. That is, the appearance and/or style of the MR object 155 may be customized to blend in with or correspond to the VR environment 160. The following are examples of an MR overlay of MR objects 155 on real-world objects 145. As an example and not by way of limitation, referencing the left-side example of FIG. 12A, in a "dilapidated" VR environment, a real-world couch may be rendered as a tattered MR couch. As another example and not by way of limitation, referencing the center example of FIG. 12A, in a "luxury resort" VR environment, a real-world couch may be rendered as a luxurious MR couch. As yet another example and not by way of limitation, referencing the right-side example of FIG. 12A, in a "outdoor" VR environment, a real-world couch may be rendered as a MR log bench.

Figure 12B:
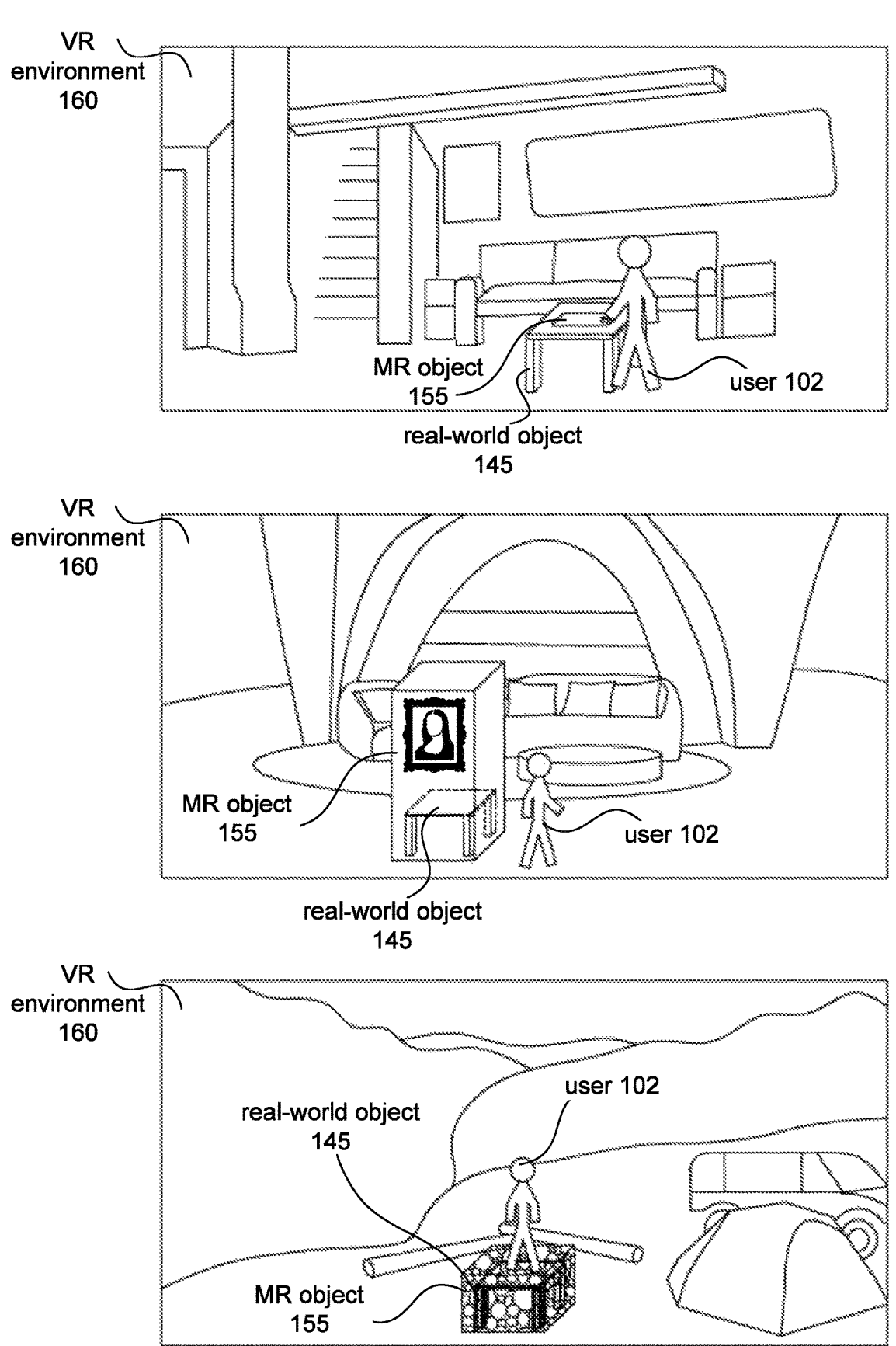

FIG. 12B illustrates customizing the functionality of an MR object 155 based on the VR environment 160. That is, the MR functionality of the MR object 155 may be customized to a functionality that is applied by the VR application and appropriate to the VR environment 160. As an example and not by way of limitation, referencing the left-side example of FIG. 12B, in a "strategy gaming" VR environment, a real-world table may be rendered as a MR boardgame, functioning as a virtual interactive boardgame with VR game pieces the user can interact with and move on the MR surface 156. As another example and not by way of limitation, referencing the center example of FIG. 12B, in a "museum" VR environment, a real-world table may be rendered as a MR marble pillar holding a MR painting, functioning as a virtual obstacle the user has to walk around. As yet another example and not by way of limitation, referencing the right-side example of FIG. 12B, in a "camping" VR environment, a real-world table may be rendered as a MR stone tower, allowing the user to step on the real-world table to be transported to the top of the MR stone tower to get an elevated view of the landscape below in the VR environment.

Figure 13:
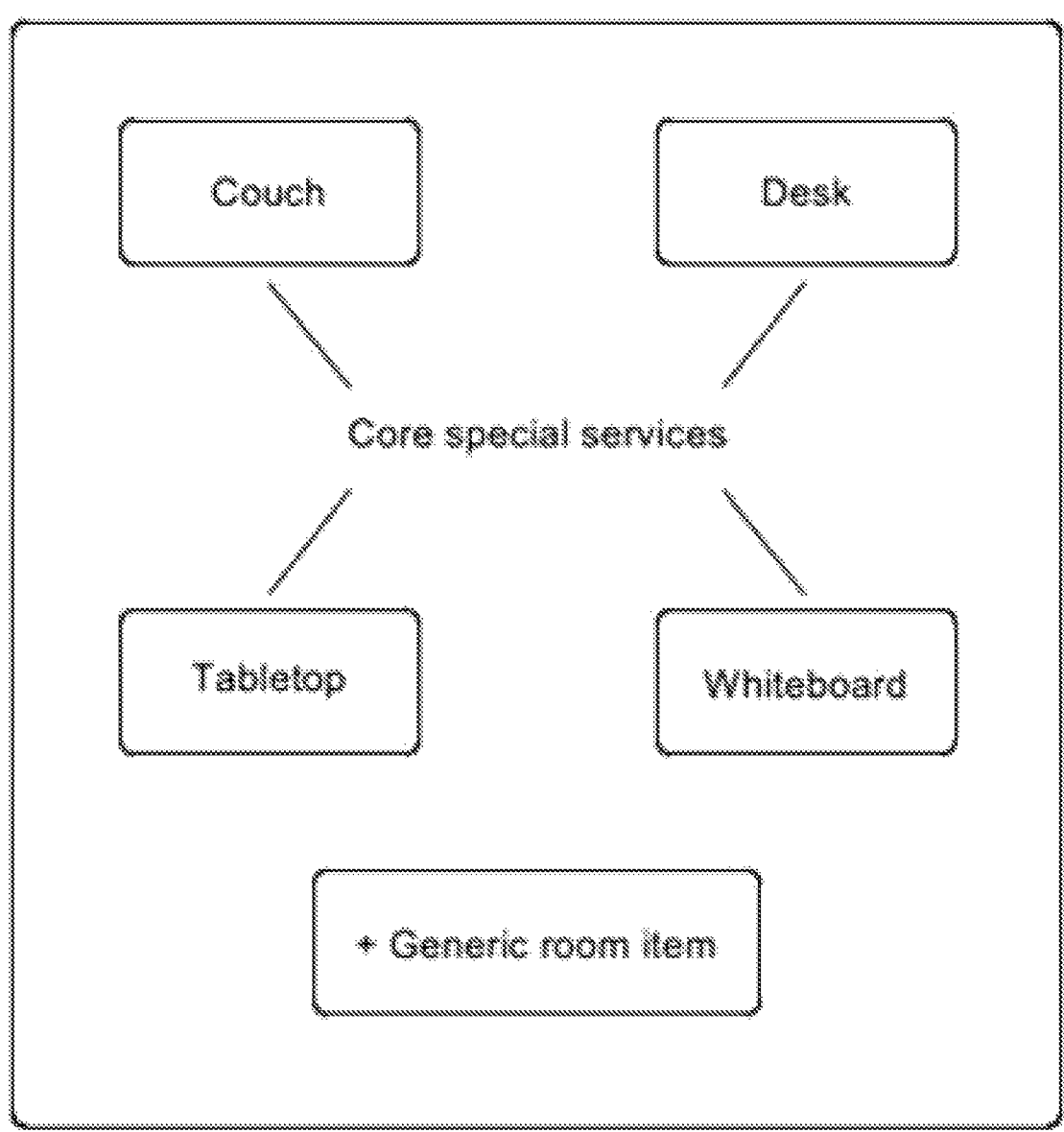
FIG. 13 illustrates a user interface for classifying MR objects.
Figure 14:
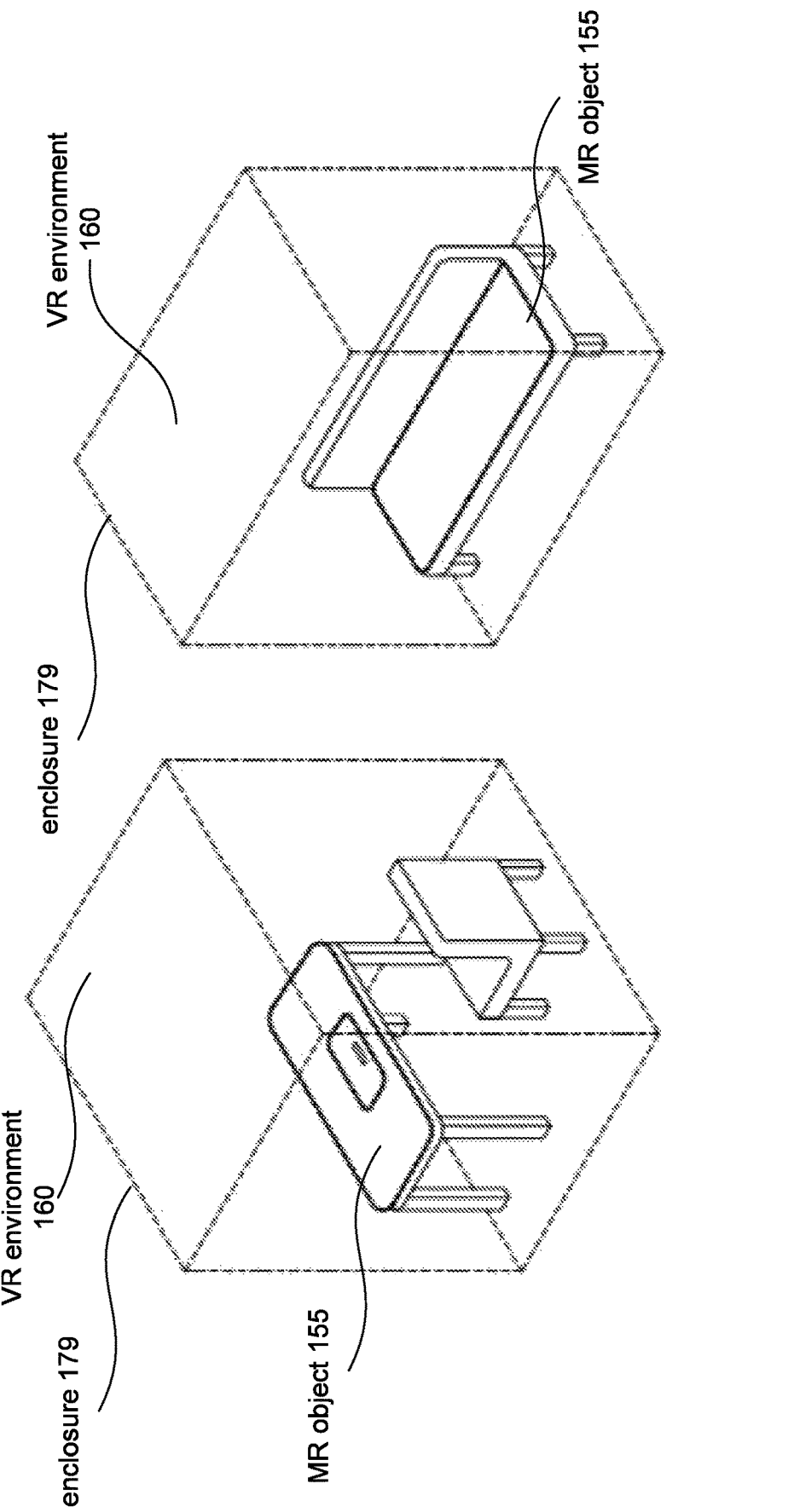
FIGS. 14-16 illustrates enclosures for VR environments.
Figure 15:
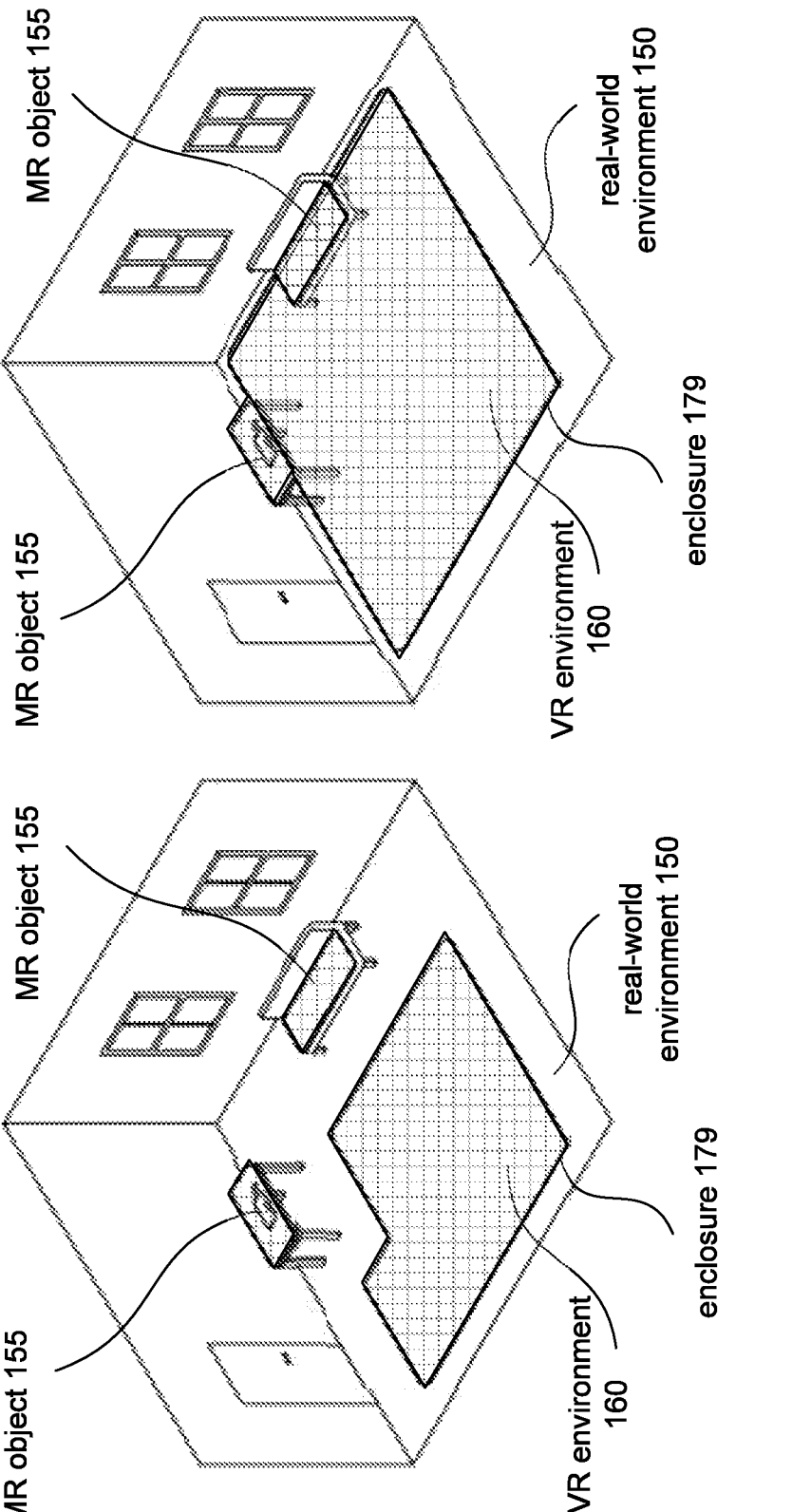
Figure 16:
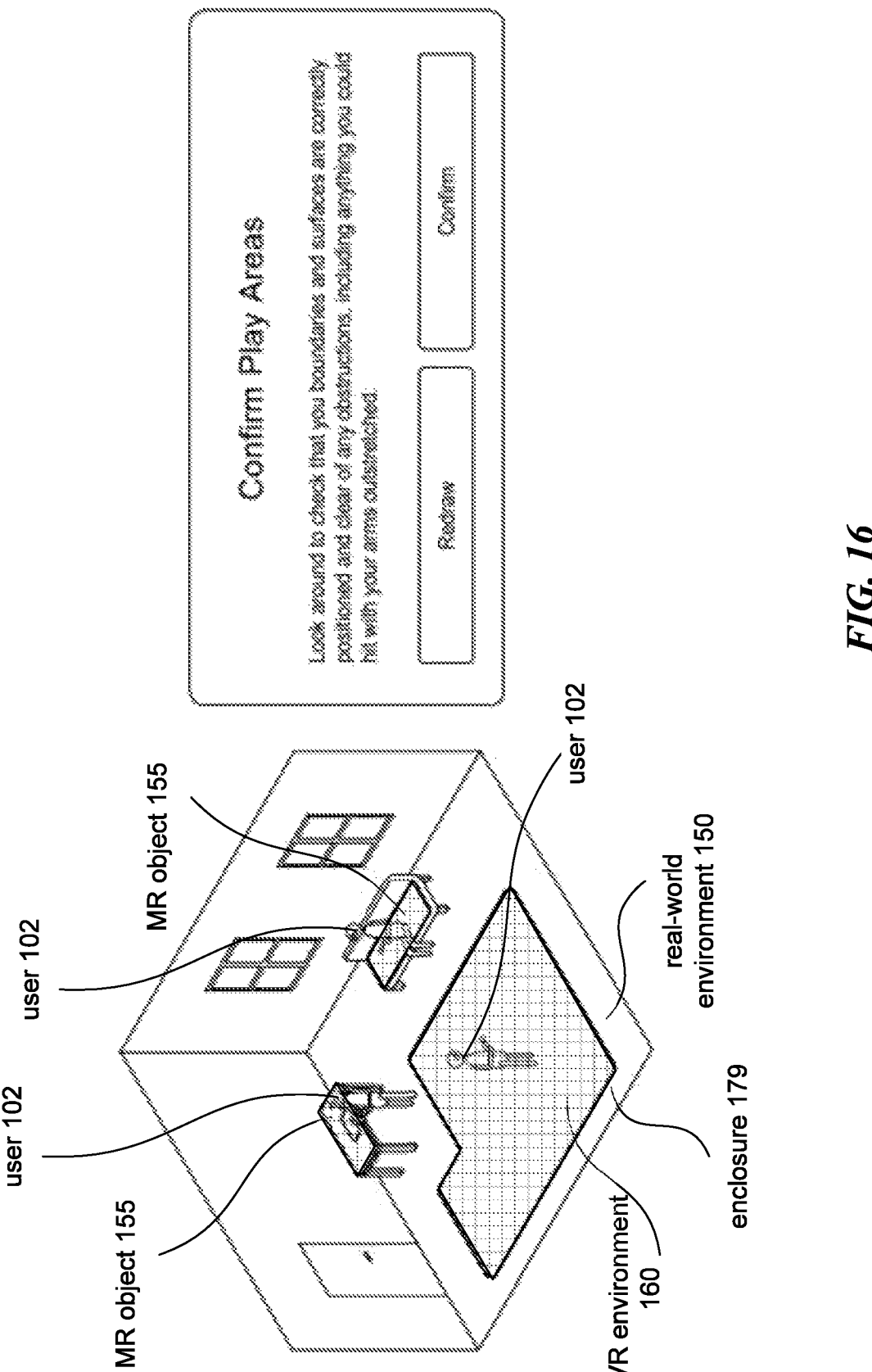

FIG. 13 illustrates a user interface for classifying MR objects 155. A technical challenge may include determining what type of MR object 155 a real-world object 145 should be rendered as by the VR system 100. The solution presented by the embodiments disclosed herein to address this challenge may be to utilize a user interface to help a user classify the MR functionality of MR objects 155. In particular embodiments, a user interface for classifying MR objects 155 may be presented to a user when they select a real-world object 145 to be rendered as a MR object 155, to classify the type of object the MR object 155 should be rendered as. As an example and not by way of limitation, the user interface may present options for a user to classify an MR object as a couch, a desk, a tabletop, a whiteboard, or a generic room item. FIGS. 14-16 illustrates enclosures 179 for VR environments 160. With reference to FIG. 14, the enclosure 179 can ensure the space size of the VR environment is suitable according to the MR object 155. For example, the enclosure 179 around a MR desk may be larger to assume the user will sit in a chair next to the MR desk. Thus, the enclosure 179 may be expanded to allow the user to comfortably sit within the VR environment 160. As another example, the enclosure 179 around a MR couch may be limited to just the MR couch, as the user may not need more space beyond the immediate vicinity around the MR couch to comfortably remain within the VR environment 160. With reference to FIG. 15, the enclosure 179 may separate the VR environment 160 and MR objects 155. For example, the VR environment 160 may cover the space between MR objects 155, and extend to the MR surfaces 156 of the MR objects 155. The enclosure 179 may include the MR objects 155 entirely, and not just the usable MR surfaces 156. With reference to FIG. 16, regardless of whether the enclosure 179 encloses the MR objects 155, the entire room of the real-world environment 150 may be accepted for the boundary of the VR environment 160. Thus, the user 102 may freely transition between multiple spaces within the enclosure 179 of the VR environment 160, allowing the user 102 to utilize multiple MR surfaces 156.

In particular embodiments, the VR system 100 may access attribute information of one or more real-world objects 145 in the real-world environment 150 proximate to the VR display device 135. Attribute information may comprise one or more spatial dimensions of the one or more real-world objects 145. As an example and not by way of limitation, attribute information of a real-world desk may comprise the length and width of the surface of the desk, and attribute information of a real-world bookshelf may comprise the length, width, and height of the real-world bookshelf. More information on determining dimensions of real-world object for use in mixed-reality applications may be found in U.S. patent application Ser. No. 17/204,699, filed 17 Mar. 2021, which is incorporated by reference. Attribute information may comprise one or more volumetric shapes of the one or more real-world objects 145. As an example and not by way of limitation, attribute information of a real-world couch may comprise the shape of the real-world couch, including the seat, armrests, and backrest of the real-world couch. Attribute information may comprise one or more real-world functionalities of the one or more real-world objects. As an example and not by way of limitation, attribute information of a real-world couch may include the functionality of the real-world couch (e.g., as a seat), and attribute information of a real-world desk may include the functionality of the real-world desk (e.g., a surface to work on). This attribute information may be determined using computer vision algorithms (e.g., object recognition algorithms, map depth and spatial recognition algorithms) or user-provided information. Although this disclosure describes the VR system 100 accessing particular attribute information of particular objects in a particular manner, this disclosure contemplates the accessing any suitable attribute information of any suitable objects in any suitable manner.

In particular embodiments, the VR system 100 may determine, for each of the one or more real-world objects 145, one or more first MR functionalities applicable to the real-world object 145 based on its attribute information. The MR functionality applicable to the real-world object 145 may correspond to one or more real-world functionalities of the real-world object 145. As an example and not by way of limitation, if a real-world couch has the real-world functionality of providing a place to sit, the MR functionality will correspondingly provide a place to sit. On the other hand, the MR functionality applicable to the real-world object 145 may not correspond to one or more real-world functionalities of the real-world object 145 (see FIG. 12B). As an example and not by way of limitation, a real-world couch may be rendered as a MR couch in one VR environment (e.g., in a VR media streaming application), and as a MR pile of rocks in another VR environment (e.g., in a VR western video game environment). As another example and not by way of limitation, if a real-world table has the real-world functionality of providing a usable surface, the MR functionality may provide an alternative functionality, e.g., a blockade or obstacle to avoid. As another example and not by way of limitation, a real-world wall may be rendered as a MR wall in one VR environment, and then rendered as a MR whiteboard in another VR environment. Although this disclosure describes the VR system 100 determining one or more functionalities in a particular manner, this disclosure contemplates the VR system 100 determining one or more functionalities in any suitable manner.

In particular embodiments, the VR system 100 may render, for one or more displays of the VR display device 135, the first VR environment 160 with one or more MR objects 155 corresponding to the one or more real-world objects 145. That is, while the user 102 is immersed within the VR environment 160, the user 102 may be able to utilize the MR objects 155 within the VR environment 160. That is, the user 102 may use the real-world object 145 as a MR object 155 in the VR environment 160 with no loss of immersion. Each MR object 155 may comprise one of the first MR functionalities applicable to the corresponding real-world object 145. As an example and not by way of limitation, A MR couch may serve the functionality of providing the user a place to sit while immersed in a VR media streaming application, similar to the real-world couch. The MR object 155 may comprise one or more MR functionalities that does not correspond to the real-world object 145. As another example and not by way of limitation, a MR table may be used as an obstacle (e.g., a pile of rocks) to hide behind while the user is in a VR gaming application. Although this disclosure describes the VR system 100 rendering the VR environment 160 in a particular manner, this disclosure contemplates the VR system 100 rendering the VR environment 160 in any suitable manner.

In particular embodiments, the VR system 100 may identify one or more real-world objects 145 in the real-world environment 150 proximate to the VR display device 135. That is, the VR system 100 may detect whether there are real-world objects 145 close or proximate to the user 102, and notify or present these real-world objects 145 to the user 102. The VR system 100 may identify a planar surface of one of the real-world objects 145 in the real-world environment 150, and apply an MR functionality to the planar surface of the one of the real-world objects 145. As an example and not by way of limitation, if the user 102 is proximate to a real-world desk (as in FIGS. 7 and 9-10), the VR system 100 may identify the top surface of the real-world desk, and apply the MR functionality of providing a working surface to the planar surface of the real-world desk. The VR system 100 may generate a bounding box containing one of the real-world objects 145 in the real-world environment 150, and apply an MR functionality to the bounding box containing the real-world object 145. As an example and not by way of limitation, if the user 102 is next to a real-world couch (as in FIGS. 7 and 9-10), the VR system 100 may identify the real-world couch, generate a bounding box 164 that encloses the real-world couch, and apply the MR functionality of providing a barrier or obstacle to hide behind while the user is in a VR gaming application. The VR system 100 may generate a three-dimensional (3D) mesh of one of the real-world objects 145 in the real-world environment 150, and apply an MR functionality to the 3D mesh of the real-world object 145. As an example and not by way of limitation, if the user 102 is next to a real-world couch (as in FIGS. 7 and 9-10), the VR system 100 may identify the real-world couch, generate a mesh that matches the volume and shape the real-world couch, and apply the MR functionality of providing the user a place to sit, such that the corresponding MR couch has seats, armrests, and a backrest that match and correspond to the real-world couch. Although this disclosure describes identifying real-world objects 145 in a particular manner, this disclosure contemplates identifying real-world objects 145 in any suitable manner.

In particular embodiments, the VR system 100 may render, for the one or more displays of the VR display device 135, one or more suggestions for applying one or more MR functionalities to the one or more of the real-world objects 145. The VR system 100 may receive an indication of a user selection corresponding to one of the suggestions for applying the MR functionalities to the real-world object 145, and apply the MR functionalities to the real-world objects 145 responsive to the user selection. That is, the VR system 100 may suggest MR functionalities based on the real-world object (e.g., the VR system 100 may suggest the MR functionality of providing a work surface for a real-world desk, or the MR functionality of providing a place to sit for the real-world couch). The VR system 100 may suggest MR functionalities based on the available functionalities within the VR application that are suitable for the particular real-world object 145 (e.g., in a first-person shooter VR gaming application, the VR system 100 may suggest the MR functionality of a barricade to hide behind). Although this disclosure describes suggesting MR functionalities in a particular manner, this disclosure contemplates suggesting MR functionalities in any suitable manner.

Figure 17:
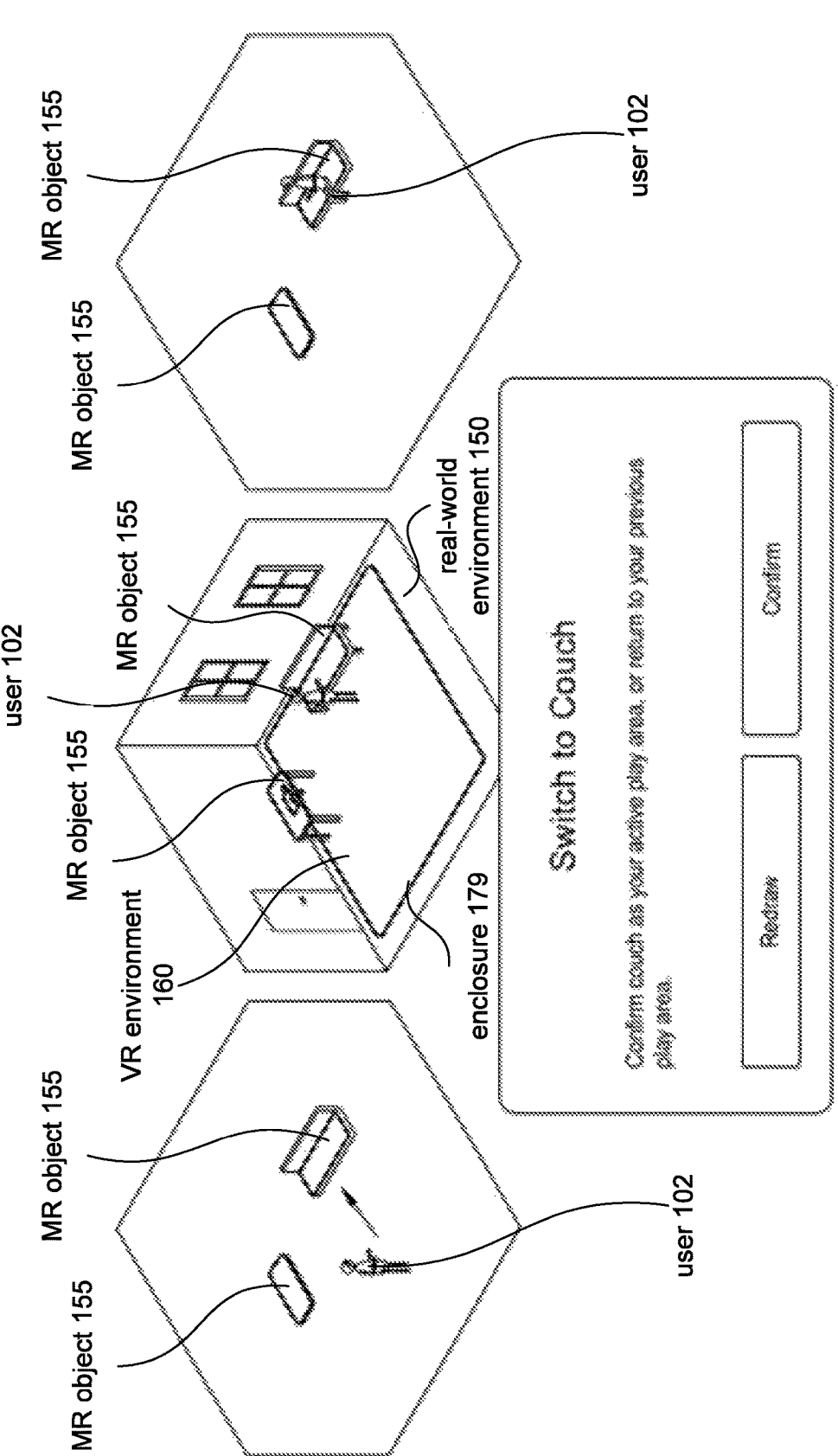
FIG. 17 illustrates a process for safely traversing the real-world environment to switch between MR objects.

FIG. 17 illustrates a process for safely traversing the real-world environment to switch between MR objects 155. As the user 102 switches from one MR object 155 to another, or selects to switch from one MR object 155 to another, the VR system 100 may request a confirmation that the user intends the switch. For example, if the user 102 is at a MR desk and wants to switch to a MR couch, the VR system 100 may present a passthrough view of the real-world environment 150 to ensure the user 102 can safely move about the real-world environment to switch from using the MR desk to the MR couch. Thus, the user 102 may avoid any objects, pets, or other obstacles that may impede their safe passage from one MR object to another MR object.

Figure 18:
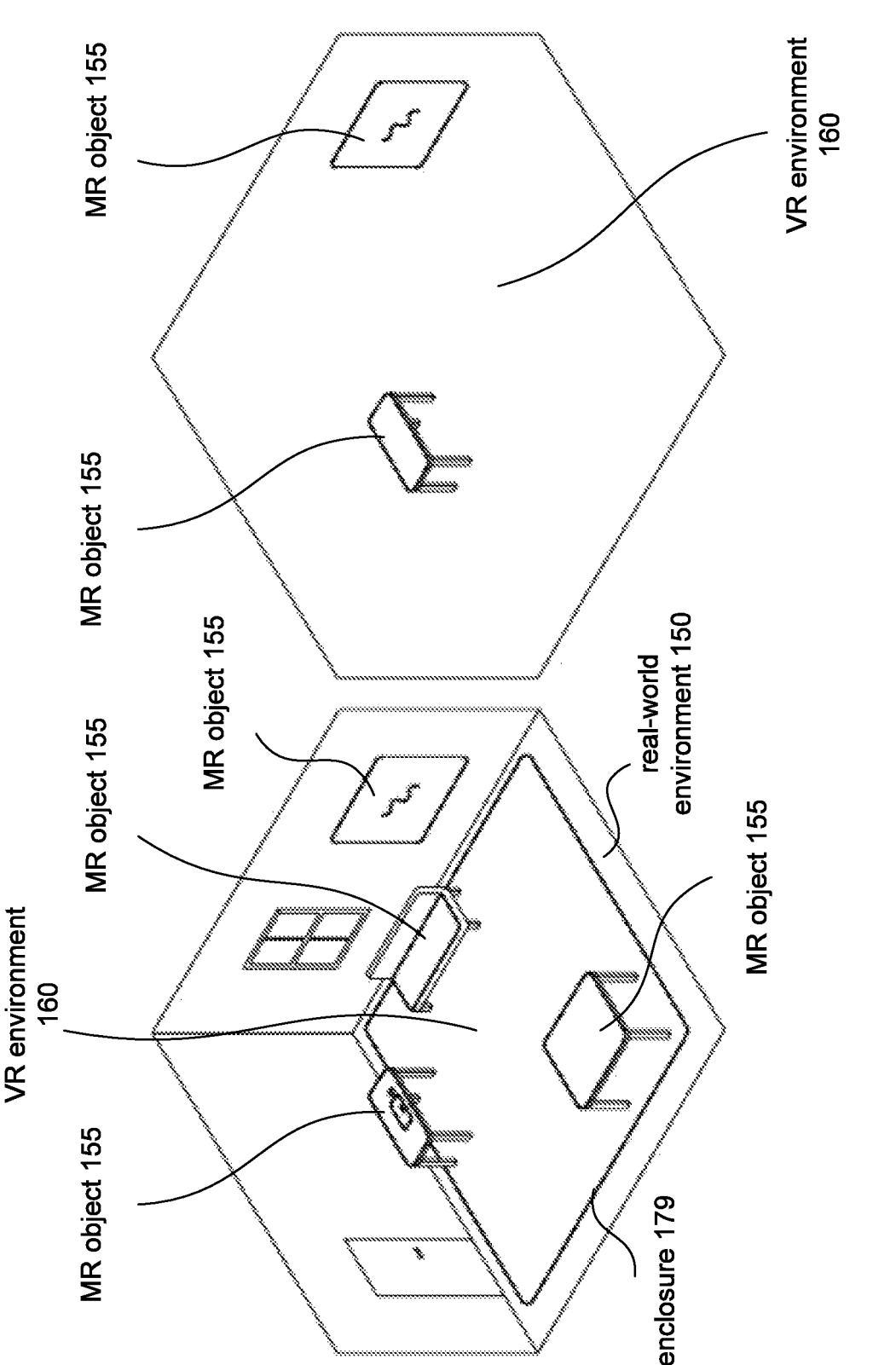
FIG. 18 illustrates a sample VR environment with multiple MR objects.

FIG. 18 illustrates a sample VR environment 160 with multiple MR objects 155. The multiple MR objects 155 can be added or omitted to the VR environment 160 based on the needs of the VR environment 160. For example, the VR environment 160 may contain a MR desk, a MR table, a MR couch, and a MR whiteboard. In a workspace VR environment, the user may only need the MR desk and the MR whiteboard. Thus, the VR system 100 may omit the MR couch and the MR table from the VR environment 160. For user safety, the VR system 100 may alert the user (e.g., via a boundary warning) if the user approaches an omitted object. As an example and not by way of limitation, the VR system 100 may show the user the omitted object (e.g., via a passthrough view of the real-world environment, or as a boundary warning alert through the user's personal UI). More information on spatial awareness and virtual boundaries may be found in U.S. patent application Ser. No. 17/139,434, filed 31 Dec. 2020, which is incorporated herein by reference.

Figure 19:
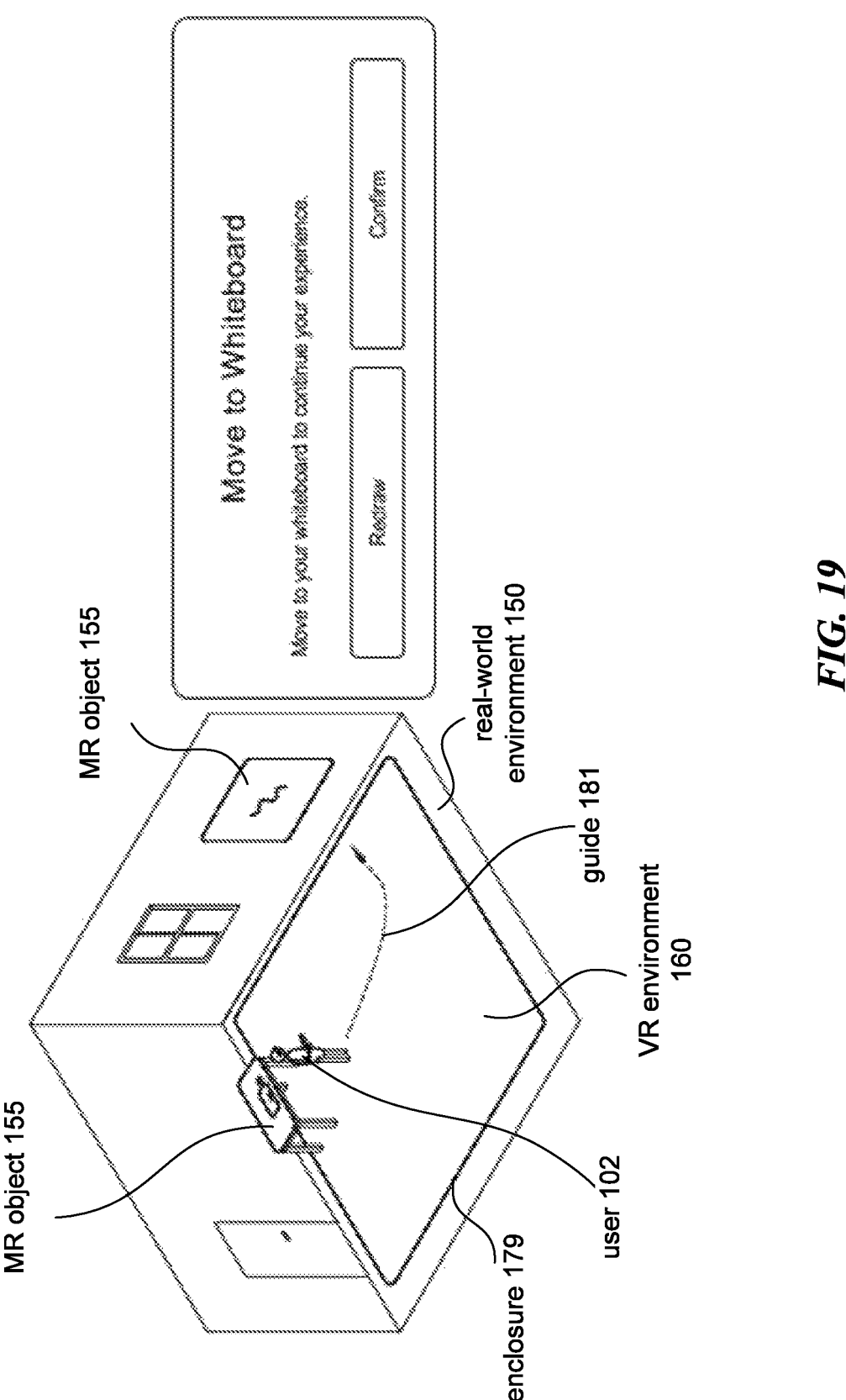
FIG. 19 illustrates a guided traversal for the user in the VR environment.

FIG. 19 illustrates a guided traversal for the user 102 in the VR environment 160. If the user 102 wishes to switch from one MR object 155 to another, or alternatively, if the VR system 100 recommends the user 102 to switch from one MR object to another, the VR system 100 may provide a guide 181 to allow the user 102 to safely traverse the VR environment 160. For example, if the user 102 is at a MR desk, the VR system 100 may recommend the user to switch to the MR whiteboard. The VR system 100 may then provide the guide 181 indicating to the user 102 a route to traverse to safely reach the MR whiteboard. Alternatively, the VR system 100 may present a passthrough view of the real-world environment to help the user safely navigate to the new space.

In particular embodiments, the VR system 100 may access floorplan information of the real-world environment 150, and render, for the one or more displays of the VR display device 135, the first VR environment 160. The floorplan information may correspond to one or more areas of the user's room, or to one or more rooms in the user's home or real-world environment 150. In particular embodiments, the floorplan information may be gathered by one or more cameras of the VR display device 135. As an example and not by way of limitation, the VR system 100 may use an algorithm (e.g., object recognition algorithm, map depth and spatial recognition algorithm) to identify floors, walls, objects, and any other boundaries of the real-world environment 150. In particular embodiments, the floorplan information may be determined by user-provided information. As an example and not by way of limitation, the user may manually draw boundaries defining the floors, walls, objects, and any other boundaries of the real-world environment 150. This process can occur as the user defines the boundary for a VR application (e.g., during a setup period for the VR system 100, where the user may input boundaries for the enclosure 179). The VR environment 160 may then be rendered based on the one or more areas or one or more rooms of the user's real-world environment 150. The first VR environment 160 may correspond to the floorplan information.

In particular embodiments, the VR system 100 may receive an indication the VR display device 135 has moved to a new area of the real-world environment 150 corresponding to the floorplan information. The new area of the real-world environment comprising one or more new real-world objects 145. That is, the user 102 may have moved to a new room in their real-world environment 150 (e.g., the user 102 has moved from the living room to the office), and the new room has new real-world objects 145 for the VR system 100 to identify. The VR system 100 may access attribute information of one or more new real-world objects 145 in the new real-world environment 150 proximate to the VR display device 135. As an example and not by way of limitation, if the first room was a living room containing a real-world couch and a real-world coffee table, and the new room was an office containing a real-world desk, the VR system may access attribute information (such as dimensions and functionality) of the real-world desk. The VR system 100 may render, for the one or more displays of the VR display device 135, a second VR environment 160 with one or more new MR objects 155 corresponding to the one or more new real-world objects 145. Each new MR object 155 may comprise one or more determined new MR functionalities applicable to the corresponding new real-world object 145. As an example and not by way of limitation, if the user has moved from their living room (containing the real-world couch and real-world coffee table) and into their office (containing the real-world desk), the real-world desk may be rendered as an MR desk the user can sit at, or an obstacle for the user to avoid. Although this disclosure describes floorplan information of real-world environments 145 in a particular manner, this disclosure contemplates floorplan information of real-world environments 145 in any suitable manner.

In particular embodiments, the VR system 100 may receive an instruction to transition to a second VR environment 160 of the first VR application 173. As an example and not by way of limitation, if the user is in a VR gaming environment of a VR gaming application, and the VR gaming application transitions into a new gaming level or area, the VR environment may change from a first VR gaming environment of the VR gaming application to a second VR gaming environment of the VR gaming application. The VR system 100 may determine, for each of the one or more real world objects 145, one or more second MR functionalities based on the second VR environment 160 of the first VR application 173 and applicable to the real-world object 145 based on its attribute information. The VR system 100 may render, for one or more displays of the VR display device 135, the second VR environment 160 with one or more MR objects 155 corresponding to the one or more real-world objects 145, where each MR object 155 may comprise one of the second MR functionalities applicable to the corresponding real-world object 145. As an example and not by way of limitation, for a real-world environment 150 comprising a real-world couch and a VR gaming application, in the first VR environment 160 the real-world couch may be rendered as a MR car seat in a virtual car for the user to sit on while the user is "driving" in the VR gaming application, and the armrest of the real-world couch may be rendered as a virtual dashboard for the virtual car. In a second VR environment 160, the real-world couch may be rendered as a MR barricade to hide behind. A technical advantage of the embodiments may include allowing the user to utilize a real-world object in a number of different ways according to changing VR environments. Although this disclosure describes transitioning between VR environments in a particular manner, this disclosure contemplates transitioning between VR environments in any suitable manner.

In particular embodiments, the VR system 100 may receive an instruction to transition to a second VR environment 160 of a second VR application 173. As an example and not by way of limitation, the user may switch from a VR gaming application (having the first VR environment 160) to a VR media streaming application (having a second VR environment 160). The VR system 100 may determine, for each of the one or more real world objects 145, one or more second MR functionalities based on the second VR environment 160 of the second VR application 173 and applicable to the real-world object 145 based on its attribute information. The VR system 100 may render, for one or more displays of the VR display device 135, the second VR environment 160 with one or more MR objects 155 corresponding to the one or more real-world objects 145, where each MR object 155 may comprise one of the second MR functionalities applicable to the corresponding real-world object 145. As an example and not by way of limitation, for a real-world environment 150 comprising a real-world couch, if the user switches from a VR gaming application (the first VR application) to a VR media streaming application (the second VR application), the real-world couch (which may have been rendered as an obstacle for the user to hide behind while in the VR gaming application) may be re-rendered as MR theater seating for the VR media streaming application. A technical advantage of the embodiments may include allowing the user to utilize a real-world object 145 in a number of different ways as different MR objects 155 with different functionalities according to changing VR environments 160. That is, users may leverage the MR object 155 across different VR applications 173 without needing to re-identify the real-world object 145, or re-create the MR object 155, because the VR system 100 retains and shares the attribute information. Although this disclosure describes transitioning between VR environments in a particular manner, this disclosure contemplates transitioning between VR environments in any suitable manner.

Figure 20:
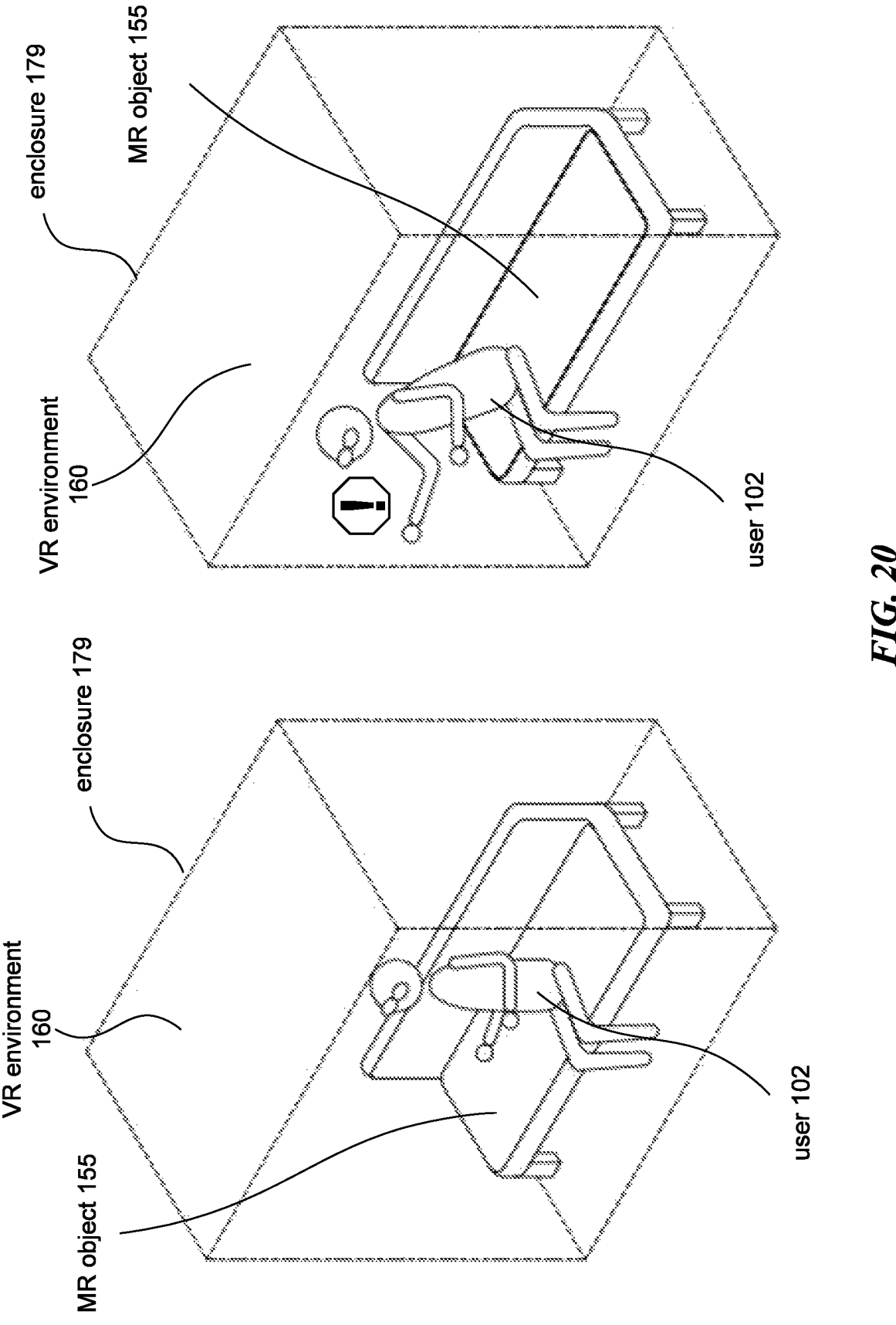
FIG. 20 illustrates a VR environment breach warning.

FIG. 20 illustrates a VR environment 160 breach warning. To maintain immersion of the VR environment 160, the boundary of the enclosure 179 is not present. However, if the user 102 is about to breach the enclosure, or actually breaches the enclosure 179, the VR system 100 may alert the user 102. The alert may be a pop-up warning (e.g., an exclamation point, a stop sign, a guardian wall texture, etc.). The alert may also appear as a transition to a passthrough view of the real-world environment 150, or as a virtual wall showing the boundary of the enclosure 179. The alert may appear as a notification (e.g., textual notification on the VR display device 135 or on via a virtual UI).

Figure 21:
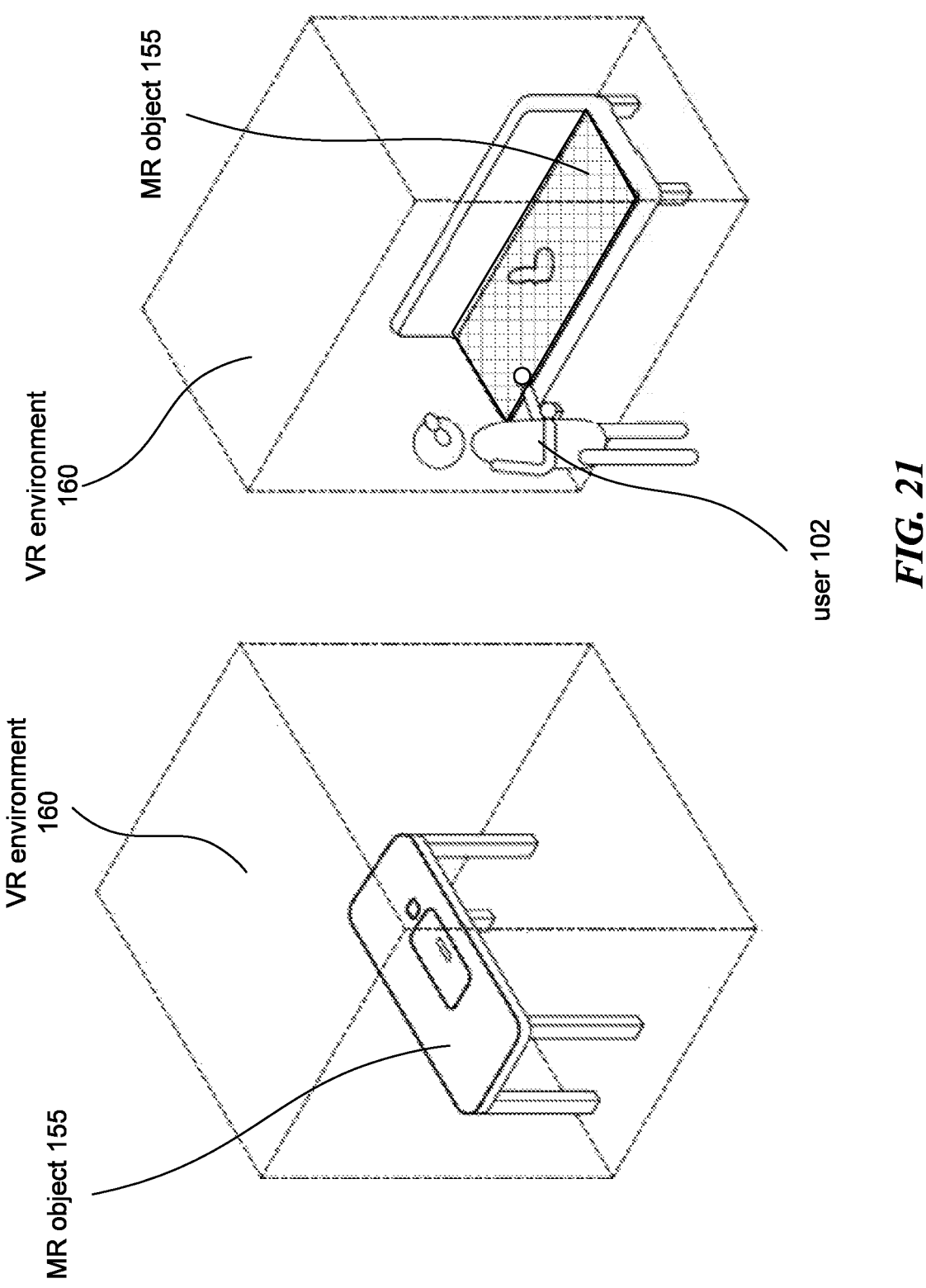
FIG. 21 illustrates a MR object proximity notice.

FIG. 21 illustrates a MR object 155 proximity notice. MR objects 155 may be highlighted, outlined, or made apparent to the user 102 based on proximity of the user 102 to the MR object 155. As an example and not by way of limitation, if the user 102 is standing next to the MR couch, the seat of the MR couch may be highlighted for the user 102. If the user 102 is not proximate to the MR object 155, the MR object 155 is not made apparent to the user 102. As an example and not by way of limitation, if the user 102 is standing far away from a MR desk, the MR desk may not be highlighted for use by the user 102. However, if the user 102 moves toward the MR desk, then an outline may appear indicating the user 102 may use the MR desk. Thus, the MR object 155 is not made apparent until it becomes relevant.

Figure 22:
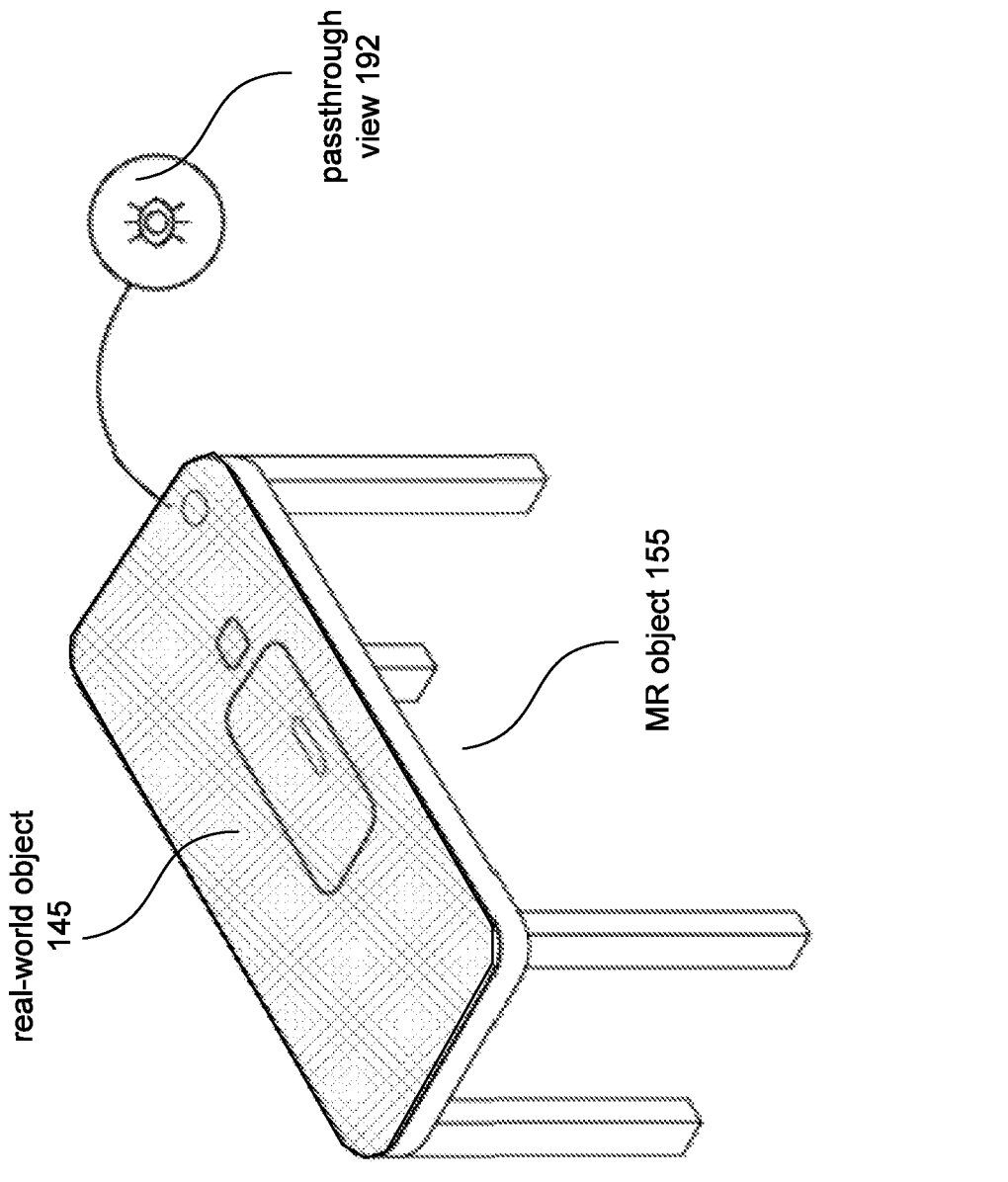
FIG. 22 illustrates a passthrough view of the MR object.
Figure 23:
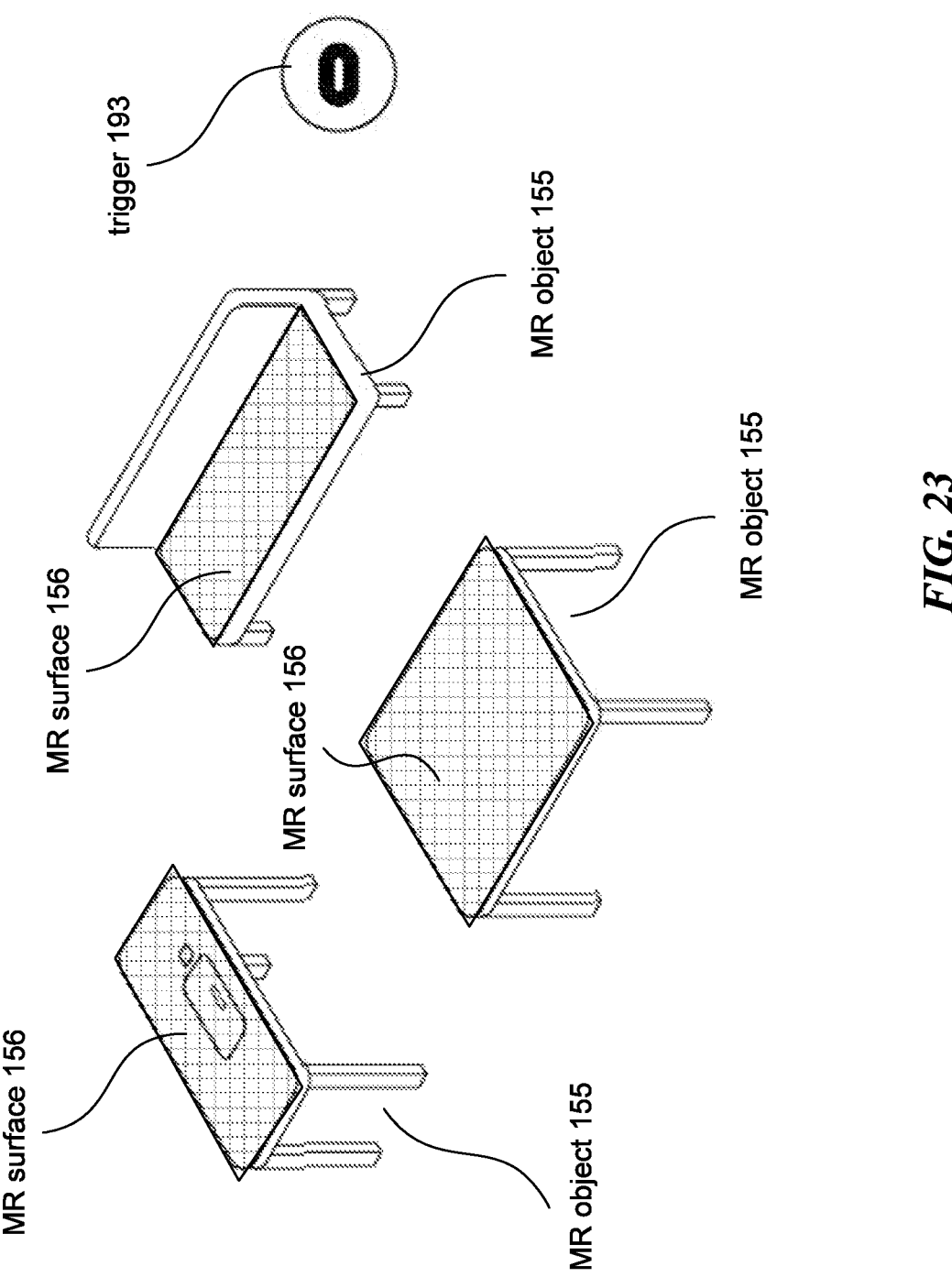
FIG. 23 illustrates a trigger for presenting identified MR objects.

FIG. 22 illustrates a passthrough view of the MR object 155. The VR system 100 may present a passthrough view 192 of the MR surface 156 of the MR object 155 to show the corresponding surface of the real-world object 145. This may be done via a passthrough portal. For example, if the user wishes to view what items are on the real-world desk corresponding to the MR desk, the user may use the passthrough portal to view the real-world desk. The user can thus safely interact with the MR object 155 by ensuring what is present on the corresponding real-world object 145. FIG. 23 illustrates a trigger 193 for presenting identified MR objects 155. The user can select the trigger 193 to present identified MR objects 155, MR surfaces 156, or any other identified or defined boundaries. The trigger 193 may be, for example, a recenter button of the VR display device 135.

FIG. 24 illustrates the virtual user interface (UI) 190 interacting with the MR object 155. When the user is proximate to or at the MR object 155, the virtual UI 190 may adapt its form according to the MR object 155. For example, if the user 102 is at a MR desk, the virtual UI 190, which ordinarily appears as a floating virtual object proximate to the user 102, may adapt its form to turn into a multi-monitor display. This may be useful when the user 102 is in a VR workspace environment, and the virtual UI 190 mimics the appearance of a multi-monitor work display. As another example, the virtual UI 190 may appear as a widescreen television when the user 102 is at a MR couch, thus mimicking the appearance of a living room configuration. More information on user interfaces for interacting with mixed-reality and virtual-reality applications may be found in U.S. patent application Ser. No. 17/174,037, filed 11 Feb. 2021, which is incorporated herein by reference.

Figure 25:
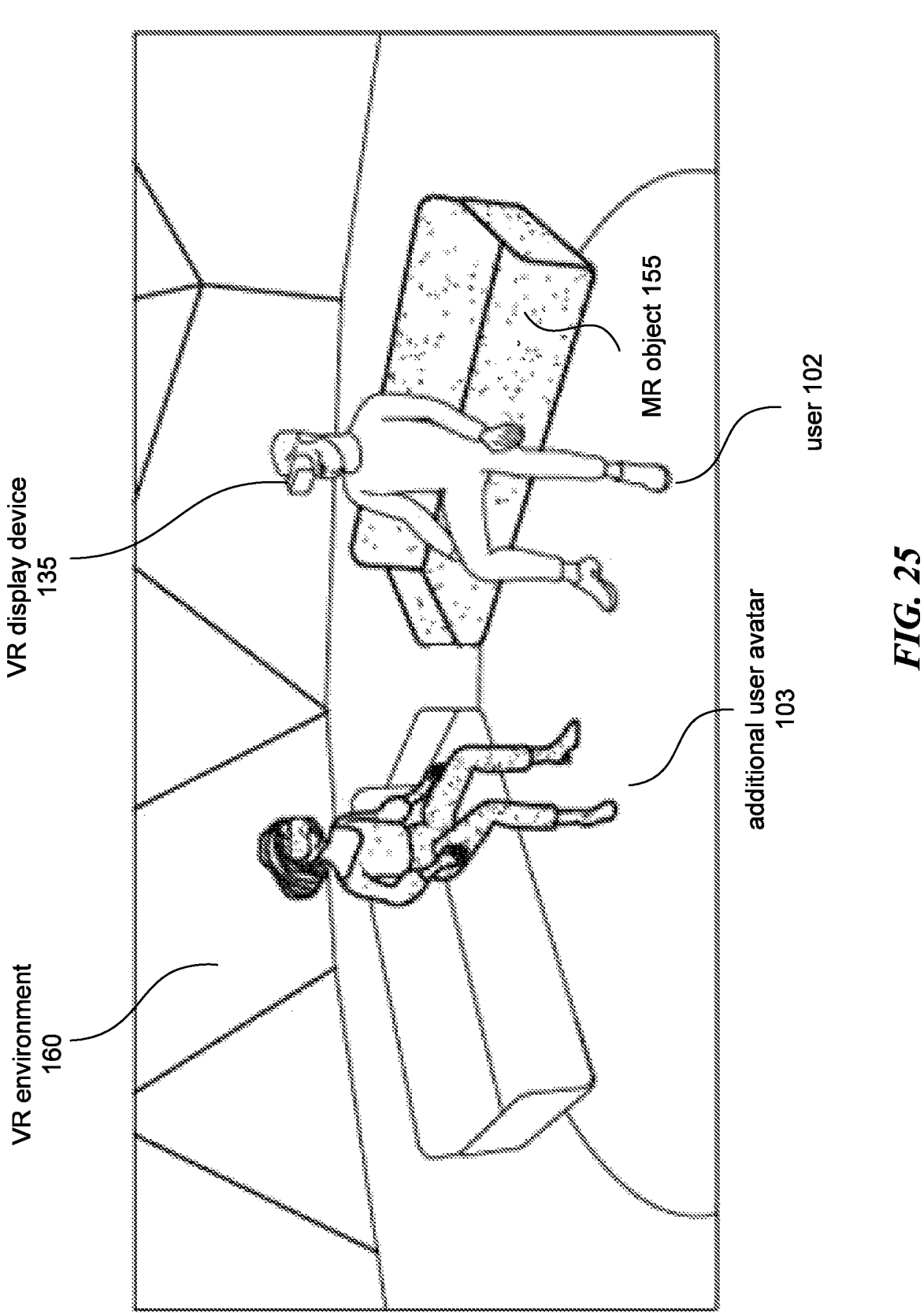
FIG. 25 illustrates a MR co-presence configuration.

FIG. 25 illustrates a MR co-presence configuration. The MR object 155 may be configured to enable a comfortable co-presence experience for the user 102. As an example and not by way of limitation, the user 102 may be seated at the MR couch, and across from the MR couch in the VR environment 160 is an additional user avatar 103 (corresponding to an additional user), where the additional user avatar 103 is rendered on a VR couch in the VR environment 160. As yet another example and not by way of limitation, the additional user avatar 103 (corresponding to the additional user) may be seated at the MR couch next to the user 102 (e.g., the user 102 and the additional user avatar 103 are seated next to each other on the same MR couch). As another example, in a workplace VR environment, the user 102 may be seated at a MR conference table across from the additional user avatar 103.

One technical challenge may include integrating VR representations of other users into a first user's VR experience, where adding a floating or randomly placed avatar representing these other users may break the VR immersion experience for the first user. The solution presented by the embodiments disclosed herein to address this challenge may be to place avatars corresponding to the other users on or around MR objects 155 to improve the co-presence experience of the first user and the other users. In particular embodiments, the VR system 100 may render, for the one or more displays of the VR display device 135, an avatar corresponding to a second user (e.g., the additional user avatar 103) within the first VR environment 160. The placement of the avatar within the first VR environment 160 at the MR object 155 may correspond to the determined MR functionality. That is, rather than having a floating avatar within the VR environment 160, the avatar of the second user may be purposefully placed within the VR environment 160. As an example and not by way of limitation, in a co-presence situation, the user 102 and the additional user avatar 103 may be placed side by side on a couch while the user 102 is in a VR media streaming application watching a movie. As another example and not by way of limitation, the user 102 and the additional user avatar 103 may be placed at opposite ends of a table while in a VR tennis game application. Although this disclosure describes rendering a second user within the VR environment 160 in a particular manner, this disclosure contemplates a second user within the VR environment 160 in any suitable manner.

Figure 26:
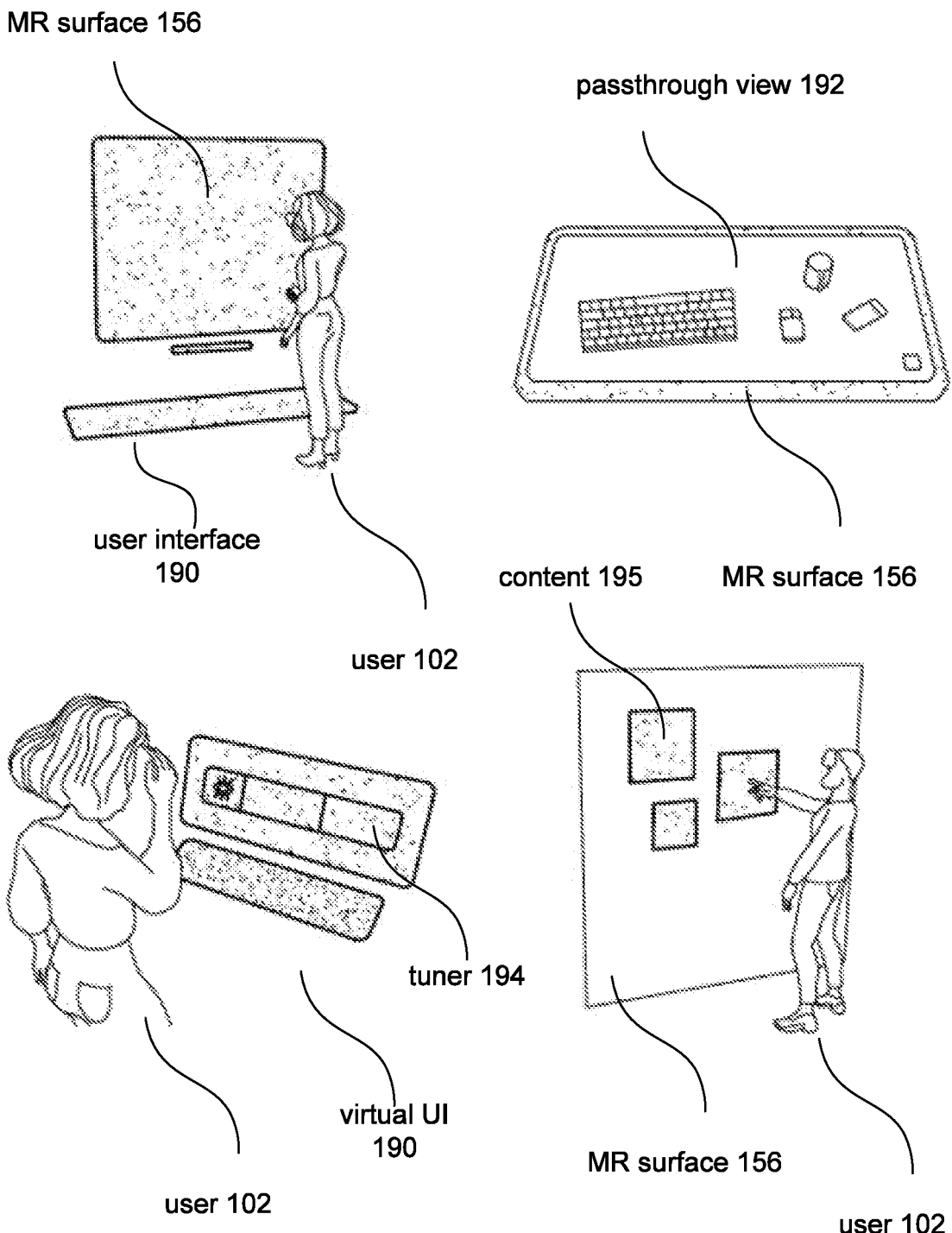
FIG. 26 illustrates features of a MR workplace configuration.

FIG. 26 illustrates features of a MR workplace configuration. Features of the MR workplace may include turning a vertical surface (such as a wall) into a whiteboard or a virtual monitor display. For example, a wall may be rendered as a MR whiteboard for the user 102 to work on. As another example, the virtual user interface (UI) 190 may be adapted into a whiteboard or monitor display on the MR surface 156 of a wall. Another feature of the MR workplace may be using the VR system 100 to automatically detect planar surfaces (such as walls or desks) to allow the user to quickly add or "pin" content 195 to the planar MR surface 156. Yet another feature of the MR workplace may be allowing the user to view a passthrough view 192 of the MR surface 156. For example, if the user wishes to work on a MR desk that corresponds to a real-world desk, the user may view a passthrough view 192 of the real-world desk to ensure the user can safely work on the MR desk by ensuring the real-world desk is free of any objects or hazards. Another feature of the MR workplace may be allowing the user 102 to use a tuner 194 to toggle between the VR workplace environment 160 and the real-world environment 150.

Figure 27:
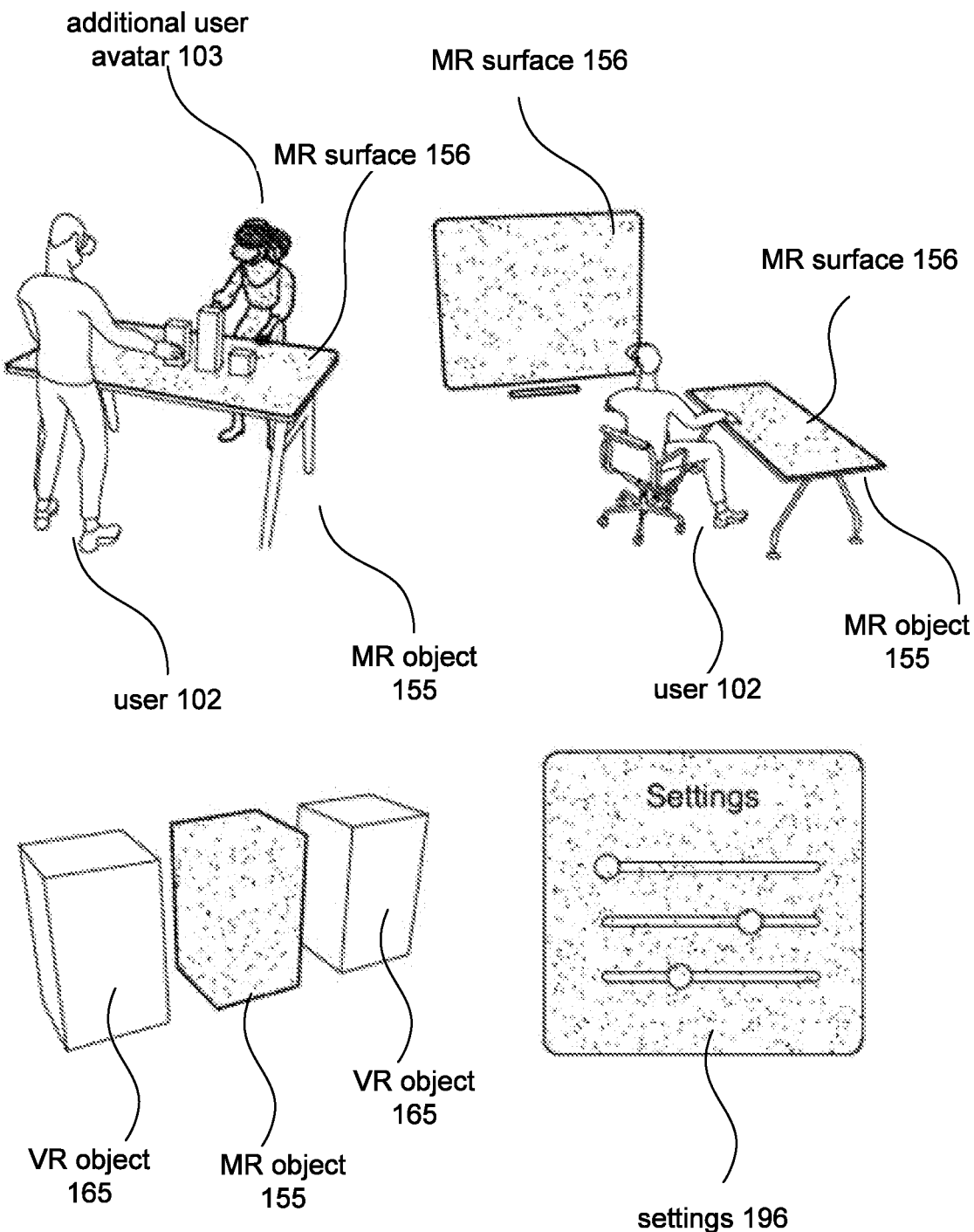
FIG. 27 illustrates features for MR experience developers.

FIG. 27 illustrates features for MR experience developers (e.g., VR application developers who may determine MR functionalities for MR objects 155 in VR applications). Features that may be relevant to VR application developers creating MR experiences include a "tabletop" function, which can be used to permit access for users 102 and/or additional user avatars 103 to MR objects 155 and/or MR surfaces 156. Thus, key MR objects 155 and/or MR surfaces 156 may be integrated into the VR environment more seamlessly. For example, a MR experience developer may assign a common MR object, such as a MR desk, to have a standard function within the MR experience. Another feature for MR experience developers includes coordinating two or more MR objects 155 and/or MR surfaces 156, thus allowing a VR application to direct users between the two or more MR objects 155 and/or MR surfaces 156. Another feature for MR experience developers includes differentiating between MR objects 155 and VR objects 165. The platform may signify which objects are MR objects 155, and which objects are VR objects 165. Thus, future users may be able to interact with the MR objects 155. Another feature for MR experience developers may include allowing for adjustment of settings 196 related to the MR experience. The settings 196 can be used to give users control over their MR experience, e.g., by allowing the user to leverage real-world objects as different types of pre-selected MR objects. A developer may determine, based on the attribute information associated with the MR object 155, what the MR object 155 will be in the VR environment 160. For example, a real-world bench may be turned into a MR obstacle for the user to walk around, or a MR object for the user to hide behind.

FIG. 28 illustrates an example method 2800 for leveraging real-world objects as MR objects in VR environments. The method may begin at step 2810, where one or more computing systems may receive an instruction to transition to a first VR environment of a first VR application. At step 2820, the one or more computing systems may access attribute information of one or more real-world objects in a real-world environment proximate to a VR display device. At step 2830, the one or more computing systems may determine, for each of the one or more real-world objects, one or more first MR functionalities applicable to the real-world object based on its attribute information. At step 2840, the one or more computing systems may render, for one or more displays of the VR display device, the first VR environment with one or more MR objects corresponding to the one or more real-world objects. Each MR object may comprise one of the first MR functionalities applicable to the corresponding real-world object. Particular embodiments may repeat one or more steps of the method of FIG. 28, where appropriate. Although this disclosure describes and illustrates particular steps of the method of FIG. 28 as occurring in a particular order, this disclosure contemplates any suitable steps of the method of FIG. 28 occurring in any suitable order. Moreover, although this disclosure describes and illustrates an example method for leveraging real-world objects as MR objects in VR environments including the particular steps of the method of FIG. 28, this disclosure contemplates any suitable method for leveraging real-world objects as MR objects in VR environments including any suitable steps, which may include all, some, or none of the steps of the method of FIG. 28, where appropriate. Furthermore, although this disclosure describes and illustrates particular components, devices, or systems carrying out particular steps of the method of FIG. 28, this disclosure contemplates any suitable combination of any suitable components, devices, or systems carrying out any suitable steps of the method of FIG. 28. Finally, although this disclosure describes leveraging real-world objects as MR objects in VR environments, this disclosure contemplates leveraging real-world objects as MR objects in any suitable environments. As an example, this disclosure contemplates leveraging real-world objects as MR objects in augmented reality (AR) environments, where the AR system may use the attribute information of a real-world object to determine a suitable MR functionality to apply to the real-world object in the AR environment.

Figure 29:
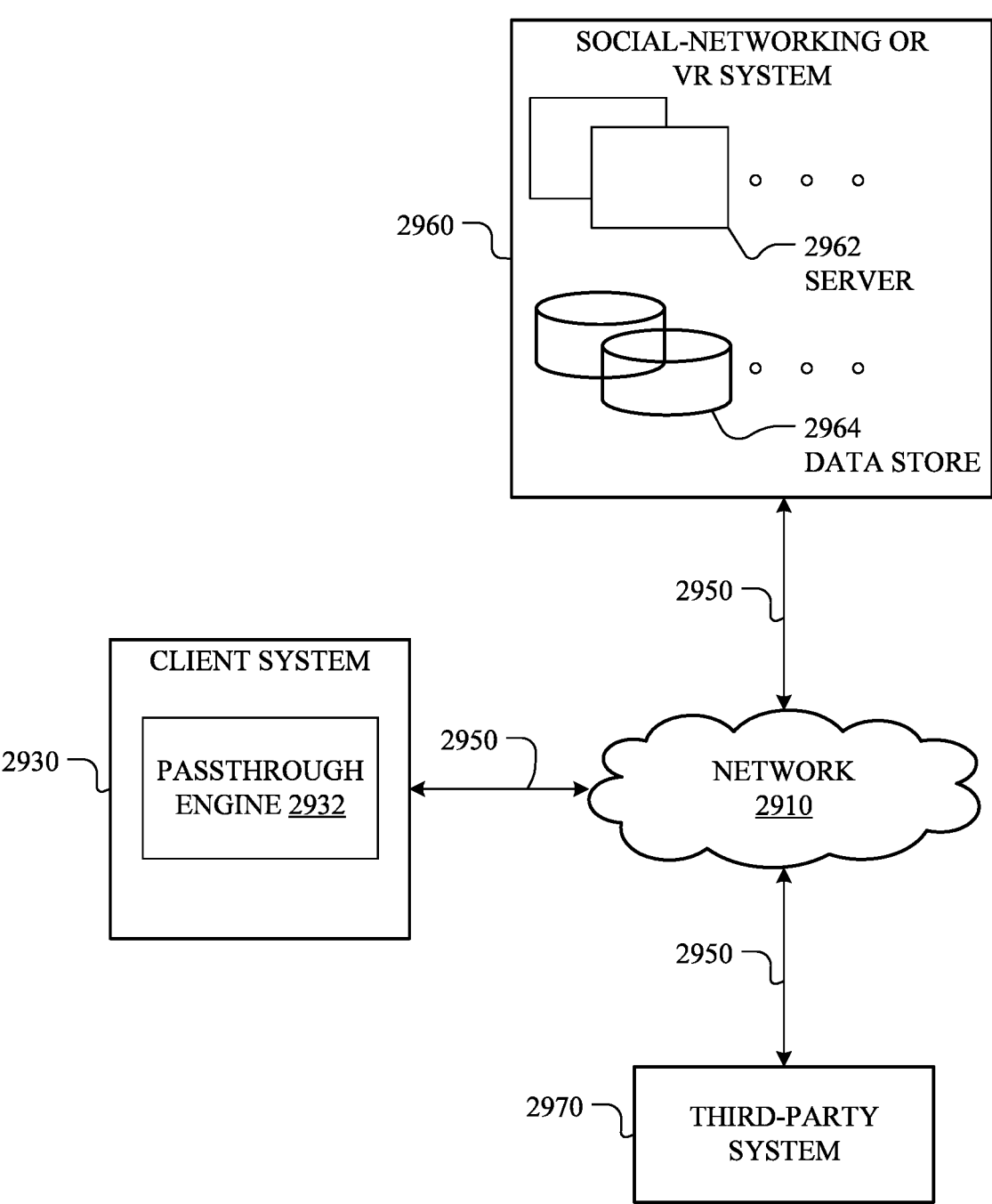
FIG. 29 illustrates an example network environment associated with a social-networking system.

FIG. 29 illustrates an example network environment 2900 associated with a social-networking system. Network environment 2900 includes a client system 2930, a social-networking system 2960, and a third-party system 2970 connected to each other by a network 2910. Although FIG. 29 illustrates a particular arrangement of client system 2930, social-networking system 2960, third-party system 2970, and network 2910, this disclosure contemplates any suitable arrangement of client system 2930, social-networking system 2960, third-party system 2970, and network 2910. As an example and not by way of limitation, two or more of client system 2930, social-networking system 2960, and third-party system 2970 may be connected to each other directly, bypassing network 2910. As another example, two or more of client system 2930, social-networking system 2960, and third-party system 2970 may be physically or logically co-located with each other in whole or in part. Moreover, although FIG. 29 illustrates a particular number of client systems 2930, social-networking systems 2960, third-party systems 2970, and networks 2910, this disclosure contemplates any suitable number of client systems 2930, social-networking systems 2960, third-party systems 2970, and networks 2910. As an example and not by way of limitation, network environment 2900 may include multiple client system 2930, social-networking systems 2960, third-party systems 2970, and networks 2910.

This disclosure contemplates any suitable network 2910. As an example and not by way of limitation, one or more portions of network 2910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 2910 may include one or more networks 2910.

Links 2950 may connect client system 2930, social-networking system 2960, and third-party system 2970 to communication network 2910 or to each other. This disclosure contemplates any suitable links 2950. In particular embodiments, one or more links 2950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 2950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 2950, or a combination of two or more such links 2950. Links 2950 need not necessarily be the same throughout network environment 2900. One or more first links 2950 may differ in one or more respects from one or more second links 2950.

In particular embodiments, client system 2930 may be an electronic device including hardware, software, or embedded logic components or a combination of two or more such components and capable of carrying out the appropriate functionalities implemented or supported by client system 2930. As an example and not by way of limitation, a client system 2930 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 2930. A client system 2930 may enable a network user at client system 2930 to access network 2910. A client system 2930 may enable its user to communicate with other users at other client systems 2930.

In particular embodiments, client system 2930 may include a web browser 2932, and may have one or more add-ons, plug-ins, or other extensions. A user at client system 2930 may enter a Uniform Resource Locator (URL) or other address directing the web browser 2932 to a particular server (such as server 2962, or a server associated with a third-party system 2970), and the web browser 2932 may generate a Hyper Text Transfer Protocol (HTTP) request and communicate the HTTP request to server. The server may accept the HTTP request and communicate to client system 2930 one or more Hyper Text Markup Language (HTML) files responsive to the HTTP request. Client system 2930 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML)

files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 2960 may be a network-addressable computing system that can host an online social network. Social-networking system 2960 may generate, store, receive, and send social-networking data, such as, for example, user-profile data, concept-profile data, social-graph information, or other suitable data related to the online social network. Social-networking system 2960 may be accessed by the other components of network environment 2900 either directly or via network 2910. As an example and not by way of limitation, client system 2930 may access social-networking system 2960 using a web browser 2932, or a native application associated with social-networking system 2960 (e.g., a mobile social-networking application, a messaging application, another suitable application, or any combination thereof) either directly or via network 2910. In particular embodiments, social-networking system 2960 may include one or more servers 2962. Each server 2962 may be a unitary server or a distributed server spanning multiple computers or multiple datacenters. Servers 2962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 2962 may include hardware, software, or embedded logic components or a combination of two or more such components for carrying out the appropriate functionalities implemented or supported by server 2962. In particular embodiments, social-networking system 2960 may include one or more data stores 2964. Data stores 2964 may be used to store various types of information. In particular embodiments, the information stored in data stores 2964 may be organized according to specific data structures. In particular embodiments, each data store 2964 may be a relational, columnar, correlation, or other suitable database. Although this disclosure describes or illustrates particular types of databases, this disclosure contemplates any suitable types of databases. Particular embodiments may provide interfaces that enable a client system 2930, a social-networking system 2960, or a third-party system 2970 to manage, retrieve, modify, add, or delete, the information stored in data store 2964.

In particular embodiments, social-networking system 2960 may store one or more social graphs in one or more data stores 2964. In particular embodiments, a social graph may include multiple nodes—which may include multiple user nodes (each corresponding to a particular user) or multiple concept nodes (each corresponding to a particular concept)—and multiple edges connecting the nodes. Social-networking system 2960 may provide users of the online social network the ability to communicate and interact with other users. In particular embodiments, users may join the online social network via social-networking system 2960 and then add connections (e.g., relationships) to a number of other users of social-networking system 2960 to whom they want to be connected. Herein, the term "friend" may refer to any other user of social-networking system 2960 with whom a user has formed a connection, association, or relationship via social-networking system 2960.

In particular embodiments, social-networking system 2960 may provide users with the ability to take actions on various types of items or objects, supported by social-networking system 2960. As an example and not by way of limitation, the items and objects may include groups or social networks to which users of social-networking system 2960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 2960 or by an external system of third-party system 2970, which is separate from social-networking system 2960 and coupled to social-networking system 2960 via a network 2910.

In particular embodiments, social-networking system 2960 may be capable of linking a variety of entities. As an example and not by way of limitation, social-networking system 2960 may enable users to interact with each other as well as receive content from third-party systems 2970 or other entities, or to allow users to interact with these entities through an application programming interfaces (API) or other communication channels.

In particular embodiments, a third-party system 2970 may include one or more types of servers, one or more data stores, one or more interfaces, including but not limited to APIs, one or more web services, one or more content sources, one or more networks, or any other suitable components, e.g., that servers may communicate with. A third-party system 2970 may be operated by a different entity from an entity operating social-networking system 2960. In particular embodiments, however, social-networking system 2960 and third-party systems 2970 may operate in conjunction with each other to provide social-networking services to users of social-networking system 2960 or third-party systems 2970. In this sense, social-networking system 2960 may provide a platform, or backbone, which other systems, such as third-party systems 2970, may use to provide social-networking services and functionality to users across the Internet.

In particular embodiments, a third-party system 2970 may include a third-party content object provider. A third-party content object provider may include one or more sources of content objects, which may be communicated to a client system 2930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 2960 also includes user-generated content objects, which may enhance a user's interactions with social-networking system 2960. User-generated content may include anything a user can add, upload, send, or "post" to social-networking system 2960. As an example and not by way of limitation, a user communicates posts to social-networking system 2960 from a client system 2930. Posts may include data such as status updates or other textual data, location information, photos, videos, links, music or other similar data or media. Content may also be added to social-networking system 2960 by a third-party through a "communication channel," such as a newsfeed or stream.

In particular embodiments, social-networking system 2960 may include a variety of servers, sub-systems, programs, modules, logs, and data stores. In particular embodiments, social-networking system 2960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 2960 may also include suitable components such as network interfaces, security mechanisms, load balancers, failover servers, management-and-network-operations consoles, other suitable components, or any suitable combination thereof. In particular embodiments, social-networking system 2960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 2960 to one or more client systems 2930 or one or more third-party system 2970 via network 2910. The web server may include a mail server or other messaging functionality for receiving and routing messages between social-networking system 2960 and one or more client systems 2930. An API-request server may allow a third-party system 2970 to access information from social-networking system 2960 by calling one or more APIs. An action logger may be used to receive communications from a web server about a user's actions on or off social-networking system 2960. In conjunction with the action log, a third-party-content-object log may be maintained of user exposures to third-party-content objects. A notification controller may provide information regarding content objects to a client system 2930. Information may be pushed to a client system 2930 as notifications, or information may be pulled from client system 2930 responsive to a request received from client system 2930. Authorization servers may be used to enforce one or more privacy settings of the users of social-networking system 2960. A privacy setting of a user determines how particular information associated with a user can be shared. The authorization server may allow users to opt in to or opt out of having their actions logged by social-networking system 2960 or shared with other systems (e.g., third-party system 2970), such as, for example, by setting appropriate privacy settings. Third-party-content-object stores may be used to store content objects received from third parties, such as a third-party system 2970. Location stores may be used for storing location information received from client systems 2930 associated with users. Advertisement-pricing modules may combine social information, the current time, location information, or other suitable information to provide relevant advertisements, in the form of notifications, to a user.

Systems and Methods

Figure 30:
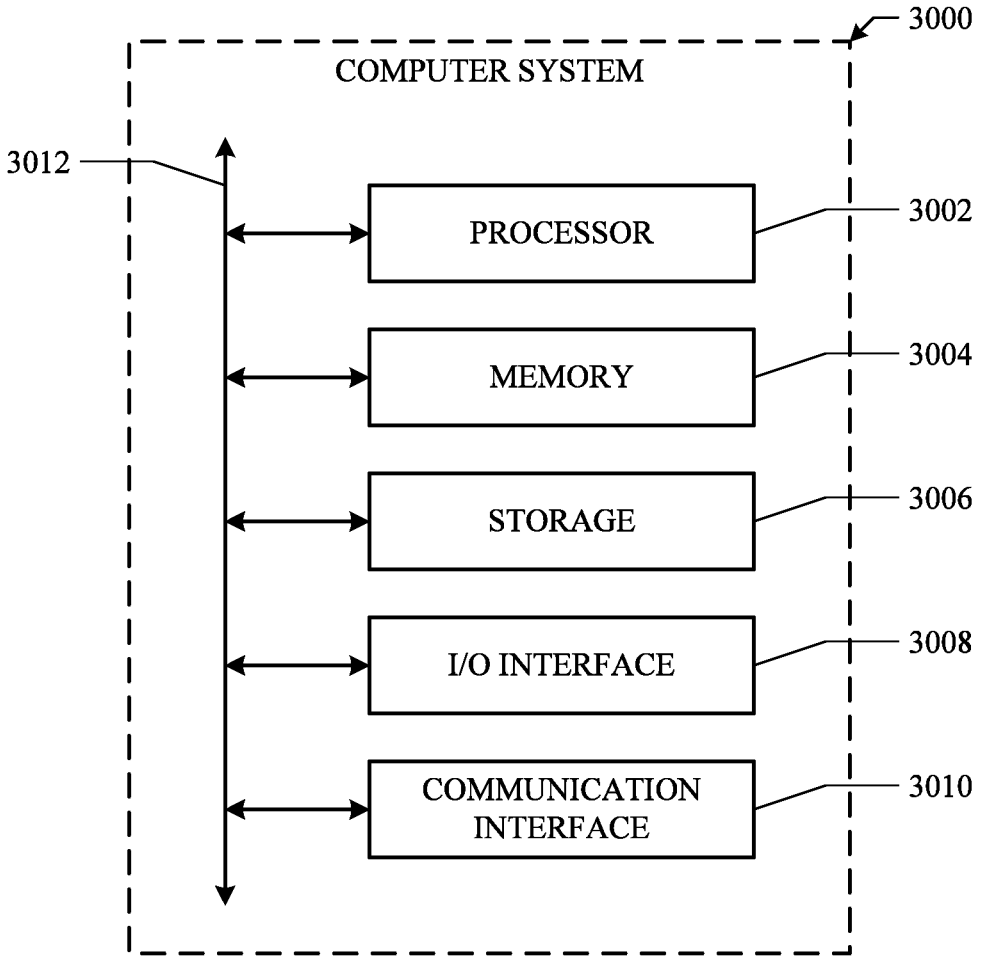
FIG. 30 illustrates an example computer system.

FIG. 30 illustrates an example computer system 3000. In particular embodiments, one or more computer systems 3000 perform one or more steps of one or more methods described or illustrated herein. In particular embodiments, one or more computer systems 3000 provide functionality described or illustrated herein. In particular embodiments, software running on one or more computer systems 3000 performs one or more steps of one or more methods described or illustrated herein or provides functionality described or illustrated herein. Particular embodiments include one or more portions of one or more computer systems 3000. Herein, reference to a computer system may encompass a computing device, and vice versa, where appropriate. Moreover, reference to a computer system may encompass one or more computer systems, where appropriate.

This disclosure contemplates any suitable number of computer systems 3000. This disclosure contemplates computer system 3000 taking any suitable physical form. As example and not by way of limitation, computer system 3000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 3000 may include one or more computer systems 3000; be unitary or distributed; span multiple locations; span multiple machines; span multiple data centers; or reside in a cloud, which may include one or more cloud components in one or more networks. Where appropriate, one or more computer systems 3000 may perform without substantial spatial or temporal limitation one or more steps of one or more methods described or illustrated herein. As an example and not by way of limitation, one or more computer systems 3000 may perform in real time or in batch mode one or more steps of one or more methods described or illustrated herein. One or more computer systems 3000 may perform at different times or at different locations one or more steps of one or more methods described or illustrated herein, where appropriate.

In particular embodiments, computer system 3000 includes a processor 3002, memory 3004, storage 3006, an input/output (I/O) interface 3008, a communication interface 3010, and a bus 3012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 3002 includes hardware for executing instructions, such as those making up a computer program. As an example and not by way of limitation, to execute instructions, processor 3002 may retrieve (or fetch) the instructions from an internal register, an internal cache, memory 3004, or storage 3006; decode and execute them; and then write one or more results to an internal register, an internal cache, memory 3004, or storage 3006. In particular embodiments, processor 3002 may include one or more internal caches for data, instructions, or addresses. This disclosure contemplates processor 3002 including any suitable number of any suitable internal caches, where appropriate. As an example and not by way of limitation, processor 3002 may include one or more instruction caches, one or more data caches, and one or more translation lookaside buffers (TLBs). Instructions in the instruction caches may be copies of instructions in memory 3004 or storage 3006, and the instruction caches may speed up retrieval of those instructions by processor 3002. Data in the data caches may be copies of data in memory 3004 or storage 3006 for instructions executing at processor 3002 to operate on; the results of previous instructions executed at processor 3002 for access by subsequent instructions executing at processor 3002 or for writing to memory 3004 or storage 3006; or other suitable data. The data caches may speed up read or write operations by processor 3002. The TLBs may speed up virtual-address translation for processor 3002. In particular embodiments, processor 3002 may include one or more internal registers for data, instructions, or addresses. This disclosure contemplates processor 3002 including any suitable number of any suitable internal registers, where appropriate. Where appropriate, processor 3002 may include one or more arithmetic logic units (ALUs); be a multi-core processor; or include one or more processors 3002. Although this disclosure describes and illustrates a particular processor, this disclosure contemplates any suitable processor.

In particular embodiments, memory 3004 includes main memory for storing instructions for processor 3002 to execute or data for processor 3002 to operate on. As an example and not by way of limitation, computer system 3000 may load instructions from storage 3006 or another source (such as, for example, another computer system 3000) to memory 3004. Processor 3002 may then load the instructions from memory 3004 to an internal register or internal cache. To execute the instructions, processor 3002 may retrieve the instructions from the internal register or internal cache and decode them. During or after execution of the instructions, processor 3002 may write one or more results (which may be intermediate or final results) to the internal register or internal cache. Processor 3002 may then write one or more of those results to memory 3004. In particular embodiments, processor 3002 executes only instructions in one or more internal registers or internal caches or in memory 3004 (as opposed to storage 3006 or elsewhere) and operates only on data in one or more internal registers or internal caches or in memory 3004 (as opposed to storage 3006 or elsewhere). One or more memory buses (which may each include an address bus and a data bus) may couple processor 3002 to memory 3004. Bus 3012 may include one or more memory buses, as described below. In particular embodiments, one or more memory management units (MMUs) reside between processor 3002 and memory 3004 and facilitate accesses to memory 3004 requested by processor 3002. In particular embodiments, memory 3004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 3004 may include one or more memories 3004, where appropriate. Although this disclosure describes and illustrates particular memory, this disclosure contemplates any suitable memory.

In particular embodiments, storage 3006 includes mass storage for data or instructions. As an example and not by way of limitation, storage 3006 may include a hard disk drive (HDD), a floppy disk drive, flash memory, an optical disc, a magneto-optical disc, magnetic tape, or a Universal Serial Bus (USB) drive or a combination of two or more of these. Storage 3006 may include removable or non-removable (or fixed) media, where appropriate. Storage 3006 may be internal or external to computer system 3000, where appropriate. In particular embodiments, storage 3006 is non-volatile, solid-state memory. In particular embodiments, storage 3006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 3006 taking any suitable physical form. Storage 3006 may include one or more storage control units facilitating communication between processor 3002 and storage 3006, where appropriate. Where appropriate, storage 3006 may include one or more storages 3006. Although this disclosure describes and illustrates particular storage, this disclosure contemplates any suitable storage.

In particular embodiments, I/O interface 3008 includes hardware, software, or both, providing one or more interfaces for communication between computer system 3000 and one or more I/O devices. Computer system 3000 may include one or more of these I/O devices, where appropriate. One or more of these I/O devices may enable communication between a person and computer system 3000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 3008 for them. Where appropriate, I/O interface 3008 may include one or more device or software drivers enabling processor 3002 to drive one or more of these I/O devices. I/O interface 3008 may include one or more I/O interfaces 3008, where appropriate. Although this disclosure describes and illustrates a particular I/O interface, this disclosure contemplates any suitable I/O interface.

In particular embodiments, communication interface 3010 includes hardware, software, or both providing one or more interfaces for communication (such as, for example, packet-based communication) between computer system 3000 and one or more other computer systems 3000 or one or more networks. As an example and not by way of limitation, communication interface 3010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3010 for it. As an example and not by way of limitation, computer system 3000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 3000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 3000 may include any suitable communication interface 3010 for any of these networks, where appropriate. Communication interface 3010 may include one or more communication interfaces 3010, where appropriate. Although this disclosure describes and illustrates a particular communication interface, this disclosure contemplates any suitable communication interface.

In particular embodiments, bus 3012 includes hardware, software, or both coupling components of computer system 3000 to each other. As an example and not by way of limitation, bus 3012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3012 may include one or more buses 3012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

We claim:

1. A method, by one or more computing systems, the method comprising:

accessing attribute information for a plurality of real-world objects in a real-world environment, wherein the attribute information specifies a first real-world function of at least one first real-world object of the plurality of real-world objects;

generating a first mixed reality (MR) object, corresponding to the at least one first real-world object of the plurality of real-world objects, wherein the first MR object has a first MR function corresponding to the first real-world function of the at least one first real-world object;

generating a second MR object, corresponding to at least one second real-world object of the plurality of real-world objects;

determining one or more requirements of a virtual reality environment, wherein the determined one or more requirements specify that the first MR function is needed for the virtual reality environment;

based on the determined one or more requirements of the virtual reality environment, rendering, on a head-mounted display, the virtual reality environment with the first MR object corresponding to the at least one first real-world object and omitting, from the virtual reality environment, the second MR object; and making the at least one second real-world object visible via the head-mounted display, wherein the making the at least one second real-world object visible includes not rendering a portion of the first MR object based on determined contours of the second real-world object, while the remainder of the first MR object continues to be displayed in the virtual reality environment, making the not rendered portion of the first MR object appear occluded by the second real-world object.

2. The method of claim 1, wherein the omitting the second MR object is further based on the attribute information indicating the at least one second real-world object is within a threshold distance of the one or more computing systems.

3. The method of claim 1, wherein the omitting the second MR object is further based on a trigger switch activation for a passthrough view for the second MR object.

4. The method of claim 1, wherein the attribute information, associated with the at least one second real-world object, comprises one or more spatial dimensions.

5. The method of claim 1, wherein the attribute information, associated with the at least one second real-world object, comprises one or more volumetric shapes.

6. The method of claim 1, further comprising:

rendering an avatar corresponding to a user within the virtual reality environment, wherein rendering the avatar comprises placing the avatar, within the virtual reality environment relative to the first MR object, based on the first MR function of the first MR object.

7. The method of claim 1, wherein the first MR function of the first MR object is customized based on the virtual reality environment.

8. The method of claim 1, wherein the first MR function of the first MR object is customized to a functionality that is applied by an artificial reality application and appropriate to the virtual reality environment.

9. The method of claim 1, wherein the first MR function of the first MR object is suggested based on available functionalities within the virtual reality environment that are suitable for the first MR object.

10. A non-transitory computer-readable storage medium storing instructions that, when executed by a computing system, cause the computing system to:

access attribute information for a plurality of real-world objects in a real-world environment, wherein the attribute information specifies a first real-world function of at least one first real-world object of the plurality of real-world objects;

generate a first mixed reality (MR) object, corresponding to at least one first real-world object of the plurality of real-world objects, wherein the first MR object has a first MR function corresponding to the first real-world function of the at least one first real-world object;

generate a second MR object, corresponding to at least one second real-world object of the plurality of real-world objects;

determine one or more requirements of a virtual reality environment, wherein the determined one or more requirements specify that the first MR function is needed for the virtual reality environment;

based on the determined one or more requirements of the virtual reality environment, render, on a head-mounted display, the virtual reality environment with the first MR object corresponding to the at least one first real-world object and omit, from the virtual reality environment, the second MR object; and make the at least one second real-world object visible via the head-mounted display, wherein the making the at least one second real-world object visible includes not rendering a portion of the first MR object based on determined contours of the second real-world object, while the remainder of the first MR object continues to be displayed in the virtual reality environment, making the not rendered portion of the first MR object appear occluded by the second real-world object.

11. The non-transitory computer-readable storage medium of claim 10, wherein the omitting the second MR object is further based on the attribute information indicating the at least one second real-world object is within a threshold distance of the one or more computing systems.

12. The non-transitory computer-readable storage medium of claim 10, wherein the omitting the second MR object is further based on a trigger switch activation for a passthrough view for the second MR object.

13. The non-transitory computer-readable storage medium of claim 10, wherein the attribute information, associated with the at least one second real-world object, comprises one or more spatial dimensions.

14. The non-transitory computer-readable storage medium of claim 10, wherein the attribute information, associated with the at least one second real-world object, comprises one or more volumetric shapes.

15. The non-transitory computer-readable storage medium of claim 10, wherein the instructions, when executed, further cause the computing system to:

render an avatar corresponding to a user within the virtual reality environment, wherein rendering the avatar comprises placing the avatar, within the virtual reality environment relative to the first MR object, based on the first MR function of the first MR object.

16. A computing system comprising:

one or more processors; and one or more memories storing instructions that, when executed by the one or more processors, cause the computing system to:

access attribute information for a plurality of real-world objects in a real-world environment, wherein the attribute information specifies a first real-world function of at least one first real-world object of the plurality of real-world objects;

generate a first mixed reality (MR) object, corresponding to at least one first real-world object of the plurality of real-world objects, wherein the first MR object has a first MR function corresponding to the first real-world function of the at least one first real-world object;

generate a second MR object, corresponding to at least one second real-world object of the plurality of real-world objects;

determine one or more requirements of a virtual reality environment, wherein the determined one or more requirements specify that the first MR function is needed for the virtual reality environment;

based on the determined one or more requirements of the virtual reality environment, render, on a head-mounted display, an environment with the first MR object corresponding to the at least one first real-world object and omit, from the virtual reality environment, the second MR object; and make the at least one second real-world object visible via the head-mounted display, wherein the making the at least one second real-world object visible includes not rendering a portion of the first MR object based on determined contours of the second real-world object, while the remainder of the first MR object continues to be displayed in the virtual reality environment, making the not rendered portion of the first MR object appear occluded by the second real-world object.

17. The computing system of claim 16, wherein the omitting the second MR object is further based on the attribute information indicating the at least one second real-world object is within a threshold distance of the one or more computing systems.

18. The computing system of claim 16, wherein the omitting the second MR object is further based on a trigger switch activation for a passthrough view for the second MR object.

19. The computing system of claim 16, wherein the instructions, when executed, further cause the computing system to:

render an avatar corresponding to a user within the virtual reality environment, wherein rendering the avatar comprises placing the avatar, within the virtual reality environment relative to the first MR object, based on of the first MR function of the first MR object.

* * * * *